(12) United States Patent
Chu et al.

(10) Patent No.: US 12,454,574 B2
(45) Date of Patent: Oct. 28, 2025

(54) ANTI-CD79B ANTIBODIES AND CHIMERIC ANTIGEN RECEPTORS AND METHODS OF USE THEREOF

(71) Applicant: Board of Regents, The University of Texas System, Austin, TX (US)

(72) Inventors: Fuliang Chu, Houston, TX (US); Sattva S. Neelapu, Houston, TX (US); JingJing Cao, Houston, TX (US); Jingwei Liu, Houston, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 1172 days.

(21) Appl. No.: 17/309,144

(22) PCT Filed: Oct. 30, 2019

(86) PCT No.: PCT/US2019/058710
§ 371 (c)(1),
(2) Date: Apr. 29, 2021

(87) PCT Pub. No.: WO2020/092467
PCT Pub. Date: May 7, 2020

(65) Prior Publication Data
US 2021/0317209 A1 Oct. 14, 2021

Related U.S. Application Data

(60) Provisional application No. 62/752,889, filed on Oct. 30, 2018.

(51) Int. Cl.
| | | |
|---|---|---|
| C07K 16/28 | (2006.01) | |
| A61K 40/11 | (2025.01) | |
| A61K 40/31 | (2025.01) | |
| A61K 40/42 | (2025.01) | |
| A61K 45/06 | (2006.01) | |
| A61P 35/00 | (2006.01) | |
| C07K 14/485 | (2006.01) | |
| C07K 14/705 | (2006.01) | |
| A61K 38/00 | (2006.01) | |

(52) U.S. Cl.
CPC .......... *C07K 16/2803* (2013.01); *A61K 40/11* (2025.01); *A61K 40/31* (2025.01); *A61K 40/421* (2025.01); *A61K 40/4211* (2025.01); *A61K 45/06* (2013.01); *A61P 35/00* (2018.01); *C07K 14/485* (2013.01); *C07K 14/70503* (2013.01); *A61K 38/00* (2013.01); *A61K 2239/31* (2023.05); *A61K 2239/38* (2023.05); *A61K 2239/48* (2023.05)

(58) Field of Classification Search
CPC .............. C07K 16/2803; C07K 14/485; C07K 14/70503; A61K 40/11; A61K 40/31; A61K 40/421; A61K 40/4211; A61K 45/06; A61K 38/00; A61K 2239/31; A61K 2239/38; A61K 2239/48; A61P 35/00; A23B 11/1332; H10D 30/6745
See application file for complete search history.

(56) References Cited

U.S. PATENT DOCUMENTS

| | | |
|---|---|---|
| 5,844,093 A | 12/1998 | Kettleborough et al. |
| 2009/0182127 A1 | 7/2009 | Kjaergaard et al. |
| 2011/0217292 A1 | 9/2011 | Newman et al. |
| 2014/0227294 A1 | 8/2014 | Anderson et al. |
| 2016/0159906 A1 | 6/2016 | Sun et al. |
| 2016/0361360 A1* | 12/2016 | Chang .................... A61P 25/00 |
| 2017/0335281 A1 | 11/2017 | Loew et al. |
| 2018/0057595 A1 | 3/2018 | Yang et al. |
| 2018/0079824 A1 | 3/2018 | Ahmed et al. |
| 2018/0118836 A1 | 5/2018 | Bernett et al. |
| 2018/0201679 A1 | 7/2018 | Chen et al. |
| 2020/0048338 A1 | 2/2020 | Paszty |

FOREIGN PATENT DOCUMENTS

| | | |
|---|---|---|
| CN | 107108739 | 8/2017 |
| CN | 107613974 | 1/2018 |
| CN | 107708741 | 2/2018 |
| CN | 108276493 | 7/2018 |
| CN | 109265565 | 1/2019 |
| WO | WO 2009/012256 | 1/2009 |
| WO | WO 2017/015427 | 1/2017 |
| WO | 2017/120280 A1 | 7/2017 |
| WO | WO 2017/172981 | 10/2017 |
| WO | WO 2018226958 | 12/2018 |
| WO | WO 2019/023410 | 1/2019 |
| WO | WO 2019/030377 | 2/2019 |
| WO | WO 2019/220110 | 11/2019 |
| WO | WO 2020/092467 | 5/2020 |

OTHER PUBLICATIONS

Atar et al. "Adapter CAR T Cell therapy for the treatment of b-lineage lymphomas", *Biomedicines*, vol. 10 , No. 10, 2022.
Mihalyova et al. "Promising immunotherapeutic modalities or b-cell lymphoproliferative disorders", *Int J Mol Sci*, vol. 22, No. 21, 2021.
Office Action issued in corresponding Chinese Application No. 201980085366.4, dated Jul. 28, 2023.
Ormhoj et al. "Chimeric antigen receptor t cells targeting CD79b show efficacy in lymphoma with or without cotargeting CD19", *Clin Cancer Res*, vol. 25, No. 23, 2019.
Partial Supplementary European Search Report issued in Corresponding European Application No. 19878006.6, dated Aug. 4, 2022.
International Search Report and Written Opinion in corresponding PCT Application No. PCT/US2021/070497, mailed Aug. 18, 2021.

(Continued)

*Primary Examiner* — Nelson B Moseley, II
(74) *Attorney, Agent, or Firm* — Norton Rose Fulbright US LLP

(57) ABSTRACT

Provided herein are CD79b antibodies and CD79b-specific chimeric antigen receptors (CARs). Further provided herein are T cells expressing the CD79b-specific CARs and methods of treating cancer by administering the CD79b-specific CAR T cells.

46 Claims, 14 Drawing Sheets
Specification includes a Sequence Listing.

(56) References Cited

OTHER PUBLICATIONS

International Search Report and Written Opinion in corresponding PCT Application No. PCT/US2019/058710, mailed Mar. 18, 2020.

* cited by examiner

Tumor(Mino 2X10⁶) iv.  T cells (10X10⁶) iv.

Day -18  Day 0 (BLI every 3-4 days)

| | Untransduced T | CD19-28 CAR T | 45-CD79b-28 CAR T |
|---|---|---|---|
| Day 4 |  |  |  |
| Day 11 |  |  |  |
| Day 17 |  |  |  |
| Day 30 |  |  |  |

SEQUENCE LISTING

```
<160> NUMBER OF SEQ ID NOS: 88

<210> SEQ ID NO 1
<211> LENGTH: 333
<212> TYPE: DNA
<213> ORGANISM: Artificial sequence
<220> FEATURE:
<223> OTHER INFORMATION: Synthetic oligonucleotide

<400> SEQUENCE: 1
gaggtgcagc tgcaggagtc tggacctgag ctgaagaagc ctggagagac agtcaagatc      60
tcctgcaagg cttctggtta taccttcaca gactattcaa tgcactgggt gaagcaggct     120
ccaggaaagg gtttaaagtg gatgggctgg ataaacactg agactggtga gccaacatat     180
gcagatgact caagggacg gtttgccttc tctttggaaa cctctgccag cactgcctat      240
ttgcagatca acaacctcaa aaatgatgac acggctacat atttctgtaa tatggactcc     300
tggggtcaag gaacctcagt caccgtctcc tca                                   333

<210> SEQ ID NO 2
<211> LENGTH: 111
<212> TYPE: PRT
<213> ORGANISM: Artificial sequence
<220> FEATURE:
<223> OTHER INFORMATION: Synthetic amino acid

<400> SEQUENCE: 2

Glu Val Gln Leu Gln Glu Ser Gly Pro Glu Leu Lys Lys Pro Gly Glu
1               5                   10                  15

Thr Val Lys Ile Ser Cys Lys Ala Ser Gly Tyr Thr Phe Thr Asp Tyr
            20                  25                  30

Ser Met His Trp Val Lys Gln Ala Pro Gly Lys Gly Leu Lys Trp Met
        35                  40                  45

Gly Trp Ile Asn Thr Glu Thr Gly Glu Pro Thr Tyr Ala Asp Asp Phe
    50                  55                  60

Lys Gly Arg Phe Ala Phe Ser Leu Glu Thr Ser Ala Ser Thr Ala Tyr
65                  70                  75                  80

Leu Gln Ile Asn Asn Leu Lys Asn Asp Asp Thr Ala Thr Tyr Phe Cys
                85                  90                  95

Asn Met Asp Ser Trp Gly Gln Gly Thr Ser Val Thr Val Ser Ser
```

<210> SEQ ID NO 3
<211> LENGTH: 8
<212> TYPE: PRT
<213> ORGANISM: Artificial sequence
<220> FEATURE:
<223> OTHER INFORMATION: Synthetic amino acid

<400> SEQUENCE: 3

Gly Tyr Thr Phe Thr Asp Tyr Ser
1               5

<210> SEQ ID NO 4
<211> LENGTH: 8
<212> TYPE: PRT
<213> ORGANISM: Artificial sequence
<220> FEATURE:
<223> OTHER INFORMATION: Synthetic amino acid

<400> SEQUENCE: 4

Ile Asn Thr Glu Thr Gly Glu Pro
1               5

<210> SEQ ID NO 5
<211> LENGTH: 4
<212> TYPE: PRT
<213> ORGANISM: Artificial sequence
<220> FEATURE:
<223> OTHER INFORMATION: Synthetic amino acid

<400> SEQUENCE: 5

Asn Met Asp Ser
1

<210> SEQ ID NO 6
<211> LENGTH: 318
<212> TYPE: DNA
<213> ORGANISM: Artificial sequence
<220> FEATURE:
<223> OTHER INFORMATION: Synthetic oligonucleotide

<400> SEQUENCE: 6

```
caaattgttc tcacccagtc tccagcaatc atgtctgcat ctccagggga gaaggtcacc      60
atgacctgca gtgccagctc aagtgtaagt tacatgtggt ggtaccacca gaagccagga     120
tcctccccca gactcctgat ttttgacaca tccaacctgg cttctggagt ccctgttcgc     180
ttcagtggca gtgggtctgg gacctcttac tctctcacaa tcagccgaat ggaggctgaa     240
gatgctgcca cttattactg ccagcagtgg actagttacc cgtacacgtt cggaggggg     300
accaagctgg aaataaaa                                                  318
```

<210> SEQ ID NO 7
<211> LENGTH: 106
<212> TYPE: PRT
<213> ORGANISM: Artificial sequence
<220> FEATURE:
<223> OTHER INFORMATION: Synthetic amino acid

<400> SEQUENCE: 7

Gln Ile Val Leu Thr Gln Ser Pro Ala Ile Met Ser Ala Ser Pro Gly
1               5                   10                  15

Glu Lys Val Thr Met Thr Cys Ser Ala Ser Ser Ser Val Ser Tyr Met
            20                  25                  30

Trp Trp Tyr His Gln Lys Pro Gly Ser Ser Pro Arg Leu Leu Ile Phe
             35                  40                  45

Asp Thr Ser Asn Leu Ala Ser Gly Val Pro Val Arg Phe Ser Gly Ser
         50                  55                  60

Gly Ser Gly Thr Ser Tyr Ser Leu Thr Ile Ser Arg Met Glu Ala Glu
 65                  70                  75                  80

Asp Ala Ala Thr Tyr Tyr Cys Gln Gln Trp Thr Ser Tyr Pro Tyr Thr
                 85                  90                  95

Phe Gly Gly Gly Thr Lys Leu Glu Ile Lys
            100                 105

<210> SEQ ID NO 8
<211> LENGTH: 5
<212> TYPE: PRT
<213> ORGANISM: Artificial sequence
<220> FEATURE:
<223> OTHER INFORMATION: Synthetic amino acid

<400> SEQUENCE: 8

Ser Ser Val Ser Tyr
1               5

<210> SEQ ID NO 9
<211> LENGTH: 3
<212> TYPE: PRT
<213> ORGANISM: Artificial sequence
<220> FEATURE:
<223> OTHER INFORMATION: Synthetic amino acid

<400> SEQUENCE: 9

Asp Thr Ser
1

<210> SEQ ID NO 10
<211> LENGTH: 9
<212> TYPE: PRT
<213> ORGANISM: Artificial sequence
<220> FEATURE:
<223> OTHER INFORMATION: Synthetic amino acid

<400> SEQUENCE: 10

Gln Gln Trp Thr Ser Tyr Pro Tyr Thr
1               5

<210> SEQ ID NO 11
<211> LENGTH: 363
<212> TYPE: DNA
<213> ORGANISM: Artificial sequence
<220> FEATURE:
<223> OTHER INFORMATION: Synthetic oligonucleotide

<400> SEQUENCE: 11
caggtccaac tgcagcagcc tggggctgag cttgtgaagc ctggggctcc agtgaagctg     60
tcctgcaagg cttctggcta caccttcacc agctactggg tgaactgggt gaagcagagg    120
cctggacgag gcctcgagtg gattggaagg attgatcctt ccgatagtga aactcactac    180
aatcaaaagt tcaaggacaa ggccacactg actgtagaca atcctccag cacagcctac     240 atccaactca gcagcctgac atctgaggac tctgcggtct attactgtgc aagatggact    300
atggtagtag ttacggatgc tatggactac tggggtcaag gaacctcagt caccgtctcc    360
tca                                                                   363

<210> SEQ ID NO 12
<211> LENGTH: 121
<212> TYPE: PRT
<213> ORGANISM: Artificial sequence
<220> FEATURE:
<223> OTHER INFORMATION: Synthetic amino acid

<400> SEQUENCE: 12

```
Gln Val Gln Leu Gln Gln Pro Gly Ala Glu Leu Val Lys Pro Gly Ala
1               5                   10                  15

Pro Val Lys Leu Ser Cys Lys Ala Ser Gly Tyr Thr Phe Thr Ser Tyr
            20                  25                  30

Trp Val Asn Trp Val Lys Gln Arg Pro Gly Arg Gly Leu Glu Trp Ile
        35                  40                  45

Gly Arg Ile Asp Pro Ser Asp Ser Glu Thr His Tyr Asn Gln Lys Phe
    50                  55                  60

Lys Asp Lys Ala Thr Leu Thr Val Asp Lys Ser Ser Ser Thr Ala Tyr
65                  70                  75                  80

Ile Gln Leu Ser Ser Leu Thr Ser Glu Asp Ser Ala Val Tyr Tyr Cys
                85                  90                  95

Ala Arg Trp Thr Met Val Val Val Thr Asp Ala Met Asp Tyr Trp Gly
            100                 105                 110

Gln Gly Thr Ser Val Thr Val Ser Ser
        115                 120
```

<210> SEQ ID NO 13
<211> LENGTH: 8
<212> TYPE: PRT
<213> ORGANISM: Artificial sequence
<220> FEATURE:
<223> OTHER INFORMATION: Synthetic amino acid

<400> SEQUENCE: 13

```
Gly Tyr Thr Phe Thr Ser Tyr Trp
1               5
```

<210> SEQ ID NO 14
<211> LENGTH: 8
<212> TYPE: PRT
<213> ORGANISM: Artificial sequence
<220> FEATURE:
<223> OTHER INFORMATION: Synthetic amino acid

<400> SEQUENCE: 14

```
Ile Asp Pro Ser Asp Ser Glu Thr
1               5
```

<210> SEQ ID NO 15
<211> LENGTH: 14
<212> TYPE: PRT
<213> ORGANISM: Artificial sequence
<220> FEATURE:
<223> OTHER INFORMATION: Synthetic amino acid

<400> SEQUENCE: 15

```
Ala Arg Trp Thr Met Val Val Val Thr Asp Ala Met Asp Tyr
1               5                   10
```

<210> SEQ ID NO 16
<211> LENGTH: 324
<212> TYPE: DNA
<213> ORGANISM: Artificial sequence
<220> FEATURE:
<223> OTHER INFORMATION: Synthetic oligonucleotide -continued

<400> SEQUENCE: 16

```
gacattgtgc tgacacagtc tcctgcttcc ttagctgtat ctctggggca gagggccacc    60
atctcataca gggccagcaa aagtgtcagt acatctggct atagttatat gcactggaac   120
caacagaaac caggacagcc acccagactc ctcatctatc ttgtatccaa cctagaatct   180
ggggtccctg ccaggttcag tggcagtggg tctgggacag acttcaccct caacatccat   240
cctgtggagg aggaggatgc tgcaacctat tactgtcagc acattaggga gcttacacgt   300
tcggaggggg gaccaagctg gaaa                                          324
```

<210> SEQ ID NO 17
<211> LENGTH: 108
<212> TYPE: PRT
<213> ORGANISM: Artificial sequence
<220> FEATURE:
<223> OTHER INFORMATION: Synthetic amino acid

<400> SEQUENCE: 17

```
Asp Ile Val Leu Thr Gln Ser Pro Ala Ser Leu Ala Val Ser Leu Gly
 1               5                  10                  15
Gln Arg Ala Thr Ile Ser Tyr Arg Ala Ser Lys Ser Val Ser Thr Ser
            20                  25                  30
Gly Tyr Ser Tyr Met His Trp Asn Gln Gln Lys Pro Gly Gln Pro Pro
        35                  40                  45
Arg Leu Leu Ile Tyr Leu Val Ser Asn Leu Glu Ser Gly Val Pro Ala
    50                  55                  60
Arg Phe Ser Gly Ser Gly Ser Gly Thr Asp Phe Thr Leu Asn Ile His
65                  70                  75                  80
Pro Val Glu Glu Glu Asp Ala Ala Thr Tyr Tyr Cys Gln His Ile Arg
                85                  90                  95
Glu Leu Thr Arg Ser Glu Gly Gly Pro Ser Trp Lys
            100                 105
```

<210> SEQ ID NO 18
<211> LENGTH: 10
<212> TYPE: PRT
<213> ORGANISM: Artificial sequence
<220> FEATURE:
<223> OTHER INFORMATION: Synthetic amino acid

<400> SEQUENCE: 18

```
Lys Ser Val Ser Thr Ser Gly Tyr Ser Tyr
 1               5                  10
```

<210> SEQ ID NO 19
<211> LENGTH: 3
<212> TYPE: PRT
<213> ORGANISM: Artificial sequence
<220> FEATURE:
<223> OTHER INFORMATION: Synthetic amino acid

<400> SEQUENCE: 19

```
Leu Val Ser
 1
```

<210> SEQ ID NO 20
<211> LENGTH: 12
<212> TYPE: PRT
<213> ORGANISM: Artificial sequence
<220> FEATURE:
<223> OTHER INFORMATION: Synthetic amino acid

<400> SEQUENCE: 20

Gln His Ile Arg Glu Leu Thr Arg Ser Glu Gly Gly
1               5                   10

<210> SEQ ID NO 21
<211> LENGTH: 336
<212> TYPE: DNA
<213> ORGANISM: Artificial sequence
<220> FEATURE:
<223> OTHER INFORMATION: Synthetic oligonucleotide

<400> SEQUENCE: 21
gaggtgcagc tgcaggagtc tgggcctgag cttgtgaggc caggggcctt agtcaagttg      60
tcctgcagag cttctggctt caacattaaa gactactata tgcactgggt gaagcagagg     120
cctgaacagg gcctggagtg gattggatgg attgatcctg agaatggtaa ttctatatat     180
gacccgaagt tccagggcaa ggccagtata acagcagaca catcctccaa cacagcctac     240
ctgcagctca gcagcctgac atctgaggac actgccgtct attactgtgc tgtagacctt     300
tactacggta gagggactct ggtcactgtc tctgca                               336

<210> SEQ ID NO 22
<211> LENGTH: 112
<212> TYPE: PRT
<213> ORGANISM: Artificial sequence
<220> FEATURE:
<223> OTHER INFORMATION: Synthetic amino acid

<400> SEQUENCE: 22

Glu Val Gln Leu Gln Glu Ser Gly Ala Glu Leu Val Arg Pro Gly Ala
1               5                   10                  15

Leu Val Lys Leu Ser Cys Arg Ala Ser Gly Phe Asn Ile Lys Asp Tyr
            20                  25                  30

Tyr Met His Trp Val Lys Gln Arg Pro Glu Gln Gly Leu Glu Trp Ile
        35                  40                  45

Gly Trp Ile Asp Pro Glu Asn Gly Asn Ser Ile Tyr Asp Pro Lys Phe
    50                  55                  60

Gln Gly Lys Ala Ser Ile Thr Ala Asp Thr Ser Ser Asn Thr Ala Tyr
65                  70                  75                  80

Leu Gln Leu Ser Ser Leu Thr Ser Glu Asp Thr Ala Val Tyr Tyr Cys
                85                  90                  95

Ala Val Asp Leu Tyr Tyr Gly Arg Gly Thr Leu Val Thr Val Ser Ala
            100                 105                 110

<210> SEQ ID NO 23
<211> LENGTH: 8
<212> TYPE: PRT
<213> ORGANISM: Artificial sequence
<220> FEATURE:
<223> OTHER INFORMATION: Synthetic amino acid

<400> SEQUENCE: 23

Gly Phe Asn Ile Lys Asp Tyr Tyr
1               5

<210> SEQ ID NO 24
<211> LENGTH: 8
<212> TYPE: PRT
<213> ORGANISM: Artificial sequence
<220> FEATURE:
<223> OTHER INFORMATION: Synthetic amino acid

<400> SEQUENCE: 24

Ile Asp Pro Glu Asn Gly Asn Ser
1               5

<210> SEQ ID NO 25
<211> LENGTH: 12
<212> TYPE: PRT
<213> ORGANISM: Artificial sequence
<220> FEATURE:
<223> OTHER INFORMATION: Synthetic amino acid

<400> SEQUENCE: 25

Ala Val Asp Leu Tyr Tyr Gly Arg Gly Thr Leu Val
1               5                   10

<210> SEQ ID NO 26
<211> LENGTH: 336
<212> TYPE: DNA
<213> ORGANISM: Artificial sequence
<220> FEATURE:
<223> OTHER INFORMATION: Synthetic oligonucleotide

<400> SEQUENCE: 26
aacattatga tgacacagtc gccatcatct ctggctgtgt ctgcaggaga aaaggtcact      60
atgcgctgta gtccagtca aagtgtttta tacagttcaa atcagaagaa ctacttggcc     120
tggtaccagc agaaaccagg gcagtctcct aaactgctga tctactgggc atccactagg    180
gaatctggtg tccctgatcg cttcacaggc agtggatctg ggacagattt tactcttacc    240
atcagcagtg tacaagctga agacctggca gtttattact gtcatcaatt cctctcctcg    300
tacacgttcg gagggggac caagctggaa ataaaa                               336

<210> SEQ ID NO 27
<211> LENGTH: 112
<212> TYPE: PRT
<213> ORGANISM: Artificial sequence
<220> FEATURE:
<223> OTHER INFORMATION: Synthetic amino acid

<400> SEQUENCE: 27

Asn Ile Met Met Thr Gln Ser Pro Ser Ser Leu Ala Val Ser Ala Gly
1               5                   10                  15

Glu Lys Val Thr Met Arg Cys Lys Ser Ser Gln Ser Val Leu Tyr Ser
            20                  25                  30

Ser Asn Gln Lys Asn Tyr Leu Ala Trp Tyr Gln Gln Lys Pro Gly Gln
        35                  40                  45

Ser Pro Lys Leu Leu Ile Tyr Trp Ala Ser Thr Arg Glu Ser Gly Val
    50                  55                  60

Pro Asp Arg Phe Thr Gly Ser Gly Ser Gly Thr Asp Phe Thr Leu Thr
65                  70                  75                  80

Ile Ser Ser Val Gln Ala Glu Asp Leu Ala Val Tyr Tyr Cys His Gln
                85                  90                  95

Phe Leu Ser Ser Tyr Thr Phe Gly Gly Gly Thr Lys Leu Glu Ile Lys
            100                 105                 110

<210> SEQ ID NO 28
<211> LENGTH: 12
<212> TYPE: PRT
<213> ORGANISM: Artificial sequence
<220> FEATURE:
<223> OTHER INFORMATION: Synthetic amino acid

<400> SEQUENCE: 28

Gln Ser Val Leu Tyr Ser Ser Asn Gln Lys Asn Tyr
1               5                   10

<210> SEQ ID NO 29
<211> LENGTH: 3
<212> TYPE: PRT
<213> ORGANISM: Artificial sequence
<220> FEATURE:
<223> OTHER INFORMATION: Synthetic amino acid

<400> SEQUENCE: 29

Trp Ala Ser
1

<210> SEQ ID NO 30
<211> LENGTH: 8
<212> TYPE: PRT
<213> ORGANISM: Artificial sequence
<220> FEATURE:
<223> OTHER INFORMATION: Synthetic amino acid

<400> SEQUENCE: 30

His Gln Phe Leu Ser Ser Tyr Thr
1               5

<210> SEQ ID NO 31
<211> LENGTH: 696
<212> TYPE: DNA
<213> ORGANISM: Artificial sequence
<220> FEATURE:
<223> OTHER INFORMATION: Synthetic oligonucleotide

<400> SEQUENCE: 31
caaattgttc tcacccagtc tccagcaatc atgtctgcat ctccagggga gaaggtcacc    60
atgacctgca gtgccagctc aagtgtaagt tacatgtggt ggtaccacca gaagccagga   120
tcctccccca gactcctgat ttttgacaca tccaacctgg cttctggagt ccctgttcgc   180
ttcagtggca gtgggtctgg gacctcttac tctctcacaa tcagccgaat ggaggctgaa   240
gatgctgcca cttattactg ccagcagtgg actagttacc cgtacacgtt cggaggggg    300 accaagctgg aaataaaagg aggaggtggt agtggtggag gaggaagtgg aggaggagga   360
agtgaggtgc agctgcagga gtctggacct gagctgaaga gcctggaga gacagtcaag   420 atctcctgca aggcttctgg ttataccttc acagactatt caatgcactg ggtgaagcag   480
gctccaggaa agggtttaaa gtggatgggc tggataaaca ctgagactgg tgagccaaca   540
tatgcagatg acttcaaggg acggtttgcc ttctctttgg aaacctctgc cagcactgcc   600
tatttgcaga tcaacaacct caaaaatgat gacacggcta catatttctg taatatggac   660
tcctggggtc aaggaacctc agtcaccgtc tcctca                              696

<210> SEQ ID NO 32
<211> LENGTH: 732
<212> TYPE: DNA
<213> ORGANISM: Artificial sequence
<220> FEATURE:
<223> OTHER INFORMATION: Synthetic oligonucleotide

<400> SEQUENCE: 32
gacattgtgc tgacacagtc tcctgcttcc ttagctgtat ctctggggca gagggccacc    60
atctcataca gggccagcaa aagtgtcagt acatctggct atagttatat gcactggaac   120

| | |
|---|---|
| caacagaaac caggacagcc acccagactc ctcatctatc ttgtatccaa cctagaatct | 180 |
| ggggtccctg ccaggttcag tggcagtggg tctgggacag acttcaccct caacatccat | 240 |
| cctgtggagg aggaggatgc tgcaacctat tactgtcagc acattaggga gcttacacgt | 300 |
| tcggaggggg gaccaagctg gaaaggagga ggtggtagtg gtggaggagg aagtggagga | 360 |
| ggaggaagtc aggtccaact gcagcagcct ggggctgagc ttgtgaagcc tggggctcca | 420 |
| gtgaagctgt cctgcaaggc ttctggctac accttcacca gctactgggt gaactgggtg | 480 |
| aagcagaggc ctggacgagg cctcgagtgg attggaagga ttgatccttc cgatagtgaa | 540 |
| actcactaca atcaaaagtt caaggacaag gccacactga ctgtagacaa atcctccagc | 600 |
| acagcctaca tccaactcag cagcctgaca tctgaggact ctgcggtcta ttactgtgca | 660 |
| agatggacta tggtagtagt tacggatgct atggactact ggggtcaagg aacctcagtc | 720 |
| accgtctcct ca | 732 |

<210> SEQ ID NO 33
<211> LENGTH: 717
<212> TYPE: DNA
<213> ORGANISM: Artificial sequence
<220> FEATURE:
<223> OTHER INFORMATION: Synthetic oligonucleotide

<400> SEQUENCE: 33

| | |
|---|---|
| aacattatga tgacacagtc gccatcatct ctggctgtgt ctgcaggaga aaaggtcact | 60 |
| atgcgctgta agtccagtca agtgtttta tacagttcaa atcagaagaa ctacttggcc | 120 |
| tggtaccagc agaaaccagg gcagtctcct aaactgctga tctactgggc atccactagg | 180 |
| gaatctggtg tccctgatcg cttcacaggc agtggatctg gacagattt tactcttacc | 240 |
| atcagcagtg tacaagctga agacctggca gtttattact gtcatcaatt cctctcctcg | 300 |
| tacacgttcg gagggggggac caagctggaa ataaaaggag gaggtggtag tggtggagga | 360 |
| ggaagtggag gaggaggaag tgaggtgcag ctgcaggagt ctggggctga gcttgtgagg | 420 |
| ccagggggcct tagtcaagtt gtcctgcaga gcttctggct tcaacattaa agactactat | 480 |
| atgcactggg tgaagcagag gcctgaacag ggcctggagt ggattggatg gattgatcct | 540 |
| gagaatggta attctatata tgacccgaag ttccagggca aggccagtat aacagcagac | 600 |
| acatcctcca acacagccta cctgcagctc agcagcctga catctgagga cactgccgtc | 660 |
| tattactgtg ctgtagacct ttactacggt agagggactc tggtcactgt ctctgca | 717 |

<210> SEQ ID NO 34
<211> LENGTH: 2121
<212> TYPE: DNA
<213> ORGANISM: Artificial sequence
<220> FEATURE:
<223> OTHER INFORMATION: Synthetic oligonucleotide

<400> SEQUENCE: 34

| | |
|---|---|
| caaattgttc tcacccagtc tccagcaatc atgtctgcat ctccagggga aaggtcacc | 60 |
| atgacctgca gtgccagctc aagtgtaagt tacatgtggt ggtaccacca gaagccagga | 120 |
| tcctccccca gactcctgat ttttgacaca tccaacctgg cttctggagt ccctgttcgc | 180 |
| ttcagtggca gtgggtctgg gacctcttac tctctcacaa tcagccgaat ggaggctgaa | 240 |
| gatgctgcca cttattactg ccagcagtgg actagttacc cgtacacgtt cggagggggg | 300 |
| accaagctgg aaataaaagg aggaggtggt agtggtggag gaggaagtgg aggaggagga | 360 |

| | |
|---|---|
| agtgaggtgc agctgcagga gtctggacct gagctgaaga agcctggaga gacagtcaag | 420 |
| atctcctgca aggcttctgg ttataccttc acagactatt caatgcactg ggtgaagcag | 480 |
| gctccaggaa agggtttaaa gtggatgggc tggataaaca ctgagactgg tgagccaaca | 540 |
| tatgcagatg acttcaaggg acggtttgcc ttctcttttgg aaacctctgc cagcactgcc | 600 |
| tatttgcaga tcaacaacct caaaaatgat gacacggcta catatttctg taatatggac | 660 |
| tcctggggtc aaggaacctc agtcaccgtc tcctcaacaa ctactccagc caccgaccg | 720 |
| ccaacacctg ctccaactat cgcatctcaa ccactttctc tacgtccaga agcatgccga | 780 |
| ccagctgcag gaggtgcagt tcatacgaga ggtctagatt tcgcatgtga tatctacatc | 840 |
| tgggcaccat tggctgggac ttgtggtgtc cttctcctat cactggttat caccctttac | 900 |
| tgctgggtta aagtaaaag aagtaggcta cttcatagtg attacatgaa tatgactcct | 960 |
| cgacgacctg gtcccacccg taagcattat cagccctatg caccaccacg agatttcgca | 1020 |
| gcctatcgct ccagagttaa atttagcaga agtgcagatg ctcctgcgta taaacagggt | 1080 |
| caaaaccaac tatataatga actaaatcta ggacgaagag aagaatatga tgttttagat | 1140 |
| aaaagacgtg gtcgagatcc tgaaatggga ggaaaaccta aagaaaaaaa tcctcaagaa | 1200 |
| ggcctatata atgaactaca aaaagataag atggcagaag cttatagtga aattggaatg | 1260 |
| aaaggagaac gtcgtagagg taaaggtcat gatggtcttt atcaaggtct tagtacagca | 1320 |
| acaaaagata catatgatgc acttcatatg caagcacttc cacctcgttt cgaagagcaa | 1380 |
| aaacttatct ctgaagagga cctcatggtg agcaagggcg aggagctgtt caccggggtg | 1440 |
| gtgcccatcc tggtcgagct ggacggcgac gtaaacggcc acaagttcag cgtgtccggc | 1500 |
| gagggcgagg gcgatgccac ctacggcaag ctgaccctga agttcatctg caccaccggc | 1560 |
| aagctgcccg tgccctggcc cacccttcgtg accaccctga cctacggcgt gcagtgcttc | 1620 |
| agccgctacc ccgaccacat gaagcagcac gacttcttca gtccgccat gcccgaaggc | 1680 |
| tacgtccagg agcgcaccat cttcttcaag gacgacggca actacaagac ccgcgccgag | 1740 |
| gtgaagttcg agggcgacac cctggtgaac cgcatcgagc tgaagggcat cgacttcaag | 1800 |
| gaggacggca acatcctggg gcacaagctg gagtacaact acaacagcca caacgtctat | 1860 |
| atcatggccg acaagcagaa gaacggcatc aaggtgaact tcaagatccg ccacaacatc | 1920 |
| gaggacggca gcgtgcagct cgccgaccac taccagcaga acacccccat cggcgacggc | 1980 |
| cccgtgctgc tgcccgacaa ccactacctg agcacccagt ccgccctgag caaagacccc | 2040 |
| aacgagaagc gcgatcacat ggtcctgctg gagttcgtga ccgccgccgg gatcactctc | 2100 |
| ggcatggacg agctgtacaa g | 2121 |

<210> SEQ ID NO 35
<211> LENGTH: 2496
<212> TYPE: DNA
<213> ORGANISM: Artificial sequence
<220> FEATURE:
<223> OTHER INFORMATION: Synthetic oligonucleotide

<400> SEQUENCE: 35

| | |
|---|---|
| caaattgttc tcacccagtc tccagcaatc atgtctgcat ctccagggga gaaggtcacc | 60 |
| atgacctgca gtgccagctc aagtgtaagt tacatgtggt ggcaccacca gaagccaggt | 120 |
| tcttccccca gactcctgat ttttgacaca tccaacctgg cttctggagt ccctgttcgc | 180 |
| ttcagtggca gtgggtctgg gacctcttac tctctcacaa tcagccgaat ggaggctgaa | 240 |
| gatgctgcca cttattactg ccagcagtgg acaagttacc cgtacacgtt cggagggggg | 300 |

```
accaagctgg aaataaaagg aggaggtggt agtggtggag gaggaagtgg aggaggagga      360
agtgaggtgc agctgcagga gtctggacct gagctgaaga agcctggaga gacagtcaag      420
atctcctgca aggcttctgg ttataccttc acagactatt caatgcactg ggtgaagcag      480
gctccaggaa agggtttaaa gtggatgggc tggataaaca ctgagactgg tgagccaaca      540
tatgcagatg acttcaaggg acggtttgcc ttctctttgg aaacctctgc cagcactgcc      600
tatttgcaga tcaacaacct caaaaatgat gacacggcta catatttctg taatatggac      660
tcctggggtc aaggaaccct cagtcaccgt ctcctcaacta gtattgaagt tatgtatcct      720
cctccttacc tagacaatga aagagcaat ggaaccatta tccatgtgaa agggaaacac      780
ctttgtccaa gtcccctatt tcccggacct tctaagccct tttgggtgct ggtggtggtt      840
ggtggagtcc tggcttgcta tagcttgcta gtaacagtgg cctttattat tttctgggtt      900
agaagtaaaa gaagtaggct acttcatagt gattacatga atatgactcc tcgacgacct      960
ggtcccaccc gtaagcatta tcagccctat gcaccaccac gagatttcgc agcctatcgc     1020
tccagagtta aatttagcag aagtgcagat gctcctgcgt ataaacaggg tcaaaaccaa     1080
ctatataatg aactaaatct aggacgaaga gaagaatatg atgttttaga taaagacgt      1140 ggtcgagatc ctgaaatggg aggaaaacct agaagaaaaa atcctcaaga aggcctatat     1200
aatgaactac aaaagataa gatggcagaa gcttatagtg aaattggaat gaaggagaa      1260 cgtcgtagag gtaaaggtca tgatggtctt tatcaaggtc ttagtacagc aacaaaagat     1320
acatatgatg cacttcatat gcaagcactt ccacctcgtt tcgaaggctc cggcgagggc     1380
agaggcagtc tgctgacatg cggtgacgtg gaagagaatc ccggccctat gcttctcctg     1440
gtgacaagcc ttctgctctg tgagttacca cacccagcat tcctccgcaa agtgtgtaac     1500
ggaataggta ttggtgaatt taaagactca ctctccataa atgctacgaa tattaaacac     1560
ttcaaaaact gcacctccat cagtggcgat ctccacatcc tgccggtggc atttaggggt     1620
gactccttca cacatactcc tcctctagat ccacaggaac tggatattct gaaaaccgta     1680
aaggaaatca cagggttttt gctgattcag gcttggcctg aaaacaggac ggacctccat     1740
gcctttgaga acctagaaat catacgcggc aggaccaagc aacatggtca gttttctctt     1800
gcagtcgtca gcctgaacat aacatccttg ggattacgct ccctcaagga gataagtgat     1860
ggagatgtga taatttcagg aaacaaaaat ttgtgctatg caaatacaat aaactggaaa     1920
aaactgtttg ggacctccgg tcagaaaacc aaaattataa gcaacagagg tgaaaacagc     1980
tgcaaggcca caggccaggt ctgccatgcc ttgtgctccc ccgagggctg ctggggcccg     2040
gagcccaggg actgcgtctc ttgccggaat gtcagccgag gcaggaatg cgtggacaag     2100 tgcaaccttc tggagggtga gccaaggag tttgtggaga actctgagtg catacagtgc     2160
cacccagagt gcctgcctca ggccatgaac atcacctgca caggacgggg accagacaac     2220
tgtatccagt gtgcccacta cattgacggc ccccactgcg tcaagacctg cccggcagga     2280
gtcatgggag aaaacaacac cctggtctgg aagtacgcag acgccggcca tgtgtgccac     2340
ctgtgccatc caaactgcac ctacggatgc actgggccag tcttgaagg ctgtccaacg     2400 aatgggccta agatcccgtc catcgccact gggatggtgg gggccctcct cttgctgctg     2460
gtggtggccc tggggatcgg cctcttcatg cgaagg                              2496
```

<210> SEQ ID NO 36
<211> LENGTH: 2157
<212> TYPE: DNA

<213> ORGANISM: Artificial sequence
<220> FEATURE:
<223> OTHER INFORMATION: Synthetic oligonucleotide

<400> SEQUENCE: 36

```
gacattgtgc tgacacagtc tcctgcttcc ttagctgtat ctctggggca gagggccacc      60
atctcataca gggccagcaa agtgtcagt acatctggct atagttatat gcactggaac     120
caacagaaac caggacagcc acccagactc ctcatctatc ttgtatccaa cctagaatct    180
ggggtccctg ccaggttcag tggcagtggg tctgggacag acttcaccct caacatccat    240
cctgtgagg aggaggatgc tgcaacctat tactgtcagc acattaggga gcttacacgt     300
tcggagggg gaccaagctg gaaaggagga ggtggtagtg gtggaggagg aagtggagga     360
ggaggaagtc aggtccaact gcagcagcct ggggctgagc ttgtgaagcc tggggctcca    420
gtgaagctgt cctgcaaggc ttctggctac accttcacca gctactgggt gaactgggtg    480
aagcagaggc ctggacgagg cctcgagtgg attggaagga ttgatccttc cgatagtgaa    540
actcactaca atcaaaagtt caaggacaag gccacactga ctgtagacaa atcctccagc    600
acagcctaca tccaactcag cagcctgaca tctgaggact ctgcggtcta ttactgtgca    660
agatggacta tggtagtagt tacgatgct atggactact ggggtcaagg aacctcagtc    720
accgtctcct caacaactac tccagcacca cgaccaccaa cacctgctcc aactatcgca    780
tctcaaccac tttctctacg tccagaagca tgccgaccag ctgcaggagg tgcagttcat    840
acgagaggtc tagatttcgc atgtgatatc tacatctggg caccattggc tgggacttgt    900
ggtgtccttc tcctatcact ggttatcacc ctttactgct gggttagaag taaaagaagt    960
aggctacttc atagtgatta catgaatatg actcctcgac gacctggtcc cacccgtaag   1020
cattatcagc cctatgcacc accacgagat ttcgcagcct atcgctccag agttaaattt   1080
agcagaagtg cagatgctcc tgcgtataaa cagggtcaaa accaactata taatgaacta   1140
aatctaggac gaagagaaga atatgatgtt ttagataaaa gacgtggtcg agatcctgaa   1200
atgggaggaa aacctagaag aaaaaatcct caagaaggcc tatataatga actacaaaaa   1260
gataagatgg cagaagctta tagtgaaatt ggaatgaaag gagaacgtcg tagaggtaaa   1320
ggtcatgatg gtctttatca aggtcttagt acagcaacaa aagatacata tgatgcactt   1380
catatgcaag cacttccacc tcgtttcgaa gagcaaaaac ttatctctga agaggacctc   1440
atggtgagca agggcgagga gctgttcacc ggggtggtgc ccatcctggt cgagctggac   1500
ggcgacgtaa acggccacaa gttcagcgtg tccggcgagg gcgagggcga tgccacctac   1560
ggcaagctga ccctgaagtt catctgcacc accggcaagc tgcccgtgcc ctggcccacc   1620
ctcgtgacca ccctgaccta cggcgtgcag tgcttcagcc gctacccga ccacatgaag    1680
cagcacgact tcttcaagtc cgccatgccc gaaggctacg tccaggagcg caccatcttc    1740
ttcaaggacg acggcaacta caagacccgc gccgaggtga agttcgaggg cgacaccctg   1800
gtgaaccgca tcgagctgaa gggcatcgac ttcaaggagg acggcaacat cctgggcac   1860
aagctggagt acaactacaa cagccacaac gtctatatca tggccgacaa gcagaagaac   1920
ggcatcaagg tgaacttcaa gatccgccac aacatcgagg acggcagcgt gcagctcgcc   1980
gaccactacc agcagaacac ccccatcggc gacggccccg tgctgctgcc cgacaaccac   2040
tacctgagca cccagtccgc cctgagcaaa gaccccaacg agaagcgcga tcacatggtc   2100
ctgctggagt tcgtgaccgc cgccgggatc actctcggca tggacgagct gtacaag       2157
```

<210> SEQ ID NO 37
<211> LENGTH: 2535
<212> TYPE: DNA
<213> ORGANISM: Artificial sequence
<220> FEATURE:
<223> OTHER INFORMATION: Synthetic oligonucleotide

<400> SEQUENCE: 37

| | | | | | |
|---|---|---|---|---|---|
| gacattgtgc | tgacacagtc | tcctgcttcc | ttagctgtat | ctctggggca | gagggccacc | 60 |
| atctcataca | gggccagcaa | aagtgtcagt | acatctggct | atagttatat | gcactggaac | 120 |
| caacagaaac | caggacagcc | acccagactc | ctcatctatc | ttgtatccaa | cctagaatct | 180 |
| ggggtccctg | ccaggttcag | tggcagtggg | tctgggacag | acttcaccct | caacatccat | 240 |
| cctgtggagg | aggaggatgc | tgcaacctat | tactgtcagc | acattaggga | gcttacacgt | 300 |
| tcggaggggg | gaccaagctg | gaaaggagga | ggtggtagtg | gtggaggagg | aagtggagga | 360 |
| ggaggaagtc | aggtccaact | gcagcagcct | ggggctgagc | ttgtgaagcc | tggggctcca | 420 |
| gtgaagctgt | cctgcaaggc | ttctggctac | accttcacca | gctactgggt | gaactgggtg | 480 |
| aagcagaggc | ctggacgagg | cctcgagtgg | attggaagga | ttgatccttc | gatagtgaa | 540 |
| actcactaca | atcaaaagtt | caaggacaag | gccacactga | ctgtagacaa | atcctccagc | 600 |
| acagcctaca | tccaactcag | cagcctgaca | tctgaggact | ctgcggtcta | ttactgtgca | 660 |
| agatggacta | tggtagtagt | tacggatgct | atggactact | ggggtcaagg | aacctcagtc | 720 |
| accgtctcct | caactagtat | tgaagttatg | tatcctcctc | cttacctaga | caatgagaag | 780 |
| agcaatggaa | ccattatcca | tgtgaaaggg | aaacaccttt | gtccaagtcc | cctatttccc | 840 |
| ggaccttcta | agcccttttg | ggtgctggtg | gtggttggtg | gagtcctggc | ttgctatagc | 900 |
| ttgctagtaa | cagtggcctt | tattattttc | tgggttagaa | gtaaaagaag | taggctactt | 960 |
| catagtgatt | acatgaatat | gactcctcga | cgacctggtc | ccacccgtaa | gcattatcag | 1020 |
| ccctatgcac | caccacgaga | tttcgcagcc | tatcgctcca | gagttaaatt | tagcagaagt | 1080 |
| gcagatgctc | ctgcgtataa | acagggtcaa | aaccaactat | ataatgaact | aaatctagga | 1140 |
| cgaagagaag | aatatgatgt | tttagataaa | agacgtggtc | gagatcctga | aatgggagga | 1200 |
| aaacctagaa | gaaaaaatcc | tcaagaaggc | ctatataatg | aactacaaaa | agataagatg | 1260 |
| gcagaagctt | atagtgaaat | tggaatgaaa | ggagaacgtc | gtagaggtaa | aggtcatgat | 1320 |
| ggtctttatc | aaggtcttag | tacagcaaca | aaagatacat | atgatgcact | tcatatgcaa | 1380 |
| gcacttccac | ctcgtttcga | aggctccggc | gagggcagag | gcagtctgct | gacatgcggt | 1440 |
| gacgtggaag | agaatcccgg | ccctatgctt | ctcctggtga | caagccttct | gctctgtgag | 1500 |
| ttaccacacc | cagcattcct | ccgcaaagtg | tgtaacggaa | taggtattgg | tgaatttaaa | 1560 |
| gactcactct | ccataaatgc | tacgaatatt | aaacacttca | aaaactgcac | ctccatcagt | 1620 |
| ggcgatctcc | acatcctgcc | ggtggcattt | aggggtgact | ccttcacaca | tactcctcct | 1680 |
| ctagatccac | aggaactgga | tattctgaaa | accgtaaagg | aaatcacagg | ttttttgctg | 1740 |
| attcaggctt | ggcctgaaaa | caggacggac | ctccatgcct | tgagaacct | agaaatcata | 1800 |
| cgcggcagga | ccaagcaaca | tggtcagttt | tctcttgcag | tcgtcagcct | gaacataaca | 1860 |
| tccttgggat | tacgctccct | caaggagata | agtgatggag | atgtgataat | ttcaggaaac | 1920 |
| aaaaatttgt | gctatgcaaa | tacaataaac | tggaaaaaac | tgtttgggac | ctccggtcag | 1980 |
| aaaaccaaaa | ttataagcaa | cagaggtgaa | aacagctgca | aggccacagg | ccaggtctgc | 2040 |
| catgccttgt | gctccccga | gggctgctgg | ggcccggagc | ccaggactg | cgtctcttgc | 2100 |

| | |
|---|---|
| cggaatgtca gccgaggcag ggaatgcgtg gacaagtgca accttctgga gggtgagcca | 2160 |
| agggagtttg tggagaactc tgagtgcata cagtgccacc cagagtgcct gcctcaggcc | 2220 |
| atgaacatca cctgcacagg acggggacca gacaactgta tccagtgtgc ccactacatt | 2280 |
| gacgcccccc actgcgtcaa gacctgcccg gcaggagtca tgggagaaaa caacaccctg | 2340 |
| gtctggaagt acgcagacgc cggccatgtg tgccacctgt gccatccaaa ctgcacctac | 2400 |
| ggatgcactg ggccaggtct tgaaggctgt ccaacgaatg ggcctaagat cccgtccatc | 2460 |
| gccactggga tggtgggggc cctcctcttg ctgctggtgg tggccctggg gatcggcctc | 2520 |
| ttcatgcgaa ggtaa | 2535 |

<210> SEQ ID NO 38
<211> LENGTH: 2142
<212> TYPE: DNA
<213> ORGANISM: Artificial sequence
<220> FEATURE:
<223> OTHER INFORMATION: Synthetic oligonucleotide

<400> SEQUENCE: 38

| | |
|---|---|
| aacattatga tgacacagtc gccatcatct ctggctgtgt ctgcaggaga aaaggtcact | 60 |
| atgcgctgta agtccagtca agtgttttta tacagttcaa atcagaagaa ctacttggcc | 120 |
| tggtaccagc agaaaccagg gcagtctcct aaactgctga tctactgggc atccactagg | 180 |
| gaatctggtg tccctgatcg cttcacaggc agtggatctg gacagatttt actcttacc | 240 |
| atcagcagtg tacaagctga agacctggca gtttattact gtcatcaatt cctctcctcg | 300 |
| tacacgttcg gagggggggac caagctggaa ataaaaggag gaggtggtag tggtggagga | 360 |
| ggaagtggag gaggaggaag tgaggtgcag ctgcaggagt ctggggctga gcttgtgagg | 420 |
| ccaggggcct tagtcaagtt gtcctgcaga gcttctggct tcaacattaa agactactat | 480 |
| atgcactggg tgaagcagag gcctgaacag ggcctggagt ggattggatg gattgatcct | 540 |
| gagaatggta attctatata tgacccgaag ttccagggca aggccagtat aacagcagac | 600 |
| acatcctcca acacagccta cctgcagctc agcagcctga catctgagga cactgccgtc | 660 |
| tattactgtg ctgtagacct ttactacggt agagggactc tggtcactgt ctctgcaaca | 720 |
| actactccag caccacgacc accaacacct gctccaacta tcgcatctca accactttct | 780 |
| ctacgtccag aagcatgccg accagctgca ggaggtgcag ttcatacgag aggtctagat | 840 |
| ttcgcatgtg atatctacat ctgggcacca ttggctggga cttgtggtgt ccttctccta | 900 |
| tcactggtta tcacccttta ctgctgggtt agaagtaaaa gaagtaggct acttcatagt | 960 |
| gattacatga atatgactcc tcgacgacct ggtcccaccc gtaagcatta tcagccctat | 1020 |
| gcaccaccac gagatttcgc agcctatcgc tccagagtta aatttagcag aagtgcagat | 1080 |
| gctcctgcgt ataaacaggg tcaaaaccaa ctatataatg aactaaatct aggacgaaga | 1140 |
| gaagaatatg atgttttaga taaaagacgt ggtcgagatc ctgaaatggg aggaaaacct | 1200 |
| agaagaaaaa atcctcaaga aggcctatat aatgaactac aaaaagataa gatggcagaa | 1260 |
| gcttatagtg aaattggaat gaaaggagaa cgtcgtagag gtaaaggtca tgatggtctt | 1320 |
| tatcaaggtc ttagtacagc aacaaaagat acatatgatg cacttcatat gcaagcactt | 1380 |
| ccacctcgtt tcgaagagca aaaacttatc tctgaagagg acctcatggt gagcaagggc | 1440 |
| gaggagctgt tcaccggggt ggtgcccatc ctggtcgagc tggacggcga cgtaaacggc | 1500 |
| cacaagttca gcgtgtccgg cgagggcgag ggcgatgcca cctacggcaa gctgaccctg | 1560 |
| aagttcatct gcaccaccgg caagctgccc gtgccctggc ccaccctcgt gaccaccctg | 1620 |

```
acctacggcg tgcagtgctt cagccgctac cccgaccaca tgaagcagca cgacttcttc    1680
aagtccgcca tgcccgaagg ctacgtccag gagcgcacca tcttcttcaa ggacgacggc    1740
aactacaaga cccgcgccga ggtgaagttc gagggcgaca ccctggtgaa ccgcatcgag    1800
ctgaagggca tcgacttcaa ggaggacggc aacatcctgg ggcacaagct ggagtacaac    1860
tacaacagcc acaacgtcta tatcatggcc gacaagcaga agaacggcat caaggtgaac    1920
ttcaagatcc gccacaacat cgaggacggc agcgtgcagc tcgccgacca ctaccagcag    1980 aacacccca tcggcgacgg ccccgtgctg ctgcccgaca accactacct gagcacccag    2040
tccgccctga gcaaagaccc caacgagaag cgcgatcaca tggtcctgct ggagttcgtg    2100
accgccgccg ggatcactct cggcatggac gagctgtaca ag                      2142
```

<210> SEQ ID NO 39
<211> LENGTH: 2517
<212> TYPE: DNA
<213> ORGANISM: Artificial sequence
<220> FEATURE:
<223> OTHER INFORMATION: Synthetic oligonucleotide

<400> SEQUENCE: 39

```
aacattatga tgacacagtc gccatcatct ctggctgtgt ctgcaggaga aaaggtcact     60
atgcgctgta agtccagtca aagtgtttta tacagttcaa atcagaagaa ctacttggcc    120
tggtaccagc agaaaccagg gcagtctcct aaactgctga tctactgggc atccactagg    180
gaatctggtg tccctgatcg cttcacaggc agtggatctg gacagattt tactcttacc    240 atcagcagtg tacaagctga gacctggca gtttattact gtcatcaatt cctctcctcg    300
tacacgttcg gaggggggac caagctggaa ataaaaggag gaggtggtag tggtggagga    360
ggaagtggag gaggaggaag tgaggtgcag ctgcaggagt ctggggctga gcttgtgagg    420 ccagggggcct tagtcaagtt gtcctgcaga gcttctggct tcaacattaa agactactat    480
atgcactggg tgaagcagag gcctgaacag ggcctggagt ggattggatg gattgatcct    540
gagaatggta attctatata tgaccccgaag ttccagggca aggccagtat aacagcagac    600
acatcctcca acacagccta cctgcagctc agcagcctga catctgagga cactgccgtc    660
tattactgtg ctgtagacct ttactacggt agagggactc tggtcactgt ctctgcaact    720
agtattgaag ttatgtatcc tcctcctac ctagacaatg agaagagcaa tggaaccatt    780
atccatgtga aagggaaaca cctttgtcca gtcccctat ttcccggacc ttctaagccc    840
ttttgggtgc tggtggtggt tggtggagtc ctggcttgct atagcttgct agtaacagtg    900
gcctttatta ttttctgggt tagaagtaaa agaagtaggc tacttcatag tgattacatg    960
aatatgactc ctcgacgacc tggtcccacc cgtaagcatt atcagcccta tgcaccacca    1020
cgagatttcg cagcctatcg ctccagagtt aaatttagca gaagtgcaga tgctcctgcg    1080
tataaacagg gtcaaaacca actatataat gaactaaatc taggacgaag agaagaatat    1140
gatgttttag ataaaagacg tggtcgagat cctgaaatgg gaggaaaacc tagaagaaaa    1200
aatcctcaag aaggcctata taatgaacta caaaaagata gatggcaga agcttatagt    1260 gaaattggaa tgaaaggaga acgtcgtaga ggtaaaggtc atgatggtct ttatcaaggt    1320
cttagtacag caacaaaaga tacatatgat gcacttcata tgcaagcact tccacctcgt    1380
ttcgaaggct ccggcgaggg cagaggcagt ctgctgacat cggtgacgt ggaagagaat    1440 cccggcccta tgcttctcct ggtgacaagc cttctgctct gtgagttacc acacccagca    1500
```

| | |
|---|---|
| ttcctccgca aagtgtgtaa cggaataggt attggtgaat ttaaagactc actctccata | 1560 |
| aatgctacga atattaaaca cttcaaaaac tgcacctcca tcagtggcga tctccacatc | 1620 |
| ctgccggtgg catttagggg tgactccttc acacatactc ctcctctaga tccacaggaa | 1680 |
| ctggatattc tgaaaaccgt aaaggaaatc acagggtttt tgctgattca ggcttggcct | 1740 |
| gaaaacagga cggacctcca tgcctttgag aacctagaaa tcatacgcgg caggaccaag | 1800 |
| caacatggtc agttttctct tgcagtcgtc agcctgaaca taacatcctt gggattacgc | 1860 |
| tccctcaagg agataagtga tggagatgtg ataatttcag gaaacaaaaa tttgtgctat | 1920 |
| gcaaatacaa taaactggaa aaaactgttt gggacctccg tcagaaaaac caaaattata | 1980 |
| agcaacagag gtgaaaacag ctgcaaggcc acaggccagg tctgccatgc cttgtgctcc | 2040 |
| cccgagggct gctggggccc ggagcccagg gactgcgtct cttgccggaa tgtcagccga | 2100 |
| ggcagggaat gcgtggacaa gtgcaacctt ctggagggtg agccaaggga gtttgtggag | 2160 |
| aactctgagt gcatacagtg ccacccagag tgcctgcctc aggccatgaa catcacctgc | 2220 |
| acaggacggg gaccagacaa ctgtatccag tgtgcccact acattgacgg cccccactgc | 2280 |
| gtcaagacct gcccggcagg agtcatggga gaaaacaaca ccctggtctg aagtacgca | 2340 |
| gacgccggcc atgtgtgcca cctgtgccat ccaaactgca cctacggatg cactgggcca | 2400 |
| ggtcttgaag ctgtccaac gaatgggcct aagatcccgt ccatcgccac tgggatggtg | 2460 |
| ggggccctcc tcttgctgct ggtggtggcc ctggggatcg gcctcttcat gcgaagg | 2517 |

<210> SEQ ID NO 40
<211> LENGTH: 1011
<212> TYPE: DNA
<213> ORGANISM: Artificial sequence
<220> FEATURE:
<223> OTHER INFORMATION: Synthetic oligonucleotide

<400> SEQUENCE: 40

| | |
|---|---|
| cgcaaagtgt gtaacggaat aggtattggt gaatttaaag actcactctc cataaatgct | 60 |
| acgaatatta aacacttcaa aaactgcacc tccatcagtg gcgatctcca tcctgccg | 120 |
| gtggcattta ggggtgactc cttcacacat actcctcctc tagatccaca ggaactggat | 180 |
| attctgaaaa ccgtaaagga atcacagggt ttttgctga ttcaggcttg gcctgaaaac | 240 |
| aggacggacc tccatgcctt tgagaaccta gaaatcatac gcggcaggac caagcaacat | 300 |
| ggtcagtttt ctcttgcagt cgtcagcctg aacataacat ccttgggatt acgctccctc | 360 |
| aaggagataa gtgatggaga tgtgataatt tcaggaaaca aaatttgtg ctatgcaaat | 420 |
| acaataaact ggaaaaaact gtttgggacc tccggtcaga aaccaaaat tataagcaac | 480 |
| agaggtgaaa acagctgcaa ggccacaggc caggtctgcc atgccttgtg ctcccccgag | 540 |
| ggctgctggg gcccggagcc cagggactgc gtctcttgcc ggaatgtcag ccgaggcagg | 600 |
| gaatgcgtgg acaagtgcaa ccttctggag gtgagccaa gggagtttgt ggagaactct | 660 |
| gagtgcatac agtgccaccc agagtgcctg cctcaggcca tgaacatcac ctgcacagga | 720 |
| cggggaccag acaactgtat ccagtgtgcc cactacattg acggccccca ctgcgtcaag | 780 |
| acctgcccgg caggagtcat gggagaaaac aacaccctgg tctggaagta cgcagacgcc | 840 |
| ggccatgtgt gccacctgtg ccatccaaac tgcacctacg gatgcactgg gccaggtctt | 900 |
| gaaggctgtc caacgaatgg gcctaagatc ccgtccatcg ccactgggat ggtgggggcc | 960 |
| ctcctcttgc tgctggtggt ggccctgggg atcggcctct tcatgcgaag g | 1011 |

<210> SEQ ID NO 41
<211> LENGTH: 337
<212> TYPE: PRT
<213> ORGANISM: Artificial sequence
<220> FEATURE:
<223> OTHER INFORMATION: Synthetic amino acid

<400> SEQUENCE: 41

```
Arg Lys Val Cys Asn Gly Ile Gly Ile Gly Glu Phe Lys Asp Ser Leu
1               5                   10                  15

Ser Ile Asn Ala Thr Asn Ile Lys His Phe Lys Asn Cys Thr Ser Ile
            20                  25                  30

Ser Gly Asp Leu His Ile Leu Pro Val Ala Phe Arg Gly Asp Ser Phe
        35                  40                  45

Thr His Thr Pro Pro Leu Asp Pro Gln Glu Leu Asp Ile Leu Lys Thr
    50                  55                  60

Val Lys Glu Ile Thr Gly Phe Leu Leu Ile Gln Ala Trp Pro Glu Asn
65                  70                  75                  80

Arg Thr Asp Leu His Ala Phe Glu Asn Leu Glu Ile Ile Arg Gly Arg
                85                  90                  95

Thr Lys Gln His Gly Gln Phe Ser Leu Ala Val Val Ser Leu Asn Ile
            100                 105                 110

Thr Ser Leu Gly Leu Arg Ser Leu Lys Glu Ile Ser Asp Gly Asp Val
        115                 120                 125

Ile Ile Ser Gly Asn Lys Asn Leu Cys Tyr Ala Asn Thr Ile Asn Trp
    130                 135                 140

Lys Lys Leu Phe Gly Thr Ser Gly Gln Lys Thr Lys Ile Ile Ser Asn
145                 150                 155                 160

Arg Gly Glu Asn Ser Cys Lys Ala Thr Gly Gln Val Cys His Ala Leu
                165                 170                 175

Cys Ser Pro Glu Gly Cys Trp Gly Pro Glu Pro Arg Asp Cys Val Ser
            180                 185                 190

Cys Arg Asn Val Ser Arg Gly Arg Glu Cys Val Asp Lys Cys Asn Leu
        195                 200                 205

Leu Glu Gly Glu Pro Arg Glu Phe Val Glu Asn Ser Glu Cys Ile Gln
    210                 215                 220

Cys His Pro Glu Cys Leu Pro Gln Ala Met Asn Ile Thr Cys Thr Gly
225                 230                 235                 240

Arg Gly Pro Asp Asn Cys Ile Gln Cys Ala His Tyr Ile Asp Gly Pro
                245                 250                 255

His Cys Val Lys Thr Cys Pro Ala Gly Val Met Gly Glu Asn Asn Thr
            260                 265                 270

Leu Val Trp Lys Tyr Ala Asp Ala Gly His Val Cys His Leu Cys His
        275                 280                 285

Pro Asn Cys Thr Tyr Gly Cys Thr Gly Pro Gly Leu Glu Gly Cys Pro
    290                 295                 300

Thr Asn Gly Pro Lys Ile Pro Ser Ile Ala Thr Gly Met Val Gly Ala
305                 310                 315                 320

Leu Leu Leu Leu Leu Val Val Ala Leu Gly Ile Gly Leu Phe Met Arg
                325                 330                 335

Arg
```

<210> SEQ ID NO 42
<211> LENGTH: 63
<212> TYPE: DNA
<213> ORGANISM: Artificial sequence
<220> FEATURE:
<223> OTHER INFORMATION: Synthetic oligonucleotide

<400> SEQUENCE: 42
atggccctgc ctgtgacagc cctgctgctg cctctggctc tgctgctgca tgccgctaga    60
ccc                                                                  63

<210> SEQ ID NO 43
<211> LENGTH: 21
<212> TYPE: PRT
<213> ORGANISM: Artificial sequence
<220> FEATURE:
<223> OTHER INFORMATION: Synthetic amino acid

<400> SEQUENCE: 43

Met Ala Leu Pro Val Thr Ala Leu Leu Leu Pro Leu Ala Leu Leu Leu
1               5                   10                  15

His Ala Ala Arg Pro
            20

<210> SEQ ID NO 44
<211> LENGTH: 15
<212> TYPE: DNA
<213> ORGANISM: Artificial sequence
<220> FEATURE:
<223> OTHER INFORMATION: Synthetic oligonucleotide

<400> SEQUENCE: 44
ggtggcggag gttct                                                     15

<210> SEQ ID NO 45
<211> LENGTH: 5
<212> TYPE: PRT
<213> ORGANISM: Artificial sequence
<220> FEATURE:
<223> OTHER INFORMATION: Synthetic amino acid

<400> SEQUENCE: 45

Gly Gly Gly Gly Ser
1               5

<210> SEQ ID NO 46
<211> LENGTH: 30
<212> TYPE: DNA
<213> ORGANISM: Artificial sequence
<220> FEATURE:
<223> OTHER INFORMATION: Synthetic oligonucleotide

<400> SEQUENCE: 46
ggtggcggag gttctggagg tggaggttcc                                     30

<210> SEQ ID NO 47
<211> LENGTH: 10
<212> TYPE: PRT
<213> ORGANISM: Artificial sequence
<220> FEATURE:
<223> OTHER INFORMATION: Synthetic amino acid

<400> SEQUENCE: 47

Gly Gly Gly Gly Ser Gly Gly Gly Gly Ser
1               5                   10

<210> SEQ ID NO 48
<211> LENGTH: 45
<212> TYPE: DNA

<213> ORGANISM: Artificial sequence
<220> FEATURE:
<223> OTHER INFORMATION: Synthetic oligonucleotide

<400> SEQUENCE: 48
ggaggaggtg gtagtggtgg aggaggaagt ggaggaggag gaagt         45

<210> SEQ ID NO 49
<211> LENGTH: 15
<212> TYPE: PRT
<213> ORGANISM: Artificial sequence
<220> FEATURE:
<223> OTHER INFORMATION: Synthetic amino acid

<400> SEQUENCE: 49

Gly Gly Gly Gly Ser Gly Gly Gly Gly Ser Gly Gly Gly Gly Ser
1               5                   10                  15

<210> SEQ ID NO 50
<211> LENGTH: 60
<212> TYPE: DNA
<213> ORGANISM: Artificial sequence
<220> FEATURE:
<223> OTHER INFORMATION: Synthetic oligonucleotide

<400> SEQUENCE: 50
ggaggaggtg gtagtggtgg aggaggaagt ggtggcggag gttctggagg tggaggttcc    60

<210> SEQ ID NO 51
<211> LENGTH: 20
<212> TYPE: PRT
<213> ORGANISM: Artificial sequence
<220> FEATURE:
<223> OTHER INFORMATION: Synthetic amino acid

<400> SEQUENCE: 51

Gly Gly Gly Gly Ser Gly Gly Gly Gly Ser Gly Gly Gly Gly Ser Gly
1               5                   10                  15

Gly Gly Gly Ser
            20

<210> SEQ ID NO 52
<211> LENGTH: 135
<212> TYPE: DNA
<213> ORGANISM: Artificial sequence
<220> FEATURE:
<223> OTHER INFORMATION: Synthetic oligonucleotide

<400> SEQUENCE: 52
acaactactc cagcaccacg accaccaaca cctgctccaa ctatcgcatc tcaaccactt    60
tctctacgtc cagaagcatg ccgaccagct gcaggaggtg cagttcatac gagaggtcta   120
gatttcgcat gtgat                                                    135

<210> SEQ ID NO 53
<211> LENGTH: 45
<212> TYPE: PRT
<213> ORGANISM: Artificial sequence
<220> FEATURE:
<223> OTHER INFORMATION: Synthetic amino acid

<400> SEQUENCE: 53

Thr Thr Thr Pro Ala Pro Arg Pro Pro Thr Pro Ala Pro Thr Ile Ala
1               5                   10                  15

Ser Gln Pro Leu Ser Leu Arg Pro Glu Ala Cys Arg Pro Ala Ala Gly

```
              20                  25                  30
Gly Ala Val His Thr Arg Gly Leu Asp Phe Ala Cys Asp
        35                  40                  45

<210> SEQ ID NO 54
<211> LENGTH: 141
<212> TYPE: DNA
<213> ORGANISM: Artificial sequence
<220> FEATURE:
<223> OTHER INFORMATION: Synthetic oligonucleotide

<400> SEQUENCE: 54
aagcccacaa ctactccagc accacgacca ccaacacctg ctccaactat cgcatctcaa      60
ccactttctc tacgtccaga agcatgccga ccagctgcag gaggtgcagt tcatacgaga     120
ggtctagatt tcgcatgtga t                                               141

<210> SEQ ID NO 55
<211> LENGTH: 47
<212> TYPE: PRT
<213> ORGANISM: Artificial sequence
<220> FEATURE:
<223> OTHER INFORMATION: Synthetic amino acid

<400> SEQUENCE: 55

Lys Pro Thr Thr Thr Pro Ala Pro Arg Pro Pro Thr Pro Ala Pro Thr
1               5                   10                  15

Ile Ala Ser Gln Pro Leu Ser Leu Arg Pro Glu Ala Cys Arg Pro Ala
            20                  25                  30

Ala Gly Gly Ala Val His Thr Arg Gly Leu Asp Phe Ala Cys Asp
        35                  40                  45

<210> SEQ ID NO 56
<211> LENGTH: 174
<212> TYPE: DNA
<213> ORGANISM: Artificial sequence
<220> FEATURE:
<223> OTHER INFORMATION: Synthetic oligonucleotide

<400> SEQUENCE: 56
ttcagccact tcgtgccggt cttcctgcca gcgaagccca caactactcc agcaccacga      60
ccaccaacac ctgctccaac tatcgcatct caaccacttt ctctacgtcc agaagcatgc     120
cgaccagctg caggaggtgc agttcatacg agaggtctag atttcgcatg tgat           174

<210> SEQ ID NO 57
<211> LENGTH: 58
<212> TYPE: PRT
<213> ORGANISM: Artificial sequence
<220> FEATURE:
<223> OTHER INFORMATION: Synthetic amino acid

<400> SEQUENCE: 57

Phe Ser His Phe Val Pro Val Phe Leu Pro Ala Lys Pro Thr Thr Thr
1               5                   10                  15

Pro Ala Pro Arg Pro Pro Thr Pro Ala Pro Thr Ile Ala Ser Gln Pro
            20                  25                  30

Leu Ser Leu Arg Pro Glu Ala Cys Arg Pro Ala Ala Gly Gly Ala Val
        35                  40                  45

His Thr Arg Gly Leu Asp Phe Ala Cys Asp
    50                  55
```

<210> SEQ ID NO 58
<211> LENGTH: 72
<212> TYPE: DNA
<213> ORGANISM: Artificial sequence
<220> FEATURE:
<223> OTHER INFORMATION: Synthetic oligonucleotide

<400> SEQUENCE: 58
attgaagtta tgtatcctcc tccttaccta gacaatgaga agagcaatgg aaccattatc    60
catgtgaaag gg                                                        72

<210> SEQ ID NO 59
<211> LENGTH: 24
<212> TYPE: PRT
<213> ORGANISM: Artificial sequence
<220> FEATURE:
<223> OTHER INFORMATION: Synthetic amino acid

<400> SEQUENCE: 59

Ile Glu Val Met Tyr Pro Pro Pro Tyr Leu Asp Asn Glu Lys Ser Asn
1               5                   10                  15

Gly Thr Ile Ile His Val Lys Gly
            20

<210> SEQ ID NO 60
<211> LENGTH: 36
<212> TYPE: DNA
<213> ORGANISM: Artificial sequence
<220> FEATURE:
<223> OTHER INFORMATION: Synthetic oligonucleotide

<400> SEQUENCE: 60
gagtccaaat atggtccccc atgcccatca tgccca                              36

<210> SEQ ID NO 61
<211> LENGTH: 12
<212> TYPE: PRT
<213> ORGANISM: Artificial sequence
<220> FEATURE:
<223> OTHER INFORMATION: Synthetic amino acid

<400> SEQUENCE: 61

Glu Ser Lys Tyr Gly Pro Pro Cys Pro Ser Cys Pro
1               5                   10

<210> SEQ ID NO 62
<211> LENGTH: 369
<212> TYPE: DNA
<213> ORGANISM: Artificial sequence
<220> FEATURE:
<223> OTHER INFORMATION: Synthetic oligonucleotide

<400> SEQUENCE: 62
gagtccaaat atggtccccc atgcccatca tgcccagcac ctgagttcct ggggggacca    60
tcagtcttcc tgttcccccc aaaacccaag gacactctca tgatctcccg gacccctgag   120
gtcacgtgcg tggtggtgga cgtgagccag gaagaccccg aggtccagtt caactggtac   180
gtggatggcg tggaggtgca taatgccaag acaaagccgc gggaggagca gttccaaagc   240
acgtaccgtg tggtcagcgt cctcaccgtc ctgcaccagg actggctgaa cggcaaggag   300
tacaagtgca aggtctccaa caaaggcctc ccgtcctcca tcgagaaaac catctccaaa   360
gccaaaggg                                                           369

<210> SEQ ID NO 63
<211> LENGTH: 123
<212> TYPE: PRT
<213> ORGANISM: Artificial sequence
<220> FEATURE:
<223> OTHER INFORMATION: Synthetic amino acid

<400> SEQUENCE: 63

```
Glu Ser Lys Tyr Gly Pro Pro Cys Pro Ser Cys Pro Ala Pro Glu Phe
1               5                   10                  15

Leu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Asn Ala Lys Thr Lys Pro Arg Glu Gln Phe Gln Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly
        115                 120
```

<210> SEQ ID NO 64
<211> LENGTH: 687
<212> TYPE: DNA
<213> ORGANISM: Artificial sequence
<220> FEATURE:
<223> OTHER INFORMATION: Synthetic oligonucleotide

<400> SEQUENCE: 64

```
gagtccaaat atggtccccc atgcccatca tgcccagcac ctgagttcct ggggggacca      60
tcagtcttcc tgttcccccc aaaacccaag gacactctca tgatctcccg gacccctgag    120
gtcacgtgcg tggtggtgga cgtgagccag gaagaccccg aggtccagtt caactggtac    180
gtggatggcg tggaggtgca taatgccaag acaaagccgc gggaggagca gttccaaagc    240
acgtaccgtg tggtcagcgt cctcaccgtc ctgcaccagg actggctgaa cggcaaggag    300
tacaagtgca aggtctccaa caaaggcctc ccgtcctcca tcgagaaaac catctccaaa    360
gccaaagggc agccccgaga gccacaggtg tacaccctgc ccccatccca ggaggagatg    420
accaagaacc aggtcagcct gacctgcctg gtcaaaggct tctacccag cgacatcgcc    480
gtggagtggg agagcaatgg gcagccggag aacaactaca agaccacgcc tcccgtgctg    540
gactccgacg gctccttctt cctctacagc aggctcaccg tggacaagag caggtggcag    600
caggggaatg tcttctcatg ctccgtgatg catgaggctc tgcacaacca ctacacacag    660
aagagcctct ccctgtctcc gggtaaa                                        687
```

<210> SEQ ID NO 65
<211> LENGTH: 229
<212> TYPE: PRT
<213> ORGANISM: Artificial sequence
<220> FEATURE:
<223> OTHER INFORMATION: Synthetic amino acid

<400> SEQUENCE: 65

```
Glu Ser Lys Tyr Gly Pro Pro Cys Pro Ser Cys Pro Ala Pro Glu Phe
1               5                   10                  15
```

Leu Gly Gly Pro Ser Val Phe Leu Phe Pro Pro Lys Pro Lys Asp Thr
                20                  25                  30

Leu Met Ile Ser Arg Thr Pro Glu Val Thr Cys Val Val Val Asp Val
            35                  40                  45

Ser Gln Glu Asp Pro Glu Val Gln Phe Asn Trp Tyr Val Asp Gly Val
50                  55                  60

Glu Val His Asn Ala Lys Thr Lys Pro Arg Glu Glu Gln Phe Gln Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Ser Gln Glu Glu Met Thr Lys Asn Gln
130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
210                 215                 220

Leu Ser Pro Gly Lys
225

<210> SEQ ID NO 66
<211> LENGTH: 981
<212> TYPE: DNA
<213> ORGANISM: Artificial sequence
<220> FEATURE:
<223> OTHER INFORMATION: Synthetic oligonucleotide

<400> SEQUENCE: 66
gctagcacca agggcccatc ggtcttcccc ctggcgccct gctccaggag cacctccgag      60
agcacagccg ccctgggctg cctggtcaag gactacttcc ccgaaccggt gacggtgtcg     120
tggaactcag gcgccctgac cagcggcgtg cacaccttcc cggctgtcct acagtcctca     180
ggactctact ccctcagcag cgtggtgacc gtgccctcca gcagcttggg cacgaagacc     240
tacacctgca acgtagatca caagcccagc aacaccaagg tggacaagag agttgagtcc     300
aaatatggtc ccccatgccc atcatgccca gcacctgagt tcctgggggg accatcagtc     360
ttcctgttcc cccaaaaacc caaggacact ctcatgatct cccggacccc tgaggtcacg     420
tgcgtggtgg tggacgtgag ccaggaagac cccgaggtcc agttcaactg gtacgtggat     480
ggcgtggagg tgcataatgc caagacaaag ccgcgggagg agcagttcca aagcacgtac     540
cgtgtggtca gcgtcctcac cgtcctgcac caggactggc tgaacggcaa ggagtacaag     600
tgcaaggtct ccaacaaagg cctcccgtcc tccatcgaga aaaccatctc caaagccaaa     660
gggcagcccc gagagccaca ggtgtacacc ctgcccccat cccaggagga gatgaccaag     720
aaccaggtca gcctgacctg cctggtcaaa ggcttctacc ccagcgacat cgccgtggag     780

-continued

```
tgggagagca atgggcagcc ggagaacaac tacaagacca cgcctcccgt gctggactcc    840
gacggctcct tcttcctcta cagcaggctc accgtggaca agagcaggtg gcaggagggg    900
aatgtcttct catgctccgt gatgcatgag gctctgcaca accactacac acagaagagc    960
ctctccctgt ctccgggtaa a                                              981
```

<210> SEQ ID NO 67
<211> LENGTH: 327
<212> TYPE: PRT
<213> ORGANISM: Artificial sequence
<220> FEATURE:
<223> OTHER INFORMATION: Synthetic amino acid
<400> SEQUENCE: 67

```
Ala Ser Thr Lys Gly Pro Ser Val Phe Pro Leu Ala Pro Cys Ser Arg
 1               5                  10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Ser Cys Pro Ala Pro
            100                 105                 110

Glu Phe Leu Gly Gly Pro Ser Val Phe Leu Phe Pro Pro Lys Pro Lys
        115                 120                 125

Asp Thr Leu Met Ile Ser Arg Thr Pro Glu Val Thr Cys Val Val Val
    130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

Gln Ser Thr Tyr Arg Val Val Ser Val Leu Thr Val Leu His Gln Asp
            180                 185                 190

Trp Leu Asn Gly Lys Glu Tyr Lys Cys Lys Val Ser Asn Lys Gly Leu
        195                 200                 205

Pro Ser Ser Ile Glu Lys Thr Ile Ser Lys Ala Lys Gly Gln Pro Arg
    210                 215                 220

Glu Pro Gln Val Tyr Thr Leu Pro Pro Ser Gln Glu Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
            260                 265                 270

Thr Thr Pro Pro Val Leu Asp Ser Asp Gly Ser Phe Phe Leu Tyr Ser
        275                 280                 285

Arg Leu Thr Val Asp Lys Ser Arg Trp Gln Glu Gly Asn Val Phe Ser
    290                 295                 300

Cys Ser Val Met His Glu Ala Leu His Asn His Tyr Thr Gln Lys Ser
305                 310                 315                 320

Leu Ser Leu Ser Pro Gly Lys
```

<210> SEQ ID NO 68
<211> LENGTH: 72
<212> TYPE: DNA
<213> ORGANISM: Artificial sequence
<220> FEATURE:
<223> OTHER INFORMATION: Synthetic oligonucleotide

<400> SEQUENCE: 68
atctacatct gggcaccatt ggctgggact tgtggtgtcc ttctcctatc actggttatc    60 acccttact gc    72

<210> SEQ ID NO 69
<211> LENGTH: 24
<212> TYPE: PRT
<213> ORGANISM: Artificial sequence
<220> FEATURE:
<223> OTHER INFORMATION: Synthetic amino acid

<400> SEQUENCE: 69

Ile Tyr Ile Trp Ala Pro Leu Ala Gly Thr Cys Gly Val Leu Leu Leu
1               5                   10                  15

Ser Leu Val Ile Thr Leu Tyr Cys
            20

<210> SEQ ID NO 70
<211> LENGTH: 84
<212> TYPE: DNA
<213> ORGANISM: Artificial sequence
<220> FEATURE:
<223> OTHER INFORMATION: Synthetic oligonucleotide

<400> SEQUENCE: 70
atctacatct gggcaccatt ggctgggact tgtggtgtcc ttctcctatc actggttatc    60 acccttact gcaaccacag gaac    84

<210> SEQ ID NO 71
<211> LENGTH: 28
<212> TYPE: PRT
<213> ORGANISM: Artificial sequence
<220> FEATURE:
<223> OTHER INFORMATION: Synthetic amino acid

<400> SEQUENCE: 71

Ile Tyr Ile Trp Ala Pro Leu Ala Gly Thr Cys Gly Val Leu Leu Leu
1               5                   10                  15

Ser Leu Val Ile Thr Leu Tyr Cys Asn His Arg Asn
            20                  25

<210> SEQ ID NO 72
<211> LENGTH: 120
<212> TYPE: DNA
<213> ORGANISM: Artificial sequence
<220> FEATURE:
<223> OTHER INFORMATION: Synthetic oligonucleotide

<400> SEQUENCE: 72
aaacaccttt gtccaagtcc cctatttccc ggaccttcta agccctttttg ggtgctggtg    60 gtggttggtg gagtcctggc ttgctatagc ttgctagtaa cagtggcctt tattattttc   120

<210> SEQ ID NO 73
<211> LENGTH: 40

```
<212> TYPE: PRT
<213> ORGANISM: Artificial sequence
<220> FEATURE:
<223> OTHER INFORMATION: Synthetic amino acid

<400> SEQUENCE: 73

Lys His Leu Cys Pro Ser Pro Leu Phe Pro Gly Pro Ser Lys Pro Phe
1               5                   10                  15

Trp Val Leu Val Val Val Gly Gly Val Leu Ala Cys Tyr Ser Leu Leu
            20                  25                  30

Val Thr Val Ala Phe Ile Ile Phe
        35                  40

<210> SEQ ID NO 74
<211> LENGTH: 123
<212> TYPE: DNA
<213> ORGANISM: Artificial sequence
<220> FEATURE:
<223> OTHER INFORMATION: Synthetic oligonucleotide

<400> SEQUENCE: 74
agaagtaaaa gaagtaggct acttcatagt gattacatga atatgactcc tcgacgacct     60
ggtcccaccc gtaagcatta tcagccctat gcaccaccac gagatttcgc agcctatcgc    120
tcc                                                                  123

<210> SEQ ID NO 75
<211> LENGTH: 41
<212> TYPE: PRT
<213> ORGANISM: Artificial sequence
<220> FEATURE:
<223> OTHER INFORMATION: Synthetic amino acid

<400> SEQUENCE: 75

Arg Ser Lys Arg Ser Arg Leu Leu His Ser Asp Tyr Met Asn Met Thr
1               5                   10                  15

Pro Arg Arg Pro Gly Pro Thr Arg Lys His Tyr Gln Pro Tyr Ala Pro
            20                  25                  30

Pro Arg Asp Phe Ala Ala Tyr Arg Ser
        35                  40

<210> SEQ ID NO 76
<211> LENGTH: 126
<212> TYPE: DNA
<213> ORGANISM: Artificial sequence
<220> FEATURE:
<223> OTHER INFORMATION: Synthetic oligonucleotide

<400> SEQUENCE: 76
aaacgaggta gaaaaaaact tctttatata ttcaaacaac catttatgag accagtacaa     60
actactcaag aggaagatgg atgtagttgt cgatttccag aagaagaaga aggaggatgt    120
gaactg                                                               126

<210> SEQ ID NO 77
<211> LENGTH: 112
<212> TYPE: PRT
<213> ORGANISM: Artificial sequence
<220> FEATURE:
<223> OTHER INFORMATION: Synthetic amino acid

<400> SEQUENCE: 77

Arg Val Lys Phe Ser Arg Ser Ala Asp Ala Pro Ala Tyr Lys Gln Gly
1               5                   10                  15
```

```
Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Asn Glu Leu Gln Lys
50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110
```

<210> SEQ ID NO 78
<211> LENGTH: 111
<212> TYPE: DNA
<213> ORGANISM: Artificial sequence
<220> FEATURE:
<223> OTHER INFORMATION: Synthetic oligonucleotide

<400> SEQUENCE: 78

```
aggcgcgacc agcggctgcc acctgatgca cacaagccac caggaggagg ctctttccgg    60
accccaatcc aggaggagca ggcagacgca cacagcacac tggccaagat c           111
```

<210> SEQ ID NO 79
<211> LENGTH: 37
<212> TYPE: PRT
<213> ORGANISM: Artificial sequence
<220> FEATURE:
<223> OTHER INFORMATION: Synthetic amino acid

<400> SEQUENCE: 79

```
Arg Arg Asp Gln Arg Leu Pro Pro Asp Ala His Lys Pro Pro Gly Gly
1               5                   10                  15

Gly Ser Phe Arg Thr Pro Ile Gln Glu Glu Gln Ala Asp Ala His Ser
            20                  25                  30

Thr Leu Ala Lys Ile
        35
```

<210> SEQ ID NO 80
<211> LENGTH: 336
<212> TYPE: DNA
<213> ORGANISM: Artificial sequence
<220> FEATURE:
<223> OTHER INFORMATION: Synthetic oligonucleotide

<400> SEQUENCE: 80

```
agagttaaat ttagcagaag tgcagatgct cctgcgtata acagggtca aaaccaacta     60 tataatgaac taaatctagg acgaagagaa gaatatgatg ttttagataa agacgtggt    120 cgagatcctg aaatgggagg aaaacctaga agaaaaaatc ctcaagaagg cctatataat   180
gaactacaaa agataagat ggcagaagct tatagtgaaa ttggaatgaa aggagaacgt    240
cgtagaggta aggtcatga tggtctttat caaggtctta gtacagcaac aaaagataca    300
tatgatgcac ttcatatgca agcacttcca cctcgt                              336
```

<210> SEQ ID NO 81
<211> LENGTH: 111
<212> TYPE: PRT
<213> ORGANISM: Artificial sequence
<220> FEATURE:
<223> OTHER INFORMATION: Synthetic amino acid

<400> SEQUENCE: 81

Arg Val Lys Phe Ser Arg Ser Ala Asp Ala Pro Ala Tyr Lys Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Glu Leu Gln Lys Asp
    50                  55                  60

Lys Met Ala Glu Ala Tyr Ser Glu Ile Gly Met Lys Gly Glu Arg Arg
65                  70                  75                  80

Arg Gly Lys Gly His Asp Gly Leu Tyr Gln Gly Leu Ser Thr Ala Thr
                85                  90                  95

Lys Asp Thr Tyr Asp Ala Leu His Met Gln Ala Leu Pro Pro Arg
            100                 105                 110

<210> SEQ ID NO 82
<211> LENGTH: 717
<212> TYPE: DNA
<213> ORGANISM: Artificial sequence
<220> FEATURE:
<223> OTHER INFORMATION: Synthetic oligonucleotide

<400> SEQUENCE: 82
atggtgagca agggcgagga gctgttcacc ggggtggtgc ccatcctggt cgagctggac       60
ggcgacgtaa acggccacaa gttcagcgtg tccggcgagg gcgagggcga tgccacctac      120
ggcaagctga ccctgaagtt catctgcacc accggcaagc tgcccgtgcc ctggcccacc      180
ctcgtgacca ccctgaccta cggcgtgcag tgcttcagcc gctaccccga ccacatgaag      240
cagcacgact tcttcaagtc cgccatgccc gaaggctacg tccaggagcg caccatcttc      300
ttcaaggacg acggcaacta caagacccgc gccgaggtga agttcgaggg cgacaccctg      360
gtgaaccgca tcgagctgaa gggcatcgac ttcaaggagg acggcaacat cctgggcac       420 aagctggagt acaactacaa cagccacaac gtctatatca tggccgacaa gcagaagaac      480
ggcatcaagg tgaacttcaa gatccgccac aacatcgagg acggcagcgt gcagctcgcc      540
gaccactacc agcagaacac ccccatcggc gacggccccg tgctgctgcc cgacaaccac      600
tacctgagca cccagtccgc cctgagcaaa gaccccaacg agaagcgcga tcacatggtc      660
ctgctggagt tcgtgaccgc cgccgggatc actctcggca tggacgagct gtacaag         717

<210> SEQ ID NO 83
<211> LENGTH: 239
<212> TYPE: PRT
<213> ORGANISM: Artificial sequence
<220> FEATURE:
<223> OTHER INFORMATION: Synthetic amino acid

<400> SEQUENCE: 83

Met Val Ser Lys Gly Glu Glu Leu Phe Thr Gly Val Val Pro Ile Leu
1               5                   10                  15

Val Glu Leu Asp Gly Asp Val Asn Gly His Lys Phe Ser Val Ser Gly
            20                  25                  30

Glu Gly Glu Gly Asp Ala Thr Tyr Gly Lys Leu Thr Leu Lys Phe Ile
        35                  40                  45

Cys Thr Thr Gly Lys Leu Pro Val Pro Trp Pro Thr Leu Val Thr Thr
        50                  55                  60

Leu Thr Tyr Gly Val Gln Cys Phe Ser Arg Tyr Pro Asp His Met Lys
 65                  70                  75                  80

Gln His Asp Phe Phe Lys Ser Ala Met Pro Glu Gly Tyr Val Gln Glu
                 85                  90                  95

Arg Thr Ile Phe Phe Lys Asp Asp Gly Asn Tyr Lys Thr Arg Ala Glu
            100                 105                 110

Val Lys Phe Glu Gly Asp Thr Leu Val Asn Arg Ile Glu Leu Lys Gly
        115                 120                 125

Ile Asp Phe Lys Glu Asp Gly Asn Ile Leu Gly His Lys Leu Glu Tyr
    130                 135                 140

Asn Tyr Asn Ser His Asn Val Tyr Ile Met Ala Asp Lys Gln Lys Asn
145                 150                 155                 160

Gly Ile Lys Val Asn Phe Lys Ile Arg His Asn Ile Glu Asp Gly Ser
                165                 170                 175

Val Gln Leu Ala Asp His Tyr Gln Gln Asn Thr Pro Ile Gly Asp Gly
            180                 185                 190

Pro Val Leu Leu Pro Asp Asn His Tyr Leu Ser Thr Gln Ser Ala Leu
        195                 200                 205

Ser Lys Asp Pro Asn Glu Lys Arg Asp His Met Val Leu Leu Glu Phe
210                 215                 220

Val Thr Ala Ala Gly Ile Thr Leu Gly Met Asp Glu Leu Tyr Lys
225                 230                 235

<210> SEQ ID NO 84
<211> LENGTH: 54
<212> TYPE: DNA
<213> ORGANISM: Artificial sequence
<220> FEATURE:
<223> OTHER INFORMATION: Synthetic oligonucleotide

<400> SEQUENCE: 84
gagggcagag gcagtctgct gacatgcggt gacgtggaag agaatcccgg ccct        54

<210> SEQ ID NO 85
<211> LENGTH: 18
<212> TYPE: PRT
<213> ORGANISM: Artificial sequence
<220> FEATURE:
<223> OTHER INFORMATION: Synthetic amino acid

<400> SEQUENCE: 85

Glu Gly Arg Gly Ser Leu Leu Thr Cys Gly Asp Val Glu Glu Asn Pro
 1               5                  10                  15

Gly Pro

<210> SEQ ID NO 86
<211> LENGTH: 2115
<212> TYPE: DNA
<213> ORGANISM: Artificial sequence
<220> FEATURE:
<223> OTHER INFORMATION: Synthetic oligonucleotide

<400> SEQUENCE: 86
caaattgttc tcacccagtc tccagcaatc atgtctgcat ctccagggga gaaggtcacc        60
atgacctgca gtgccagctc aagtgtaagt tacatgtggt ggtaccacca gaagccagga      120
tcctccccca gactcctgat ttttgacaca tccaacctgg cttctggagt ccctgttcgc      180

```
ttcagtggca gtgggtctgg gacctcttac tctctcacaa tcagccgaat ggaggctgaa    240
gatgctgcca cttattactg ccagcagtgg actagttacc cgtacacgtt cggagggggg    300
accaagctgg aaataaaagg aggaggtggt agtggtggag aggaagtggg aggaggagga    360
agtgaggtgc agctgcagga gtctggacct gagctgaaga agcctggaga gacagtcaag    420
atctcctgca aggcttctgg ttataccttc acagactatt caatgcactg ggtgaagcag    480
gctccaggaa agggtttaaa gtggatgggc tggataaaca ctgagactgg tgagccaaca    540
tatgcagatg acttcaaggg acggtttgcc ttctctttgg aaacctctgc cagcactgcc    600
tatttgcaga tcaacaacct caaaaatgat gacacggcta catatttctg taatatggac    660
tcctggggtc aaggaacctc agtcaccgtc tcctcaacaa ctactccagc accacgacca    720
ccaacacctg ctccaactat cgcatctcaa ccactttctc tacgtccaga agcatgccga    780
ccagctgcag gaggtgcagt tcatacgaga ggtctagatt tcgcatgtga tatctacatc    840
tgggcaccat ggctgggac ttgtggtgtc cttctcctat cactggttat cacccttac      900
tgctgggtta agagtaaaag aagtaggcta cttcatagtg attacatgaa tatgactcct    960
cgacgacctg gtcccacccg taagcattat cagccctatg caccaccacg agatttcgca   1020
gcctatcgct ccagagttaa atttagcaga agtgcagatg ctcctgcgta taacagggt    1080
caaaaccaac tatataatga actaaatcta ggacgaagag aagaatatga tgttttagat   1140
aaaagacgtg gtcgagatcc tgaaatggga ggaaaaccta aagaaaaaa tcctcaagaa    1200
ggcctatata atgaactaca aaaagataag atggcagaag cttatagtga aattggaatg   1260
aaaggagaac gtcgtagagg taaaggtcat gatggtcttt atcaaggtct tagtacagca   1320
acaaaagata catatgatgc acttcatatg caagcacttc cacctcgtga gcaaaaactt   1380
atctctgaag aggacctcat ggtgagcaag ggcgaggagc tgttcaccgg ggtggtgccc   1440
atcctggtcg agctggacgg cgacgtaaac ggccacaagt tcagcgtgtc cggcgagggc   1500
gagggcgatg ccacctacgg caagctgacc ctgaagttca tctgcaccac cggcaagctg   1560
cccgtgccct ggcccaccct cgtgaccacc ctgacctacg gcgtgcagtg cttcagccgc   1620
taccccgacc acatgaagca gcacgacttc ttcaagtccg ccatgcccga aggctacgtc   1680
caggagcgca ccatcttctt caaggacgac ggcaactaca agacccgcgc cgaggtgaag   1740
ttcgagggcg acaccctggt gaaccgcatc gagctgaagg gcatcgactt caaggaggac   1800
ggcaacatcc tggggcacaa gctggagtac aactacaaca gccacaacgt ctatatcatg   1860
gccgacaagc agaagaacgg catcaaggtg aacttcaaga tccgccacaa catcgaggac   1920
ggcagcgtgc agctcgccga ccactaccag cagaacaccc ccatcggcga cggccccgtg   1980
ctgctgcccg acaaccacta cctgagcacc cagtccgccc tgagcaaaga ccccaacgag   2040
aagcgcgatc acatggtcct gctggagttc gtgaccgccg ccgggatcac tctcggcatg   2100
gacgagctgt acaag                                                   2115
```

<210> SEQ ID NO 87
<211> LENGTH: 2151
<212> TYPE: DNA
<213> ORGANISM: Artificial sequence
<220> FEATURE:
<223> OTHER INFORMATION: Synthetic oligonucleotide

<400> SEQUENCE: 87

```
gacattgtgc tgacacagtc tcctgcttcc ttagctgtat ctctggggca gagggccacc     60
atctcataca gggccagcaa aagtgtcagt acatctggct atagttatat gcactggaac    120
```

```
caacagaaac caggacagcc acccagactc ctcatctatc ttgtatccaa cctagaatct    180
ggggtccctg ccaggttcag tggcagtggg tctgggacag acttcaccct caacatccat    240
cctgtggagg aggaggatgc tgcaacctat tactgtcagc acattaggga gcttacacgt    300
tcggaggggg gaccaagctg aaaggagga ggtggtagtg gtggaggagg aagtggagga     360
ggaggaagtc aggtccaact gcagcagcct ggggctgagc ttgtgaagcc tggggctcca    420
gtgaagctgt cctgcaaggc ttctggctac accttcacca gctactgggt gaactgggtg    480
aagcagaggc ctggacgagg cctcgagtgg attggaagga ttgatccttc cgatagtgaa    540
actcactaca atcaaaagtt caaggacaag gccacactga ctgtagacaa atcctccagc    600
acagcctaca tccaactcag cagcctgaca tctgaggact ctgcggtcta ttactgtgca    660
agatggacta tggtagtagt tacgatgct atggactact ggggtcaagg aacctcagtc     720
accgtctcct caacaactac tccagcacca cgaccaccaa cacctgctcc aactatcgca    780
tctcaaccac tttctctacg tccagaagca tgccgaccag ctgcaggagg tgcagttcat    840
acgagaggtc tagatttcgc atgtgatatc tacatctggg caccattggc tgggacttgt    900
ggtgtccttc tcctatcact ggttatcacc ctttactgct gggttagaag taaaagaagt    960
aggctacttc atagtgatta catgaatatg actcctcgac gacctggtcc cacccgtaag   1020
cattatcagc cctatgcacc accacgagat ttcgcagcct atcgctccag agttaaattt   1080
agcagaagtg cagatgctcc tgcgtataaa cagggtcaaa accaactata taatgaacta   1140
aatctaggac gaagagaaga atatgatgtt ttagataaaa gacgtggtcg agatcctgaa   1200
atgggaggaa aacctagaag aaaaaatcct caagaaggcc tatataatga actacaaaaa   1260
gataagatgg cagaagctta tagtgaaatt ggaatgaaag gagaacgtcg tagaggtaaa   1320
ggtcatgatg gtctttatca aggtcttagt acagcaacaa aagatacata tgatgcactt   1380
catatgcaag cacttccacc tcgtgagcaa aaacttatct ctgaagagga cctcatggtg   1440
agcaagggcg aggagctgtt caccggggtg gtgcccatct tggtcgagct ggacggcgac   1500
gtaaacggcc acaagttcag cgtgtccggc gagggcgagg gcgatgccac ctacggcaag   1560
ctgaccctga agttcatctg caccaccggc aagctgcccg tgccctggcc caccctcgtg   1620
accaccctga cctacggcgt gcagtgcttc agccgctacc ccgaccacat gaagcagcac   1680
gacttcttca gtccgccat gcccgaaggc tacgtccagg agcgcaccat cttcttcaag   1740
gacgacggca actacaagac ccgcgccgag gtgaagttcg agggcgacac cctggtgaac   1800
cgcatcgagc tgaagggcat cgacttcaag gaggacggca acatcctggg gcacaagctg   1860
gagtacaact acaacagcca caacgtctat atcatggccg acaagcagaa gaacggcatc   1920
aaggtgaact tcaagatccg ccacaacatc gaggacggca gcgtgcagct cgccgaccac   1980
taccagcaga acacccccat cggcgacggc cccgtgctgc tgcccgacaa ccactacctg   2040
agcacccagt ccgccctgag caaagacccc aacgagaagc gcgatcacat ggtcctgctg   2100
gagttcgtga ccgccgccgg gatcactctc ggcatggacg agctgtacaa g            2151
```

<210> SEQ ID NO 88
<211> LENGTH: 2136
<212> TYPE: DNA
<213> ORGANISM: Artificial sequence
<220> FEATURE:
<223> OTHER INFORMATION: Synthetic oligonucleotide

<400> SEQUENCE: 88

```
aacattatga tgacacagtc gccatcatct ctggctgtgt ctgcaggaga aaaggtcact    60
atgcgctgta agtccagtca aagtgtttta tacagttcaa atcagaagaa ctacttggcc   120
tggtaccagc agaaaccagg gcagtctcct aaactgctga tctactgggc atccactagg   180
gaatctggtg tccctgatcg cttcacaggc agtggatctg ggacagattt tactcttacc   240
atcagcagtg tacaagctga agacctggca gtttattact gtcatcaatt cctctcctcg   300
tacacgttcg gaggggggac caagctggaa ataaaaggag gaggtggtag tggtggagga   360
ggaagtggag gaggaggaag tgaggtgcag ctgcaggagt ctggggctga gcttgtgagg   420
ccagggggcct tagtcaagtt gtcctgcaga gcttctggct tcaacattaa agactactat   480
atgcactggg tgaagcagag gcctgaacag ggcctggagt ggattggatg gattgatcct   540
gagaatggta attctatata tgacccgaag ttccagggca aggccagtat aacagcagac   600
acatcctcca acacagccta cctgcagctc agcagcctga catctgagga cactgccgtc   660
tattactgtg ctgtagacct ttactacggt agagggactc tggtcactgt ctctgcaaca   720
actactccag caccacgacc accaacacct gctccaacta tcgcatctca accactttct   780
ctacgtccag aagcatgccg accagctgca ggaggtgcag ttcatacgag aggtctagat   840
ttcgcatgtg atatctacat ctgggcacca ttggctggga cttgtggtgt ccttctccta   900
tcactggtta tcacccttta ctgctgggtt agaagtaaaa gaagtaggct acttcatagt   960
gattacatga atatgactcc tcgacgacct ggtcccaccc gtaagcatta tcagccctat  1020
gcaccaccac gagatttcgc agcctatcgc tccagagtta aatttagcag aagtgcagat  1080
gctcctgcgt ataaacaggg tcaaaaccaa ctatataatg aactaaatct aggacgaaga  1140
gaagaatatg atgttttaga taaaagacgt ggtcgagatc ctgaaatggg aggaaaacct  1200
agaagaaaaa atcctcaaga aggcctatat aatgaactac aaaagataaa gatggcagaa  1260
gcttatagtg aaattggaat gaaaggagaa cgtcgtagag gtaaaggtca tgatggtctt  1320
tatcaaggtc ttagtacagc aacaaaagat acatatgatg cacttcatat gcaagcactt  1380
ccacctcgtg agcaaaaact tatctctgaa gaggacctca tggtgagcaa gggcgaggag  1440
ctgttcaccg gggtggtgcc catcctggtc gagctggacg gcgacgtaaa cggccacaag  1500
ttcagcgtgt ccggcgaggg cgagggcgat gccacctacg gcaagctgac cctgaagttc  1560
atctgcacca ccggcaagct gcccgtgccc tggcccaccc tcgtgaccac cctgacctac  1620
ggcgtgcagt gcttcagccg ctaccccgac cacatgaagc agcacgactt cttcaagtcc  1680
gccatgcccg aaggctacgt ccaggagcgc accatcttct tcaaggacga cggcaactac  1740
aagacccgcg ccgaggtgaa gttcgagggc gacaccctgg tgaaccgcat cgagctgaag  1800
ggcatcgact tcaaggagga cggcaacatc ctggggcaca agctggagta caactacaac  1860
agccacaacg tctatatcat ggccgacaag cagaagaacg gcatcaaggt gaacttcaag  1920
atccgccaca acatcgagga cggcagcgtg cagctcgccg accactacca gcagaacacc  1980
cccatcggcg acggccccgt gctgctgccc gacaaccact acctgagcac ccagtccgcc  2040
ctgagcaaag accccaacga gaagcgcgat cacatggtcc tgctggagtt cgtgaccgcc  2100
gccgggatca ctctcggcat ggacgagctg tacaag                            2136
```

ANTI-CD79B ANTIBODIES AND CHIMERIC ANTIGEN RECEPTORS AND METHODS OF USE THEREOF

This application is a national phase application under 35 U.S.C. § 371 that claims priority to International Application No. PCT/US2019/058710 filed Oct. 30, 2019, which claims the benefit of U.S. Provisional Application No. 62/752,889, filed Oct. 30, 2018, the entirety of which both are incorporated herein by reference.

INCORPORATION OF SEQUENCE LISTING

The sequence listing that is contained in the file named "UTFCP1405WO_ST25.txt", which is 73 KB (as measured in Microsoft Windows®) and was created on Oct. 29, 2019, is filed herewith by electronic submission and is incorporated by reference herein.

BACKGROUND

1. Field

The present invention relates generally to the fields of immunology and medicine. More particularly, it concerns CD79b chimeric antigen receptors and methods of use thereof.

2. Description of Related Art

Chimeric antigen receptor (CAR) T cells targeting CD19 are highly effective in B cell malignancies. Recently, two anti-CD19 CAR T-cell therapy products were approved by the US FDA for relapsed or refractory B cell acute lymphoblastic leukemia (ALL) and/or large B cell lymphoma. In pivotal trials, durable remissions lasting more than 1 year have been observed in ~40-50% of these patients. However, relapse or progression occurs in ~50-60% and a major cause of resistance appears to be due to CD19 antigen loss. Thus, there is an urgent need to develop CAR T cell therapies against novel targets to further improve outcomes in these patients.

SUMMARY

In a first embodiment, the present disclosure provides an isolated monoclonal antibody, wherein the antibody specifically binds to CD79b and comprises: (I): (a) a first $V_H$ CDR is identical to SEQ ID NO: 3; (b) a second $V_H$ CDR is identical to SEQ ID NO: 4; (c) a third $V_H$ CDR is identical to SEQ ID NO: 5; (d) a first $V_L$ CDR is identical to SEQ ID NO: 8; (e) a second $V_L$ CDR is identical to SEQ ID NO: 9; and (f) a third $V_L$ CDR is identical to SEQ ID NO: 10; (II): (a) a first $V_H$ CDR is identical to SEQ ID NO: 13; (b) a second $V_H$ CDR is identical to SEQ ID NO: 14; (c) a third $V_H$ CDR is identical to SEQ ID NO: 15; (d) a first $V_L$ CDR is identical to SEQ ID NO: 18; (e) a second $V_L$ CDR is identical to SEQ ID NO: 19; and (f) a third $V_L$ CDR is identical to SEQ ID NO: 20; or (III): (a) a first $V_H$ CDR is identical to SEQ ID NO: 23; (b) a second $V_H$ CDR is identical to SEQ ID NO: 24; (c) a third $V_H$ CDR is identical to SEQ ID NO: 25; (d) a first $V_L$ CDR is identical to SEQ ID NO: 28; (e) a second $V_L$ CDR is identical to SEQ ID NO: 29; and (f) a third $V_L$ CDR is identical to SEQ ID NO: 30.

In some aspects, the antibody comprises a $V_H$ domain at least about 80% (e.g., 81%, 82%, 83%, 84%, 85%, 86%, 87%, 88%, 89%, 90%, 91%, 92%, 93%, 94%, 95%, 96%, 97%, 98%, 99%, or 100%) identical to the $V_H$ domain of SEQ ID NO: 2 and a $V_L$ domain at least about 80% identical to the $V_L$ domain of SEQ ID NO: 7. In certain aspects, the antibody comprises a $V_H$ domain at least about 80% (e.g., 81%, 82%, 83%, 84%, 85%, 86%, 87%, 88%, 89%, 90%, 91%, 92%, 93%, 94%, 95%, 96%, 97%, 98%, 99%, or 100%) identical to the $V_H$ domain of SEQ ID NO: 12 and a $V_L$ domain at least about 80% identical to the $V_L$ domain of SEQ ID NO: 17. In some aspects, the antibody comprises a $V_H$ domain at least about 80% (e.g., 81%, 82%, 83%, 84%, 85%, 86%, 87%, 88%, 89%, 90%, 91%, 92%, 93%, 94%, 95%, 96%, 97%, 98%, 99%, or 100%) identical to the $V_H$ domain of SEQ ID NO: 22 and a $V_L$ domain at least about 80% identical to the $V_L$ domain of SEQ ID NO: 27.

In certain aspects, the antibody is recombinant. The antibody may be an IgG, IgM, IgA or an antigen binding fragment thereof. The antibody may be a Fab', a F(ab')2, a F(ab')3, a monovalent scFv, a bivalent scFv, or a single domain antibody. In certain aspects, the antibody is a human, humanized antibody or de-immunized antibody. The antibody may be conjugated to an imaging agent, a chemotherapeutic agent, a toxin or a radionuclide. A further embodiment provides a composition comprising a CD79b antibody of the embodiments in a pharmaceutically acceptable carrier. Also provided herein is an isolated polynucleotide molecule comprising a nucleic acid sequence encoding a CD79 antibody of the embodiments.

Another embodiment provides a recombinant polypeptide comprising an antibody $V_H$ domain comprising CDRs 1-3 of the $V_H$ domain of Clone 14 (SEQ ID NOs: 3, 4, and 5) and CDRs 1-3 of the $V_H$ domain of Clone 14 (SEQ ID NOs: 8, 9, and 10). A further embodiment provides a recombinant polypeptide comprising an antibody $V_H$ domain comprising CDRs 1-3 of the $V_H$ domain of Clone 16a (SEQ ID NOs: 13, 14, and 15) and CDRs 1-3 of the $V_H$ domain of Clone 16a (SEQ ID NOs: 18, 19, and 20). Further provided herein is a recombinant polypeptide comprising an antibody $V_H$ domain comprising CDRs 1-3 of the $V_H$ domain of Clone 45 (SEQ ID NOs: 23, 24, and 25) and CDRs 1-3 of the $V_H$ domain of Clone 45 (SEQ ID NOs: 28, 29, and 30). A further embodiment provides an isolated polynucleotide molecule comprising a nucleic acid sequence encoding a CD79b polypeptide of the embodiments. Also provided herein is a host cell comprising one or more polynucleotide molecule(s) encoding a CD79b antibody or a recombinant polypeptide of the embodiments. The host cell may be a mammalian cell, a yeast cell, a bacterial cell, a ciliate cell or an insect cell.

Another embodiment provides a method for treating a subject having a cancer comprising administering an effective amount of a CD79b antibody of the embodiments to the subject. In some aspects, the cancer is B cell malignancy. In certain aspects, the antibody is in a pharmaceutically acceptable composition. In some aspects, the antibody is administered systemically. The antibody may be administered intravenously, intradermally, intratumorally, intramuscularly, intraperitoneally, subcutaneously, or locally. In additional aspects, the method further comprises administering at least a second anticancer therapy to the subject. In some aspects, the second anticancer therapy is a surgical therapy, chemotherapy, radiation therapy, cryotherapy, hormonal therapy, immunotherapy or cytokine therapy. In certain aspects, the second anticancer therapy comprises an adoptive T-cell therapy.

A further embodiment provides an engineered CD79b-targeted chimeric antigen receptor (CAR) comprising CD3ζ, CD28, 4-1BB, and/or OX40 signaling domains. The CD3ζ signaling domain may be at least about 80% (e.g., 81%, 82%, 83%, 84%, 85%, 86%, 87%, 88%, 89%, 90%, 91%, 92%, 93%, 94%, 95%, 96%, 97%, 98%, 99%, or 100%) identical to SEQ ID NO: 80 or 81). The CD28 signaling domain may be at least about 80% (e.g., 81%, 82%, 83%, 84%, 85%, 86%, 87%, 88%, 89%, 90%, 91%, 92%, 93%, 94%, 95%, 96%, 97%, 98%, 99%, or 100%) identical to SEQ ID NO: 74 or 75). The 4-1BB signaling domain may be at least about 80% (e.g., 81%, 82%, 83%, 84%, 85%, 86%, 87%, 88%, 89%, 90%, 91%, 92%, 93%, 94%, 95%, 96%, 97%, 98%, 99%, or 100%) identical to SEQ ID NO: 76 or 77). The 4-1BB signaling domain may be at least about 80% (e.g., 81%, 82%, 83%, 84%, 85%, 86%, 87%, 88%, 89%, 90%, 91%, 92%, 93%, 94%, 95%, 96%, 97%, 98%, 99%, or 100%) identical to SEQ ID NO: 78 or 79).

In some aspects, the CAR is encoded by a viral vector, such as a lentiviral vector. In particular aspects, the CAR comprises an antigen-binding domain selected from the group consisting of F(ab')2, Fab', Fab, Fv, and scFv. The antigen-binding domain may comprise a CD79b antibody of the embodiments or a fragment thereof, such as an scFV.

In some aspects, the antigen-binding domain comprises (I): (a) a first $V_H$ CDR is identical to SEQ ID NO: 3; (b) a second $V_H$ CDR is identical to SEQ ID NO: 4; (c) a third $V_H$ CDR is identical to SEQ ID NO: 5; (d) a first $V_L$ CDR is identical to SEQ ID NO: 8; (e) a second $V_L$ CDR is identical to SEQ ID NO: 9; and (f) a third $V_L$ CDR is identical to SEQ ID NO: 10; (II): (a) a first $V_H$ CDR is identical to SEQ ID NO: 13; (b) a second $V_H$ CDR is identical to SEQ ID NO: 14; (c) a third $V_H$ CDR is identical to SEQ ID NO: 15; (d) a first $V_L$ CDR is identical to SEQ ID NO: 18; (e) a second $V_L$ CDR is identical to SEQ ID NO: 19; and (f) a third $V_L$ CDR is identical to SEQ ID NO: 20; or (III): (a) a first $V_H$ CDR is identical to SEQ ID NO: 23; (b) a second $V_H$ CDR is identical to SEQ ID NO: 24; (c) a third $V_H$ CDR is identical to SEQ ID NO: 25; (d) a first $V_L$ CDR is identical to SEQ ID NO: 28; (e) a second $V_L$ CDR is identical to SEQ ID NO: 29; and (f) a third $V_L$ CDR is identical to SEQ ID NO: 30. In certain aspects, the antigen-binding domain comprises an scFV having at least 90% (e.g., 91%, 92%, 93%, 94%, 95%, 96%, 97%, 98%, 99%, or 100%) identical to amino acid sequence of SEQ ID NOs: 31, 32, or 33.

In additional aspects, the CAR further comprises a transduction marker and/or safety switch. The transduction marker may be enhanced green fluorescent protein (eGFP) (e.g., SEQ ID NO:82 or 83). In certain aspects, the transduction marker and/or safety switch is truncated epidermal growth factor (EGFR) (e.g., SEQ ID NO:40 or 41). In some aspects, the transduction marker and/or safety switch is linked to the CAR by a cleavage peptide, such as 2A peptide. In some aspects, the 2A peptide is a T2A peptide (SEQ ID NO:84 or 85).

In some aspects, the CAR comprises a sequence having at least 90% (e.g., 91%, 92%, 93%, 94%, 95%, 96%, 97%, 98%, 99%, or 100%) identity to the amino acid sequence of SEQ ID NOs: 34, 35, 36, 37, 38, 39, 86, 87, or 88.

In certain aspects, the CAR further comprises a second antigen binding domain. In some aspects, the second antigen binding domain is a CD19, CD20, or CD22 antigen binding domain.

In some aspects, the CAR comprises a linker. For example, the linker, may be Linker 1 (SEQ ID NOs: 44 or 45), Linker 2 (SEQ ID NOs: 46 or 47), Linker 3 (SEQ ID NOs: 48 or 49), or Linker 4 (SEQ ID NOs: 50 or 51). In certain aspects, the CAR comprises a hinge. For example, the hinge may be CD8 Hinge 1 (SEQ ID NOs: 52 or 53), CD8 Hinge 2 (SEQ ID NOs: 54 or 55), CD8 Hinge 3 (SEQ ID NOs: 56 or 57), CD28 Hinge (SEQ ID NOs: 58 or 59), IgG4 Hinge (SEQ ID NOs: 60 or 61), IgG4 CH2 (SEQ ID NOs: 62 or 63), IgG4 CH2CH3 (SEQ ID NOs: 64 or 65), or IgG4 CH1CH2CH3 (SEQ ID NOs: 66 or 67). In particular aspects, the CAR comprises a transmembrane domain (TM). For example, the TM may be CD8 TM1 (SEQ ID NOs: 68 or 69), CD8 TM2 (SEQ ID NOs: 70 or 71), or CD28 TM (SEQ ID NOs: 72 or 73). In some aspects, the CAR construct comprises $V_L$-Linker1-$V_H$; $V_L$-Linker2-$V_H$; $V_L$-Linker3-$V_H$; $V_L$-Linker4-$V_H$; $V_H$-Linker1-$V_L$; $V_H$-Linker2-$V_L$; $V_H$-Linker3-$V_L$; or $V_H$-Linker4-$V_L$. In certain aspects, the CAR comprises a $V_L$-linker-$V_H$-hinge-TM-signaling domain. In other aspects, the CAR comprises $V_H$-linker-$V_L$-hinge-TM-signaling domain.

In another embodiment, there is provided an engineered CD79b CAR or T-cell receptor (TCR) having an antigen binding domain comprising (I): (a) a first $V_H$ CDR is identical to SEQ ID NO: 3; (b) a second $V_H$ CDR is identical to SEQ ID NO: 4; (c) a third $V_H$ CDR is identical to SEQ ID NO: 5; (d) a first $V_L$ CDR is identical to SEQ ID NO: 8; (e) a second $V_L$ CDR is identical to SEQ ID NO: 9; and (f) a third $V_L$ CDR is identical to SEQ ID NO: 10; (II): (a) a first $V_H$ CDR is identical to SEQ ID NO: 13; (b) a second $V_H$ CDR is identical to SEQ ID NO: 14; (c) a third $V_H$ CDR is identical to SEQ ID NO: 15; (d) a first $V_L$ CDR is identical to SEQ ID NO: 18; (e) a second $V_L$ CDR is identical to SEQ ID NO: 19; and (f) a third $V_L$ CDR is identical to SEQ ID NO: 20; or (III): (a) a first $V_H$ CDR is identical to SEQ ID NO: 23; (b) a second $V_H$ CDR is identical to SEQ ID NO: 24; (c) a third $V_H$ CDR is identical to SEQ ID NO: 25; (d) a first $V_L$ CDR is identical to SEQ ID NO: 28; (e) a second $V_L$ CDR is identical to SEQ ID NO: 29; and (f) a third $V_L$ CDR is identical to SEQ ID NO: 30.

In some aspects, the antigen-binding domain comprises a $V_H$ domain at least about 80% (e.g., 81%, 82%, 83%, 84%, 85%, 86%, 87%, 88%, 89%, 90%, 91%, 92%, 93%, 94%, 95%, 96%, 97%, 98%, 99%, or 100%) identical to the $V_H$ domain of SEQ ID NO: 2 and a $V_L$ domain at least about 80% identical to the $V_L$ domain of SEQ ID NO: 7. In certain aspects, the antigen-binding domain comprises a $V_H$ domain at least about 80% (e.g., 81%, 82%, 83%, 84%, 85%, 86%, 87%, 88%, 89%, 90%, 91%, 92%, 93%, 94%, 95%, 96%, 97%, 98%, 99%, or 100%) identical to the $V_H$ domain of SEQ ID NO: 12 and a $V_L$ domain at least about 80% identical to the $V_L$ domain of SEQ ID NO: 17. In some aspects, the antigen-binding domain comprises a $V_H$ domain at least about 80% (e.g., 81%, 82%, 83%, 84%, 85%, 86%, 87%, 88%, 89%, 90%, 91%, 92%, 93%, 94%, 95%, 96%, 97%, 98%, 99%, or 100%) identical to the $V_H$ domain of SEQ ID NO: 22 and a $V_L$ domain at least about 80% identical to the $V_L$ domain of SEQ ID NO: 27.

In some aspects, the CAR comprises one or more signaling domains CD3, CD28, OX40/CD134, 4-1BB/CD137, or a combination thereof. In particular aspects, the CAR comprises CD3 and CD28 signaling domains. In some aspects, the CAR comprises CD3 and 4-1BB signaling domains. In some aspects, the CAR comprises CD3 and OX40 signaling domains.

In certain aspects, the CAR is encoded by a viral vector, such as a lentiviral vector.

In certain aspects, the antigen-binding domain comprises an scFV having at least 90% (e.g., 91%, 92%, 93%, 94%, 95%, 96%, 97%, 98%, 99%, or 100%) identical to amino acid sequence of SEQ ID NOs: 31, 32, or 33.

In additional aspects, the CAR further comprises a transduction marker and/or safety switch. The transduction marker may be enhanced green fluorescent protein (eGFP) (e.g., SEQ ID NO:82 or 83). In certain aspects, the transduction marker and/or safety switch is truncated epidermal growth factor (EGFR) (e.g., SEQ ID NO:40 or 41). In some aspects, the transduction marker and/or safety switch is linked to the CAR by a cleavage peptide, such as 2A peptide. In some aspects, the 2A peptide is a T2A peptide (SEQ ID NO:84 or 85).

In some aspects, the CAR comprises a linker. For example, the linker, may be Linker 1 (SEQ ID NOs: 44 or 45), Linker 2 (SEQ ID NOs: 46 or 47), Linker 3 (SEQ ID NOs: 48 or 49), or Linker 4 (SEQ ID NOs: 50 or 51). In certain aspects, the CAR comprises a hinge. For example, the hinge may be CD8 Hinge 1 (SEQ ID NOs: 52 or 53), CD8 Hinge 2 (SEQ ID NOs: 54 or 55), CD8 Hinge 3 (SEQ ID NOs: 56 or 57), CD28 Hinge (SEQ ID NOs: 58 or 59), IgG4 Hinge (SEQ ID NOs: 60 or 61), IgG4 CH2 (SEQ ID NOs: 62 or 63), IgG4 CH2CH3 (SEQ ID NOs: 64 or 65), or IgG4 CH1CH2CH3 (SEQ ID NOs: 66 or 67). In particular aspects, the CAR comprises a transmembrane domain (TM). For example, the TM may be CD8 TM1 (SEQ ID NOs: 68 or 69), CD8 TM2 (SEQ ID NOs: 70 or 71), or CD28 TM (SEQ ID NOs: 72 or 73). In some aspects, the CAR construct comprises $V_L$-Linker1-$V_H$; $V_L$-Linker2-$V_H$; $V_L$-Linker3-$V_H$; $V_L$-Linker4-$V_H$; $V_H$-Linker1-$V_L$; $V_H$-Linker2-$V_L$; $V_H$-Linker3-$V_L$; or $V_H$-Linker4-$V_L$. In certain aspects, the CAR comprises a $V_L$-linker-$V_H$-hinge-TM-signaling domain. In other aspects, the CAR comprises $V_H$-linker-$V_L$-hinge-TM-signaling domain.

In some aspects, the CAR comprises a sequence having at least 90% (e.g., 91%, 92%, 93%, 94%, 95%, 96%, 97%, 98%, 99%, or 100%) identity to the amino acid sequence of SEQ ID NOs: 34, 35, 36, 37, 38, 39, 86, 87, or 88.

In certain aspects, the CAR further comprises a second antigen binding domain. In some aspects, the second antigen binding domain is a CD19, CD20, or CD22 antigen binding domain.

In another embodiment, there is provided an expression vector encoding a CD79b CAR of the present embodiments.

Further provided herein is a host cell engineered to express a CD79b CAR or TCR, such as a CD79b of the present embodiments. In some aspects, the host cell is an immune cell, such as a T cell. In some aspects, the T cell is a primary human T cell or a TIL. In certain aspects, the T cell is a CD4+ T cell or CD8+ T cell. In some aspects, the primary human T cell is obtained from a healthy donor. The T cell may be autologous or allogeneic. In some aspects, the cell is engineered (e.g., with CAR or TCR) using a CRISPR or transposase system.

Also provided herein is a pharmaceutical composition comprising CD79b CAR T cells, such as CAR T cells of the present embodiments, and a pharmaceutical carrier. Further provided herein is a composition comprising an effective amount of CD79b CAR T cells, such as CAR T cells of the present embodiments, for the treatment of cancer in a subject. In another embodiments, there is provided the use of a composition comprising an effective amount of CD79b CAR T cells, such as CAR T cells of the present embodiments, for the treatment of cancer in a subject.

In a further embodiment, there is provided a method for treating cancer in a subject comprising administering an effective amount of CD79b CAR T cells, such as CAR T cells of the present embodiments, to the subject. In some aspects, the cancer is a B cell malignancy, such as B cell acute lymphoblastic leukemia (ALL), diffuse, large B cell lymphoma, follicular lymphoma, marginal zone lymphoma, lymphoplasmacytic lymphoma, Burkitt lymphoma, or chronic lymphocytic leukemia. In certain aspects, the cancer is a CD79b-expressing cancer.

In some aspects, the subject has been previously administered a CD19 CAR therapy. In certain aspects, the subject is resistant to CD19 CAR therapy, such as due to CD19 antigen loss. In certain aspects, the subject has relapsed with a CD19-negative tumor.

In certain aspects, the CD79b CAR T cells are administered intravenously, intradermally, intratumorally, intramuscularly, intraperitoneally, subcutaneously, or locally. In additional aspects, the method further comprises administering at least a second anticancer therapy to the subject. In some aspects, the second anticancer therapy is a surgical therapy, chemotherapy, radiation therapy, cryotherapy, hormonal therapy, immunotherapy or cytokine therapy.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1A:
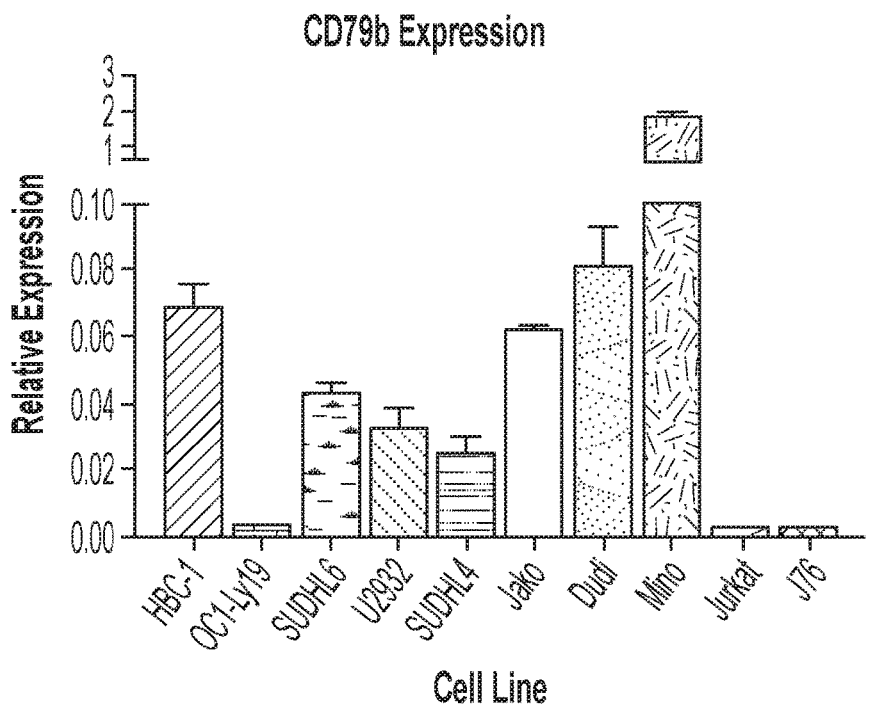
FIGS. 1A-1D: (A) CD79b expression in cell lines. (B) CD79b expression in human tissues. (C) CD79b expression in leukemias. (D) CD79b expression in lymphomas.

CD79b is a pan B cell linage marker and an important component of the B cell receptor complex. CD79b is broadly expressed in normal B cells and B cell malignancies and its expression is usually retained in CD19 negative tumors relapsing after CD19-specific CAR T cell therapy. Accordingly, in certain embodiments, the present disclosure provides CD79b monoclonal antibodies and CD79b-specific CARs, such as for CD79b-CAR T cells.

The present studies demonstrated the efficacy of the present CD79b-specific CAR T cell product in in vitro and in vivo models. Three murine monoclonal antibodies were developed against human CD79b by hybridoma technology and it was demonstrated that they bind specifically to recombinant human CD79b, have high affinity (Kd range of 1.44-17.8 nM), and stain multiple lymphoma cell lines. Next, the variable regions of the heavy and light chains of the CD79b antibodies were cloned, and lentiviral constructs were developed for the anti-CD79b CARs with CD30 and CD28/4-1BB costimulatory domains. It was demonstrated that the anti-CD79b CAR constructs can be transduced into primary CD4$^+$ and CD8$^+$ T cells from healthy donors using lentivirus to more than 70% transduction efficiency.

It was observed that the anti-CD79b CAR T cells but not untransduced T cells demonstrated significant cytotoxic activity that was comparable to control anti-CD19 CAR T cells against Daudi Burkitt lymphoma and Mino mantle cell lymphoma cell lines. More importantly, anti-CD79b but not anti-CD19 CART cells lysed CD19$_-$CD79b$_+$ lymphoma cells. Significant degranulation was also observed in both CD4$^-$ and CD8$^-$ anti-CD79b CAR T cells when they were co-cultured with lymphoma cells. The efficacy of anti-CD79b CAR T cells was also examined in vivo against Mino lymphoma xenograft model in NSG mice. Luciferase-labeled Mino mantle cell lymphoma cells were injected IV into NSG mice at 2×10$^6$ tumor cells/mouse. After 18 days, mice were treated with untransduced primary T cells, anti-CD19 CAR T cells, or anti-CD79b CAR T cells via tail vein at 10×10$^6$ T cells/mouse. Bioluminescence imaging was used to assess tumor burden. The results showed progressive tumor growth in mice treated with untransduced T cells. While in mice treated with anti-CD19- and anti-CD79b CAR T cells tumor growth was inhibited and survival was improved. Thus, these results showed the efficacy of this novel anti-CD79b CAR T cell therapy in patients with B cell malignancies which could be a novel strategy to overcome resistance due to CD19 loss after CD19-specific CAR T-cell therapy.

In some aspects, the present anti-CD79b CAR construct is encoded by a lentiviral vector. The vector may be transduced into immune cells, such as T cells. The construct may comprise CD28, CD3ζ, and/or 4-1BB signaling domains. The construct can comprise a transduction marker, such as eGFP or a truncated EGFR domain. The transduction marker may be linked to the CAR by a cleavage peptide, such as a 2A peptide.

Further provided herein are methods of treating cancer by administering the CD79b-specific CAR immune cells, such as T cells, provided herein. The cancer may be a B cell malignancy, such as B cell acute lymphoblastic leukemia (ALL), diffuse large B cell lymphoma, follicular lymphoma, marginal zone lymphoma, lymphoplasmacytic lymphoma, Burkitt lymphoma, or chronic lymphocytic leukemia that express CD79b. The present therapy may be used to treat subjects with a B cell malignancy who has relapsed with CD19 negative tumors after anti-CD19-CAR T cell therapy.

I. DEFINITIONS

As used herein, "essentially free," in terms of a specified component, is used herein to mean that none of the specified component has been purposefully formulated into a composition and/or is present only as a contaminant or in trace amounts. The total amount of the specified component resulting from any unintended contamination of a composition is therefore well below 0.05%, preferably below 0.01%. Most preferred is a composition in which no amount of the specified component can be detected with standard analytical methods.

As used herein the specification, "a" or "an" may mean one or more. As used herein in the claim(s), when used in conjunction with the word "comprising," the words "a" or "an" may mean one or more than one.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" may mean at least a second or more. The terms "about", "substantially" and "approximately" mean, in general, the stated value plus or minus 5%.

"Treating" or treatment of a disease or condition refers to executing a protocol, which may include administering one or more drugs to a patient, in an effort to alleviate signs or symptoms of the disease. Desirable effects of treatment include decreasing the rate of disease progression, ameliorating or palliating the disease state, and remission or improved prognosis. Alleviation can occur prior to signs or symptoms of the disease or condition appearing, as well as after their appearance. Thus, "treating" or "treatment" may include "preventing" or "prevention" of disease or undesirable condition. In addition, "treating" or "treatment" does not require complete alleviation of signs or symptoms, does not require a cure, and specifically includes protocols that have only a marginal effect on the patient.

The term "therapeutic benefit" or "therapeutically effective" as used throughout this application refers to anything that promotes or enhances the well-being of the subject with respect to the medical treatment of this condition. This includes, but is not limited to, a reduction in the frequency or severity of the signs or symptoms of a disease. For example, treatment of cancer may involve, for example, a reduction in the size of a tumor, a reduction in the invasiveness of a tumor, reduction in the growth rate of the cancer, or prevention of metastasis. Treatment of cancer may also refer to prolonging survival of a subject with cancer.

"Subject" and "patient" refer to either a human or non-human, such as primates, mammals, and vertebrates. In particular embodiments, the subject is a human.

The phrases "pharmaceutical or pharmacologically acceptable" refers to molecular entities and compositions that do not produce an adverse, allergic, or other untoward reaction when administered to an animal, such as a human, as appropriate. The preparation of a pharmaceutical composition comprising an antibody or additional active ingredient will be known to those of skill in the art in light of the present disclosure. Moreover, for animal (e.g., human) administration, it will be understood that preparations should meet sterility, pyrogenicity, general safety, and purity standards as required by FDA Office of Biological Standards.

As used herein, "pharmaceutically acceptable carrier" includes any and all aqueous solvents (e.g., water, alcoholic/aqueous solutions, saline solutions, parenteral vehicles, such as sodium chloride, Ringer's dextrose, etc.), non-aqueous solvents (e.g., propylene glycol, polyethylene glycol, vegetable oil, and injectable organic esters, such as ethyloleate), dispersion media, coatings, surfactants, antioxidants, preservatives (e.g., antibacterial or antifungal agents, anti-oxidants, chelating agents, and inert gases), isotonic agents, absorption delaying agents, salts, drugs, drug stabilizers, gels, binders, excipients, disintegration agents, lubricants, sweetening agents, flavoring agents, dyes, fluid and nutrient replenishers, such like materials and combinations thereof, as would be known to one of ordinary skill in the art. The pH and exact concentration of the various components in a pharmaceutical composition are adjusted according to well-known parameters.

II. CD79B ANTIBODIES

In certain embodiments, an antibody or a fragment thereof that binds to at least a portion of CD79b and inhibits CD79b signaling are contemplated. As used herein, the term "antibody" is intended to refer broadly to any immunologic binding agent, such as IgG, IgM, IgA, IgD, IgE, and genetically modified IgG as well as polypeptides comprising antibody CDR domains that retain antigen binding activity. The antibody may be selected from the group consisting of a chimeric antibody, an affinity matured antibody, a polyclonal antibody, a monoclonal antibody, a humanized antibody, a human antibody, or an antigen-binding antibody fragment or a natural or synthetic ligand. Preferably, the anti-CD79b antibody is a monoclonal antibody or a humanized antibody.

Thus, by known means and as described herein, polyclonal or monoclonal antibodies, antibody fragments, and binding domains and CDRs (including engineered forms of any of the foregoing) may be created that are specific to CD79b, one or more of its respective epitopes, or conjugates of any of the foregoing, whether such antigens or epitopes are isolated from natural sources or are synthetic derivatives or variants of the natural compounds.

Examples of antibody fragments suitable for the present embodiments include, without limitation: (i) the Fab fragment, consisting of $V_L$, $V_H$, $C_L$, and $C_{H1}$ domains; (ii) the "Fd" fragment consisting of the $V_H$ and $C_{H1}$ domains; (iii) the "Fv" fragment consisting of the $V_L$ and $V_H$ domains of a single antibody; (iv) the "dAb" fragment, which consists of a $V_H$ domain; (v) isolated CDR regions; (vi) F(ab')2 fragments, a bivalent fragment comprising two linked Fab fragments; (vii) single chain Fv molecules ("scFv"), wherein a $V_H$ domain and a $V_L$ domain are linked by a peptide linker that allows the two domains to associate to form a binding domain; (viii) bi-specific single chain Fv dimers (see U.S. Pat. No. 5,091,513); and (ix) diabodies, multivalent or multispecific fragments constructed by gene fusion (US Patent App. Pub. 20050214860). Fv, scFv, or diabody molecules may be stabilized by the incorporation of disulphide bridges linking the $V_H$ and $V_L$ domains. Minibodies comprising a scFv joined to a CH3 domain may also be made.

Antibody-like binding peptidomimetics are also contemplated in embodiments. Liu et al. (2003) describe "antibody like binding peptidomimetics" (ABiPs), which are peptides that act as pared-down antibodies and have certain advantages of longer serum half-life as well as less cumbersome synthesis methods.

Animals may be inoculated with an antigen, such as a CD79b extracellular domain (ECD) protein, in order to produce antibodies specific for CD79b. Frequently an antigen is bound or conjugated to another molecule to enhance the immune response. As used herein, a conjugate is any peptide, polypeptide, protein, or non-proteinaceous substance bound to an antigen that is used to elicit an immune response in an animal. Antibodies produced in an animal in response to antigen inoculation comprise a variety of non-identical molecules (polyclonal antibodies) made from a variety of individual antibody producing B lymphocytes. A polyclonal antibody is a mixed population of antibody species, each of which may recognize a different epitope on the same antigen. Given the correct conditions for polyclonal antibody production in an animal, most of the antibodies in the animal's serum will recognize the collective epitopes on the antigenic compound to which the animal has been immunized. This specificity is further enhanced by affinity purification to select only those antibodies that recognize the antigen or epitope of interest.

A monoclonal antibody is a single species of antibody wherein every antibody molecule recognizes the same epitope because all antibody producing cells are derived from a single B-lymphocyte cell line. The methods for generating monoclonal antibodies (MAbs) generally begin along the same lines as those for preparing polyclonal antibodies. In some embodiments, rodents such as mice and rats are used in generating monoclonal antibodies. In some embodiments, rabbit, sheep, or frog cells are used in generating monoclonal antibodies. The use of rats is well known and may provide certain advantages. Mice (e.g., BALB/c mice) are routinely used and generally give a high percentage of stable fusions.

Hybridoma technology involves the fusion of a single B lymphocyte from a mouse previously immunized with a CD79b antigen with an immortal myeloma cell (usually mouse myeloma). This technology provides a method to propagate a single antibody-producing cell for an indefinite number of generations, such that unlimited quantities of structurally identical antibodies having the same antigen or epitope specificity (monoclonal antibodies) may be produced.

Plasma B cells ($CD45^+CD5^-CD19^+$) may be isolated from freshly prepared rabbit peripheral blood mononuclear cells of immunized rabbits and further selected for CD79b binding cells. After enrichment of antibody producing B cells, total RNA may be isolated and cDNA synthesized. DNA sequences of antibody variable regions from both heavy chains and light chains may be amplified, constructed into a phage display Fab expression vector, and transformed into E. coli. CD79b specific binding Fab may be selected out through multiple rounds enrichment panning and sequenced. Selected CD79b binding hits may be expressed as full-length IgG in rabbit and rabbit/human chimeric forms using a mammalian expression vector system in human embryonic kidney (HEK293) cells (Invitrogen) and purified using a protein G resin with a fast protein liquid chromatography (FPLC) separation unit.

In one embodiment, the antibody is a chimeric antibody, for example, an antibody comprising antigen binding sequences from a non-human donor grafted to a heterologous non-human, human, or humanized sequence (e.g., framework and/or constant domain sequences). Methods have been developed to replace light and heavy chain constant domains of the monoclonal antibody with analogous domains of human origin, leaving the variable regions of the foreign antibody intact. Alternatively, "fully human" monoclonal antibodies are produced in mice transgenic for human immunoglobulin genes. Methods have also been developed to convert variable domains of monoclonal antibodies to more human form by recombinantly constructing antibody variable domains having both rodent, for example, mouse, and human amino acid sequences. In "humanized" monoclonal antibodies, only the hypervariable CDR is derived from mouse monoclonal antibodies, and the framework and constant regions are derived from human amino acid sequences (see U.S. Pat. Nos. 5,091,513 and 6,881, 557). It is thought that replacing amino acid sequences in the antibody that are characteristic of rodents with amino acid sequences found in the corresponding position of human antibodies will reduce the likelihood of adverse immune reaction during therapeutic use. A hybridoma or other cell producing an antibody may also be subject to genetic mutation or other changes, which may or may not alter the binding specificity of antibodies produced by the hybridoma.

Methods for producing polyclonal antibodies in various animal species, as well as for producing monoclonal antibodies of various types, including humanized, chimeric, and fully human, are well known in the art and highly predictable. For example, the following U.S. patents and patent applications provide enabling descriptions of such methods: U.S. Patent Application Nos. 2004/0126828 and 2002/0172677; and U.S. Pat. Nos. 3,817,837; 3,850,752; 3,939,350; 3,996,345; 4,196,265; 4,275,149; 4,277,437; 4,366,241; 4,469,797; 4,472,509; 4,606,855; 4,703,003; 4,742,159; 4,767,720; 4,816,567; 4,867,973; 4,938,948; 4,946,778; 5,021,236; 5,164,296; 5,196,066; 5,223,409; 5,403,484; 5,420,253; 5,565,332; 5,571,698; 5,627,052; 5,656,434; 5,770,376; 5,789,208; 5,821,337; 5,844,091; 5,858,657; 5,861,155; 5,871,907; 5,969,108; 6,054,297; 6,165,464; 6,365,157; 6,406,867; 6,709,659; 6,709,873; 6,753,407; 6,814,965; 6,849,259; 6,861,572; 6,875,434; and 6,891,024. All patents, patent application publications, and other publications cited herein and therein are hereby incorporated by reference in the present application.

Antibodies may be produced from any animal source, including birds and mammals. Preferably, the antibodies are ovine, murine (e.g., mouse and rat), rabbit, goat, guinea pig, camel, horse, or chicken. In addition, newer technology permits the development of and screening for human antibodies from human combinatorial antibody libraries. For example, bacteriophage antibody expression technology allows specific antibodies to be produced in the absence of animal immunization, as described in U.S. Pat. No. 6,946,546, which is incorporated herein by reference.

It is fully expected that antibodies to CD79b will have the ability to neutralize or counteract the effects of CD79b regardless of the animal species, monoclonal cell line, or other source of the antibody. Certain animal species may be less preferable for generating therapeutic antibodies because they may be more likely to cause allergic response due to activation of the complement system through the "Fc" portion of the antibody. However, whole antibodies may be enzymatically digested into "Fc" (complement binding) fragment, and into antibody fragments having the binding domain or CDR. Removal of the Fc portion reduces the likelihood that the antigen antibody fragment will elicit an undesirable immunological response, and thus, antibodies without Fc may be preferential for prophylactic or therapeutic treatments. As described above, antibodies may also be constructed so as to be chimeric or partially or fully human, so as to reduce or eliminate the adverse immunological consequences resulting from administering to an animal an antibody that has been produced in, or has sequences from, other species.

Substitutional variants typically contain the exchange of one amino acid for another at one or more sites within the protein, and may be designed to modulate one or more properties of the polypeptide, with or without the loss of other functions or properties. Substitutions may be conservative, that is, one amino acid is replaced with one of similar shape and charge. Conservative substitutions are well known in the art and include, for example, the changes of: alanine to serine; arginine to lysine; asparagine to glutamine or histidine; aspartate to glutamate; cysteine to serine; glutamine to asparagine; glutamate to aspartate; glycine to proline; histidine to asparagine or glutamine; isoleucine to leucine or valine; leucine to valine or isoleucine; lysine to arginine; methionine to leucine or isoleucine; phenylalanine to tyrosine, leucine or methionine; serine to threonine; threonine to serine; tryptophan to tyrosine; tyrosine to tryptophan or phenylalanine; and valine to isoleucine or leucine. Alternatively, substitutions may be non-conservative such that a function or activity of the polypeptide is affected. Non-conservative changes typically involve substituting a residue with one that is chemically dissimilar, such as a polar or charged amino acid for a nonpolar or uncharged amino acid, and vice versa.

Proteins may be recombinant, or synthesized in vitro. Alternatively, a non-recombinant or recombinant protein may be isolated from bacteria. It is also contemplated that a bacteria containing such a variant may be implemented in compositions and methods. Consequently, a protein need not be isolated.

It is contemplated that in compositions there is between about 0.001 mg and about 10 mg of total polypeptide, peptide, and/or protein per ml. Thus, the concentration of protein in a composition can be about, at least about or at most about 0.001, 0.010, 0.050, 0.1, 0.2, 0.3, 0.4, 0.5, 0.6, 0.7, 0.8, 0.9, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0 mg/ml or more (or any range derivable therein). Of this, about, at least about, or at most about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100% may be an antibody that binds CD79b.

An antibody or preferably an immunological portion of an antibody, can be chemically conjugated to, or expressed as, a fusion protein with other proteins. For purposes of this specification and the accompanying claims, all such fused proteins are included in the definition of antibodies or an immunological portion of an antibody.

Embodiments provide antibodies and antibody-like molecules against CD79b, polypeptides and peptides that are linked to at least one agent to form an antibody conjugate or payload. In order to increase the efficacy of antibody molecules as diagnostic or therapeutic agents, it is conventional to link or covalently bind or complex at least one desired molecule or moiety. Such a molecule or moiety may be, but is not limited to, at least one effector or reporter molecule. Effector molecules comprise molecules having a desired activity, e.g., cytotoxic activity. Non-limiting examples of effector molecules that have been attached to antibodies include toxins, therapeutic enzymes, antibiotics, radio-labeled nucleotides and the like. By contrast, a reporter molecule is defined as any moiety that may be detected using an assay. Non-limiting examples of reporter molecules that have been conjugated to antibodies include enzymes, radiolabels, haptens, fluorescent labels, phosphorescent molecules, chemiluminescent molecules, chromophores, luminescent molecules, photoaffinity molecules, colored particles or ligands, such as biotin.

Several methods are known in the art for the attachment or conjugation of an antibody to its conjugate moiety. Some attachment methods involve the use of a metal chelate complex employing, for example, an organic chelating agent such a diethylenetriaminepentaacetic acid anhydride (DTPA); ethylenetriaminetetraacetic acid; N-chloro-p-toluenesulfonamide; and/or tetrachloro-3-6-diphenylglycouril-3 attached to the antibody. Monoclonal antibodies may also be reacted with an enzyme in the presence of a coupling agent such as glutaraldehyde or periodate. Conjugates with fluorescein markers are prepared in the presence of these coupling agents or by reaction with an isothiocyanate.

III. T CELL THERAPY

Certain embodiments of the present disclosure concern obtaining and administering T cells to a subject as an immunotherapy to target cancer cells. Several basic approaches for the derivation, activation and expansion of functional anti-tumor effector T cells have been described in the last two decades. These include: autologous cells, such as tumor-infiltrating lymphocytes (TILs); T cells activated ex-vivo using autologous DCs, lymphocytes, artificial antigen-presenting cells (APCs) or beads coated with T cell ligands and activating antibodies, or cells isolated by virtue of capturing target cell membrane; allogeneic cells naturally expressing anti-host tumor T cell receptor (TCR); and non-tumor-specific autologous or allogeneic cells genetically reprogrammed or "redirected" to express tumor-reactive TCR or chimeric TCR molecules displaying antibody-like tumor recognition capacity known as "T-bodies". These approaches have given rise to numerous protocols for T cell preparation and immunization which can be used in the methods of the present disclosure.

A. T Cell Preparation

In some embodiments, the T cells are derived from the blood, bone marrow, lymph, or lymphoid organs. In some aspects, the cells are human cells. The cells typically are primary cells, such as those isolated directly from a subject and/or isolated from a subject and frozen. In some embodiments, the cells include one or more subsets of T cells or other cell types, such as whole T cell populations, $CD4^+$ cells, $CD8^+$ cells, and subpopulations thereof, such as those defined by function, activation state, maturity, potential for differentiation, expansion, recirculation, localization, and/or persistence capacities, antigen-specificity, type of antigen receptor, presence in a particular organ or compartment, marker or cytokine secretion profile, and/or degree of differentiation. With reference to the subject to be treated, the cells may be allogeneic and/or autologous. In some aspects, such as for off-the-shelf technologies, the cells are pluripotent and/or multipotent, such as stem cells, such as induced pluripotent stem cells (iPSCs). In some embodiments, the methods include isolating cells from the subject, preparing, processing, culturing, and/or engineering them, as described herein, and re-introducing them into the same patient, before or after cryopreservation.

Among the sub-types and subpopulations of T cells (e.g., $CD4^+$ and/or $CD8^+$ T cells) are naive T ($T_N$) cells, effector T cells ($T_{EFF}$), memory T cells and sub-types thereof, such as stem cell memory T ($TSC_M$), central memory T ($T_{CM}$), effector memory T ($T_{EM}$), or terminally differentiated effector memory T ($T_{TEMRA}$) cells, tumor-infiltrating lymphocytes (TIL), immature T cells, mature T cells, helper T cells, cytotoxic T cells, mucosa-associated invariant T (MAIT) cells, naturally occurring and adaptive regulatory T (Treg) cells, helper T cells, such as TH1 cells, TH2 cells, TH3 cells, TH17 cells, TH9 cells, TH22 cells, follicular helper T cells, alpha/beta T cells, and delta/gamma T cells.

In some embodiments, one or more of the T cell populations is enriched for or depleted of cells that are positive for a specific marker, such as surface markers, or that are negative for a specific marker. In some cases, such markers are those that are absent or expressed at relatively low levels on certain populations of T cells (e.g., non-memory cells) but are present or expressed at relatively higher levels on certain other populations of T cells (e.g., memory cells). In one embodiment, the cells (e.g., $CD8^+$ cells or $CD3^+$ cells) are enriched for (i.e., positively selected for) cells that are positive or expressing high surface levels of CD45RO, CCR7, CD28, CD27, CD44, CD127, and/or CD62L and/or depleted of (e.g., negatively selected for) cells that are positive for or express high surface levels of CD45RA. In some embodiments, cells are enriched for or depleted of cells positive or expressing high surface levels of CD122, CD95, CD25, CD27, and/or IL7-Ra (CD127). In some examples, $CD8^+$ T cells are enriched for cells positive for CD45RO (or negative for CD45RA) and for CD62L.

In some embodiments, T cells are separated from a PBMC sample by negative selection of markers expressed on non-T cells, such as B cells, monocytes, or other white blood cells, such as CD14. In some aspects, a $CD4^+$ or $CD8^+$ selection step is used to separate $CD4^+$ helper and $CD8^+$ cytotoxic T cells. Such $CD4^+$ and $CD8^+$ populations can be further sorted into sub-populations by positive or negative selection for markers expressed or expressed to a relatively higher degree on one or more naive, memory, and/or effector T cell subpopulations.

In some embodiments, $CD8^+$ cells are further enriched for or depleted of naive, central memory, effector memory, and/or central memory stem cells, such as by positive or negative selection based on surface antigens associated with the respective subpopulation. In some embodiments, enrichment for central memory T ($T_{CM}$) cells is carried out to increase efficacy, such as to improve long-term survival, expansion, and/or engraftment following administration, which in some aspects is particularly robust in such subpopulations. In some embodiments, combining $T_{CM}$-enriched $CD8^+$ T cells and $CD4^+$ T cells further enhances efficacy.

In some embodiments, the T cells are autologous T cells. In this method, tumor samples are obtained from patients and a single cell suspension is obtained. The single cell suspension can be obtained in any suitable manner, e.g., mechanically (disaggregating the tumor using, e.g., a gentleMACS™ Dissociator, Miltenyi Biotec, Auburn, Calif.) or enzymatically (e.g., collagenase or DNase). Single-cell suspensions of tumor enzymatic digests are cultured in interleukin-2 (IL-2). The cells are cultured until confluence (e.g., about $2\times10^6$ lymphocytes), e.g., from about 5 to about 21 days, preferably from about 10 to about 14 days. For example, the cells may be cultured from 5 days, 5.5 days, or 5.8 days to 21 days, 21.5 days, or 21.8 days, such as from 10 days, 10.5 days, or 10.8 days to 14 days, 14.5 days, or 14.8 days.

The cultured T cells can be pooled and rapidly expanded. Rapid expansion provides an increase in the number of antigen-specific T-cells of at least about 50-fold (e.g., 50-, 60-, 70-, 80-, 90-, or 100-fold, or greater) over a period of about 10 to about 14 days, preferably about 14 days. More preferably, rapid expansion provides an increase of at least about 200-fold (e.g., 200-, 300-, 400-, 500-, 600-, 700-, 800-, 900-, or greater) over a period of about 10 to about 14 days, preferably about 14 days.

Expansion can be accomplished by any of a number of methods as are known in the art. For example, T cells can be rapidly expanded using non-specific T-cell receptor stimulation in the presence of feeder lymphocytes and either interleukin-2 (IL-2) or interleukin-15 (IL-15), with IL-2 being preferred. The non-specific T-cell receptor stimulus can include around 30 ng/ml of OKT3, a mouse monoclonal anti-CD3 antibody (available from Ortho-McNeil®, Raritan, N.J.). Alternatively, T cells can be rapidly expanded by stimulation of peripheral blood mononuclear cells (PBMC) in vitro with one or more antigens (including antigenic portions thereof, such as epitope(s), or a cell) of the cancer, which can be optionally expressed from a vector, such as an human leukocyte antigen A2 (HLA-A2) binding peptide, in the presence of a T-cell growth factor, such as 300 IU/ml IL-2 or IL-15, with IL-2 being preferred. The in vitro-induced T-cells are rapidly expanded by re-stimulation with the same antigen(s) of the cancer pulsed onto HLA-A2-expressing antigen-presenting cells. Alternatively, the T-cells can be re-stimulated with irradiated, autologous lymphocytes or with irradiated HLA-A2+ allogeneic lymphocytes and IL-2, for example.

The autologous T-cells can be modified to express a T-cell growth factor that promotes the growth and activation of the autologous T-cells. Suitable T-cell growth factors include, for example, interleukin (IL)-2, IL-7, IL-15, and IL-12. Suitable methods of modification are known in the art. See, for instance, Sambrook et al., *Molecular Cloning: A Laboratory Manual*, 3$^{rd}$ ed., Cold Spring Harbor Press, Cold Spring Harbor, N.Y. 2001; and Ausubel et al., *Current Protocols in Molecular Biology*, Greene Publishing Associates and John Wiley & Sons, N Y, 1994. In particular aspects, modified autologous T-cells express the T-cell growth factor at high levels. T-cell growth factor coding sequences, such as that of IL-12, are readily available in the art, as are promoters, the operable linkage of which to a T-cell growth factor coding sequence promote high-level expression.

B. Genetically Engineered Antigen Receptors

The T cell can be genetically engineered to express antigen receptors such as engineered TCRs or chimeric antigen receptors (CARs). For example, the autologous T-cells are modified to express a T cell receptor (TCR) having antigenic specificity for a cancer antigen, such as CD79b. Suitable TCRs include, for example, those with antigenic specificity for a melanoma antigen, e.g., gp100 or MART-1. Suitable methods of modification are known in the art. See, for instance, Sambrook and Ausubel, supra. For example, the T cells may be transduced to express a TCR having antigenic specificity for a cancer antigen using transduction techniques described in Heemskerk et al. *Hum Gene Ther.* 19:496-510 (2008) and Johnson et al. *Blood* 114:535-46 (2009).

In some embodiments, the T cells comprise one or more nucleic acids introduced via genetic engineering that encode one or more antigen receptors, and genetically engineered products of such nucleic acids. In some embodiments, the nucleic acids are heterologous, i.e., normally not present in a cell or sample obtained from the cell, such as one obtained from another organism or cell, which for example, is not ordinarily found in the cell being engineered and/or an organism from which such cell is derived. In some embodiments, the nucleic acids are not naturally occurring, such as a nucleic acid not found in nature (e.g., chimeric).

In some embodiments, the CAR contains an extracellular antigen-recognition domain that specifically binds to CD79b. In some embodiments, the antigen is a protein expressed on the surface of cells. In some embodiments, the CAR is a TCR-like CAR and the antigen is a processed peptide antigen, such as a peptide antigen of an intracellular protein, which, like a TCR, is recognized on the cell surface in the context of a major histocompatibility complex (MHC) molecule.

Exemplary antigen receptors, including CARs and recombinant TCRs, as well as methods for engineering and introducing the receptors into cells, include those described, for example, in international patent application publication numbers WO200014257, WO2013126726, WO2012/129514, WO2014031687, WO2013/166321, WO2013/071154, WO2013/123061 U.S. patent application publication numbers US2002131960, US2013287748, US20130149337, U.S. Pat. Nos. 6,451,995, 7,446,190, 8,252,592, 8,339,645, 8,398,282, 7,446,179, 6,410,319, 7,070,995, 7,265,209, 7,354,762, 7,446,191, 8,324,353, and 8,479,118, and European patent application number EP2537416, and/or those described by Sadelain et al., 2013; Davila et al., 2013; Turtle et al., 2012; Wu et al., 2012. In some aspects, the genetically engineered antigen receptors include a CAR as described in U.S. Pat. No. 7,446,190, and those described in International Patent Application Publication No.: WO/2014055668 A1.

1. Chimeric Antigen Receptors

In some embodiments, the CAR comprises: a) an intracellular signaling domain, b) a transmembrane domain, and c) an extracellular domain comprising an antigen binding region.

In some embodiments, the engineered antigen receptors include CARs, including activating or stimulatory CARs, costimulatory CARs (see WO2014/055668), and/or inhibitory CARs (iCARs, see Fedorov et al., 2013). The CARs generally include an extracellular antigen (or ligand) binding domain linked to one or more intracellular signaling components, in some aspects via linkers and/or transmembrane domain(s). Such molecules typically mimic or approximate a signal through a natural antigen receptor, a signal through such a receptor in combination with a costimulatory receptor, and/or a signal through a costimulatory receptor alone.

Certain embodiments of the present disclosure concern the use of nucleic acids, including nucleic acids encoding an antigen-specific CAR polypeptide, including a CAR that has been humanized to reduce immunogenicity (hCAR), comprising an intracellular signaling domain, a transmembrane domain, and an extracellular domain comprising one or more signaling motifs. In certain embodiments, the CAR may recognize an epitope comprising the shared space between one or more antigens. In certain embodiments, the binding region can comprise complementary determining regions of a monoclonal antibody, variable regions of a monoclonal antibody, and/or antigen binding fragments thereof. In another embodiment, that specificity is derived from a peptide (e.g., cytokine) that binds to a receptor.

It is contemplated that the human CAR nucleic acids may be human genes used to enhance cellular immunotherapy for human patients. In a specific embodiment, the invention includes a full-length CAR cDNA or coding region. The antigen binding regions or domain can comprise a fragment of the $V_H$ and $V_L$ chains of a single-chain variable fragment (scFv) derived from a particular human monoclonal antibody, such as those described in U.S. Pat. No. 7,109,304, incorporated herein by reference. The fragment can also be any number of different antigen binding domains of a human antigen-specific antibody. In a more specific embodiment, the fragment is an antigen-specific scFv encoded by a sequence that is optimized for human codon usage for expression in human cells.

The arrangement could be multimeric, such as a diabody or multimers. The multimers are most likely formed by cross pairing of the variable portion of the light and heavy chains into a diabody. The hinge portion of the construct can have multiple alternatives from being totally deleted, to having the first cysteine maintained, to a proline rather than a serine substitution, to being truncated up to the first cysteine. The Fc portion can be deleted. Any protein that is stable and/or dimerizes can serve this purpose. One could use just one of the Fc domains, e.g., either the CH2 or CH3 domain from human immunoglobulin. One could also use the hinge, CH2 and CH3 region of a human immunoglobulin that has been modified to improve dimerization. One could also use just the hinge portion of an immunoglobulin. One could also use portions of CD8alpha.

In some embodiments, the CAR nucleic acid comprises a sequence encoding other costimulatory receptors, such as a transmembrane domain and a modified CD28 intracellular signaling domain. Other costimulatory receptors include, but are not limited to one or more of CD28, CD27, OX-40 (CD134), and 4-1BB (CD137).

In some embodiments, CAR is constructed with a specificity for a particular antigen (or marker or ligand), such as an antigen expressed in a particular cell type to be targeted by adoptive therapy, e.g., a cancer marker, and/or an antigen intended to induce a dampening response, such as an antigen expressed on a normal or non-diseased cell type. Thus, the CAR typically includes in its extracellular portion one or more antigen binding molecules, such as one or more antigen-binding fragment, domain, or portion, or one or more antibody variable domains, and/or antibody molecules. In some embodiments, the CAR includes an antigen-binding portion or portions of an antibody molecule, such as a single-chain antibody fragment (scFv) derived from the variable heavy ($V_H$) and variable light ($V_L$) chains of a monoclonal antibody (mAb).

The sequence of the open reading frame encoding the chimeric receptor can be obtained from a genomic DNA source, a cDNA source, or can be synthesized (e.g., via PCR), or combinations thereof. Depending upon the size of the genomic DNA and the number of introns, it may be desirable to use cDNA or a combination thereof as it is found that introns stabilize the mRNA. Also, it may be further advantageous to use endogenous or exogenous non-coding regions to stabilize the mRNA.

It is contemplated that the chimeric construct can be introduced into immune cells as naked DNA or in a suitable vector. Methods of stably transfecting cells by electroporation using naked DNA are known in the art. See, e.g., U.S. Pat. No. 6,410,319. Naked DNA generally refers to the DNA encoding a chimeric receptor contained in a plasmid expression vector in proper orientation for expression.

Alternatively, a viral vector (e.g., a retroviral vector, adenoviral vector, adeno-associated viral vector, or lentiviral vector) can be used to introduce the chimeric construct into immune cells. Suitable vectors for use in accordance with the method of the present disclosure are non-replicating in the immune cells. A large number of vectors are known that are based on viruses, where the copy number of the virus maintained in the cell is low enough to maintain the viability of the cell, such as, for example, vectors based on HIV, SV40, EBV, HSV, or BPV.

In some aspects, the antigen-specific binding, or recognition component is linked to one or more transmembrane and intracellular signaling domains. In some embodiments, the CAR includes a transmembrane domain fused to the extracellular domain of the CAR. In one embodiment, the transmembrane domain that naturally is associated with one of the domains in the CAR is used. In some instances, the transmembrane domain is selected or modified by amino acid substitution to avoid binding of such domains to the transmembrane domains of the same or different surface membrane proteins to minimize interactions with other members of the receptor complex.

The transmembrane domain in some embodiments is derived either from a natural or from a synthetic source. Where the source is natural, the domain in some aspects is derived from any membrane-bound or transmembrane protein. Transmembrane regions include those derived from (i.e. comprise at least the transmembrane region(s) of) the alpha, beta or zeta chain of the T-cell receptor, CD28, CD3 zeta, CD3 epsilon, CD3 gamma, and CD3 delta. Alternatively, the transmembrane domain in some embodiments is synthetic. In some aspects, the synthetic transmembrane domain comprises predominantly hydrophobic residues such as leucine and valine. In some aspects, a triplet of phenylalanine, tryptophan and valine will be found at each end of a synthetic transmembrane domain.

In specific embodiments, the present CAR constructs comprise a light chain-linker-heavy chain-hinge-transmembrane domain-signaling domain. The linkers may be Linker 1 (SEQ ID NOs: 44 or 45), Linker 2 (SEQ ID NOs: 46 or 47), Linker 3 (SEQ ID NOs: 48 or 49), or Linker 4 (SEQ ID NOs: 50 or 51). The hinge may be CD8 Hinge 1 (SEQ ID NOs: 52 or 53), CD8 Hinge 2 (SEQ ID NOs: 54 or 55), CD8 Hinge 3 (SEQ ID NOs: 56 or 57), CD28 Hinge (SEQ ID NOs: 58 or 59), IgG4 Hinge (SEQ ID NOs: 60 or 61), IgG4 CH2 (SEQ ID NOs: 62 or 63), IgG4 CH2CH3 (SEQ ID NOs: 64 or 65), or IgG4 CH1CH2CH3 (SEQ ID NOs: 66 or 67). The transmembrane domain may be CD8 TM1 (SEQ ID NOs: 68 or 69), CD8 TM2 (SEQ ID NOs: 70 or 71), or CD28 TM (SEQ ID NOs: 72 or 73). The signaling domains may be CD28 (SEQ ID NOs: 74 or 75), 4-1BB (SEQ ID NOs: 76 or 77), OX-40 (SEQ ID NOs: 78 or 79), and/or CD3 intracellular (SEQ ID NOs: 80 or 81). The CAR constructs may further comprise GFP (SEQ ID NOs: 82 or 83), T2A (SEQ ID NOs: 84 or 85), and/or EGFR (SEQ ID NOs: 40 or 41). Exemplary heavy chain (HC), linker, and light chain (LC) combinations may include but are not limited to: LC-Linker1-HC; LC-Linker2-HC; LC-Linker3-HC; LC-Linker4-HC; HC-Linker1-LC; HC-Linker2-LC; HC-Linker3-LC; or HC-Linker4-LC.

2. T Cell Receptor (TCR)

In some embodiments, the genetically engineered antigen receptors include recombinant TCRs and/or TCRs cloned from naturally occurring T cells. A "T cell receptor" or "TCR" refers to a molecule that contains a variable α and β chains (also known as TCRα and TCRβ, respectively) or a variable γ and δ chains (also known as TCRγ and TCRδ, respectively) and that is capable of specifically binding to an antigen peptide bound to a MHC receptor. In some embodiments, the TCR is in the αβ form.

Typically, TCRs that exist in αβ and γδ forms are generally structurally similar, but T cells expressing them may have distinct anatomical locations or functions. A TCR can be found on the surface of a cell or in soluble form. Generally, a TCR is found on the surface of T cells (or T lymphocytes) where it is generally responsible for recognizing antigens bound to major histocompatibility complex (MHC) molecules. In some embodiments, a TCR also can contain a constant domain, a transmembrane domain and/or a short cytoplasmic tail (see, e.g., Janeway et al, 1997). For example, in some aspects, each chain of the TCR can possess one N-terminal immunoglobulin variable domain, one immunoglobulin constant domain, a transmembrane region, and a short cytoplasmic tail at the C-terminal end. In some embodiments, a TCR is associated with invariant proteins of the CD3 complex involved in mediating signal transduction. Unless otherwise stated, the term "TCR" should be understood to encompass functional TCR fragments thereof. The term also encompasses intact or full-length TCRs, including TCRs in the αβ form or γδ form.

Thus, for purposes herein, reference to a TCR includes any TCR or functional fragment, such as an antigen-binding portion of a TCR that binds to a specific antigenic peptide bound in an MHC molecule, i.e. MHC-peptide complex. An "antigen-binding portion" or antigen-binding fragment" of a TCR, which can be used interchangeably, refers to a molecule that contains a portion of the structural domains of a TCR, but that binds the antigen (e.g. MHC-peptide complex) to which the full TCR binds. In some cases, an antigen-binding portion contains the variable domains of a TCR, such as variable a chain and variable β chain of a TCR, sufficient to form a binding site for binding to a specific MHC-peptide complex, such as generally where each chain contains three complementarity determining regions.

In some embodiments, the variable domains of the TCR chains associate to form loops, or complementarity determining regions (CDRs) analogous to immunoglobulins, which confer antigen recognition and determine peptide specificity by forming the binding site of the TCR molecule and determine peptide specificity. Typically, like immunoglobulins, the CDRs are separated by framework regions (FRs) (see, e.g., Jores et al., 1990; Chothia et al., 1988; Lefranc et al., 2003). In some embodiments, CDR3 is the main CDR responsible for recognizing processed antigen, although CDR1 of the alpha chain has also been shown to interact with the N-terminal part of the antigenic peptide, whereas CDR1 of the beta chain interacts with the C-terminal part of the peptide. CDR2 is thought to recognize the MHC molecule. In some embodiments, the variable region of the β-chain can contain a further hypervariability (HV4) region.

In some embodiments, the TCR chains contain a constant domain. For example, like immunoglobulins, the extracellular portion of TCR chains (e.g., a-chain, β-chain) can contain two immunoglobulin domains, a variable domain (e.g., $V_a$ or Vp; typically amino acids 1 to 116 based on Kabat numbering Kabat et al., "Sequences of Proteins of Immunological Interest, US Dept. Health and Human Services, Public Health Service National Institutes of Health, 1991, $5^{th}$ ed.) at the N-terminus, and one constant domain (e.g., a-chain constant domain or $C_a$, typically amino acids 117 to 259 based on Kabat, β-chain constant domain or Cp, typically amino acids 117 to 295 based on Kabat) adjacent to the cell membrane. For example, in some cases, the extracellular portion of the TCR formed by the two chains contains two membrane-proximal constant domains, and two membrane-distal variable domains containing CDRs. The constant domain of the TCR domain contains short connecting sequences in which a cysteine residue forms a disulfide bond, making a link between the two chains. In some embodiments, a TCR may have an additional cysteine residue in each of the α and β chains such that the TCR contains two disulfide bonds in the constant domains.

In some embodiments, the TCR chains can contain a transmembrane domain. In some embodiments, the transmembrane domain is positively charged. In some cases, the TCR chains contains a cytoplasmic tail. In some cases, the structure allows the TCR to associate with other molecules like CD3. For example, a TCR containing constant domains with a transmembrane region can anchor the protein in the cell membrane and associate with invariant subunits of the CD3 signaling apparatus or complex.

Generally, CD3 is a multi-protein complex that can possess three distinct chains (γ, δ, and ε) in mammals and the ζ-chain. For example, in mammals the complex can contain a CD3γ chain, a CD3δ chain, two CD3ε chains, and a homodimer of CD3ζ chains. The CD3γ, CD3δ, and CD3ε chains are highly related cell surface proteins of the immunoglobulin superfamily containing a single immunoglobulin domain. The transmembrane regions of the CD3γ, CD3δ, and CD3ε chains are negatively charged, which is a characteristic that allows these chains to associate with the positively charged T cell receptor chains. The intracellular tails of the CD3γ, CD3δ, and CD3ε chains each contain a single conserved motif known as an immunoreceptor tyrosine-based activation motif or ITAM, whereas each CD3ζ chain has three. Generally, ITAMs are involved in the signaling capacity of the TCR complex. These accessory molecules have negatively charged transmembrane regions and play a role in propagating the signal from the TCR into the cell. The CD3- and ζ-chains, together with the TCR, form what is known as the T cell receptor complex.

In some embodiments, the TCR may be a heterodimer of two chains α and β (or optionally γ and δ) or it may be a single chain TCR construct. In some embodiments, the TCR is a heterodimer containing two separate chains (α and β chains or γ and δ chains) that are linked, such as by a disulfide bond or disulfide bonds. In some embodiments, a TCR for a target antigen (e.g., a cancer antigen) is identified and introduced into the cells. In some embodiments, nucleic acid encoding the TCR can be obtained from a variety of sources, such as by polymerase chain reaction (PCR) amplification of publicly available TCR DNA sequences. In some embodiments, the TCR is obtained from a biological source, such as from cells such as from a T cell (e.g. cytotoxic T cell), T cell hybridomas or other publicly available source. In some embodiments, the T cells can be obtained from in vivo isolated cells. In some embodiments, a high-affinity T cell clone can be isolated from a patient, and the TCR isolated. In some embodiments, the T cells can be a cultured T cell hybridoma or clone. In some embodiments, the TCR clone for a target antigen has been generated in transgenic mice engineered with human immune system genes (e.g., the human leukocyte antigen system, or HLA). In some embodiments, phage display is used to isolate TCRs against a target antigen. In some embodiments, the TCR or antigen-binding portion thereof can be synthetically generated from knowledge of the sequence of the TCR.

C. Methods of Delivery

One of skill in the art would be well-equipped to construct a vector through standard recombinant techniques (see, for example, Sambrook et al., 2001 and Ausubel et al., 1996, both incorporated herein by reference) for the expression of the antigen receptors of the present disclosure. Vectors include but are not limited to, plasmids, cosmids, viruses (bacteriophage, animal viruses, and plant viruses), and artificial chromosomes (e.g., YACs), such as retroviral vectors (e.g. derived from Moloney murine leukemia virus vectors (MoMLV), MSCV, SFFV, MPSV, SNV etc), lentiviral vectors (e.g. derived from HIV-1, HIV-2, SIV, BIV, FIV etc.), adenoviral (Ad) vectors including replication competent, replication deficient and gutless forms thereof, adeno-associated viral (AAV) vectors, simian virus 40 (SV-40) vectors, bovine papilloma virus vectors, Epstein-Barr virus vectors, herpes virus vectors, vaccinia virus vectors, Harvey murine sarcoma virus vectors, murine mammary tumor virus vectors, Rous sarcoma virus vectors, parvovirus vectors, polio virus vectors, vesicular stomatitis virus vectors, maraba virus vectors and group B adenovirus enadenotucirev vectors.

a. Viral Vectors

Viral vectors encoding an antigen receptor may be provided in certain aspects of the present disclosure. In generating recombinant viral vectors, non-essential genes are typically replaced with a gene or coding sequence for a heterologous (or non-native) protein. A viral vector is a kind of expression construct that utilizes viral sequences to introduce nucleic acid and possibly proteins into a cell. The ability of certain viruses to infect cells or enter cells via receptor mediated-endocytosis, and to integrate into host cell genomes and express viral genes stably and efficiently have made them attractive candidates for the transfer of foreign nucleic acids into cells (e.g., mammalian cells). Non-limiting examples of virus vectors that may be used to deliver a nucleic acid of certain aspects of the present invention are described below.

Lentiviruses are complex retroviruses, which, in addition to the common retroviral genes gag, pol, and env, contain other genes with regulatory or structural function. Lentiviral vectors are well known in the art (see, for example, U.S. Pat. Nos. 6,013,516 and 5,994,136).

Recombinant lentiviral vectors are capable of infecting non-dividing cells and can be used for both in vivo and ex vivo gene transfer and expression of nucleic acid sequences. For example, recombinant lentivirus capable of infecting a non-dividing cell—wherein a suitable host cell is transfected with two or more vectors carrying the packaging functions, namely gag, pol and env, as well as rev and tat—is described in U.S. Pat. No. 5,994,136, incorporated herein by reference.

b. Regulatory Elements

Expression cassettes included in vectors useful in the present disclosure in particular contain (in a 5'-to-3' direction) a eukaryotic transcriptional promoter operably linked to a protein-coding sequence, splice signals including intervening sequences, and a transcriptional termination/polyadenylation sequence. The promoters and enhancers that control the transcription of protein encoding genes in eukaryotic cells are composed of multiple genetic elements. The cellular machinery is able to gather and integrate the regulatory information conveyed by each element, allowing different genes to evolve distinct, often complex patterns of transcriptional regulation. A promoter used in the context of the present disclosure includes constitutive, inducible, and tissue-specific promoters.

(i) Promoter/Enhancers

The expression constructs provided herein comprise a promoter to drive expression of the antigen receptor. A promoter generally comprises a sequence that functions to position the start site for RNA synthesis. The best known example of this is the TATA box, but in some promoters lacking a TATA box, such as, for example, the promoter for the mammalian terminal deoxynucleotidyl transferase gene and the promoter for the SV40 late genes, a discrete element overlying the start site itself helps to fix the place of initiation. Additional promoter elements regulate the frequency of transcriptional initiation. Typically, these are located in the region 30110 bp-upstream of the start site, although a number of promoters have been shown to contain functional elements downstream of the start site as well. To bring a coding sequence "under the control of" a promoter, one positions the 5' end of the transcription initiation site of the transcriptional reading frame "downstream" of (i.e., 3' of) the chosen promoter. The "upstream" promoter stimulates transcription of the DNA and promotes expression of the encoded RNA.

The spacing between promoter elements frequently is flexible, so that promoter function is preserved when elements are inverted or moved relative to one another. In the tk promoter, the spacing between promoter elements can be increased to 50 bp apart before activity begins to decline. Depending on the promoter, it appears that individual elements can function either cooperatively or independently to activate transcription. A promoter may or may not be used in conjunction with an "enhancer," which refers to a cis-acting regulatory sequence involved in the transcriptional activation of a nucleic acid sequence.

A promoter may be one naturally associated with a nucleic acid sequence, as may be obtained by isolating the 5' non-coding sequences located upstream of the coding segment and/or exon. Such a promoter can be referred to as "endogenous." Similarly, an enhancer may be one naturally associated with a nucleic acid sequence, located either downstream or upstream of that sequence. Alternatively, certain advantages will be gained by positioning the coding nucleic acid segment under the control of a recombinant or heterologous promoter, which refers to a promoter that is not normally associated with a nucleic acid sequence in its natural environment. A recombinant or heterologous enhancer refers also to an enhancer not normally associated with a nucleic acid sequence in its natural environment. Such promoters or enhancers may include promoters or enhancers of other genes, and promoters or enhancers isolated from any other virus, or prokaryotic or eukaryotic cell, and promoters or enhancers not "naturally occurring," i.e., containing different elements of different transcriptional regulatory regions, and/or mutations that alter expression. For example, promoters that are most commonly used in recombinant DNA construction include the βlactamase (penicillinase), lactose and tryptophan (trp-) promoter systems. In addition to producing nucleic acid sequences of promoters and enhancers synthetically, sequences may be produced using recombinant cloning and/or nucleic acid amplification technology, including PCR™, in connection with the compositions disclosed herein. Furthermore, it is contemplated that the control sequences that direct transcription and/or expression of sequences within non-nuclear organelles such as mitochondria, chloroplasts, and the like, can be employed as well.

Naturally, it will be important to employ a promoter and/or enhancer that effectively directs the expression of the DNA segment in the organelle, cell type, tissue, organ, or organism chosen for expression. Those of skill in the art of molecular biology generally know the use of promoters, enhancers, and cell type combinations for protein expression, (see, for example Sambrook et al. 1989, incorporated herein by reference). The promoters employed may be constitutive, tissue-specific, inducible, and/or useful under the appropriate conditions to direct high level expression of the introduced DNA segment, such as is advantageous in the large-scale production of recombinant proteins and/or peptides. The promoter may be heterologous or endogenous.

Additionally, any promoter/enhancer combination (as per, for example, the Eukaryotic Promoter Data Base EPDB, through world wide web at epd.isb-sib.ch/) could also be used to drive expression. Use of a T3, T7 or SP6 cytoplasmic expression system is another possible embodiment. Eukaryotic cells can support cytoplasmic transcription from certain bacterial promoters if the appropriate bacterial polymerase is provided, either as part of the delivery complex or as an additional genetic expression construct.

Non-limiting examples of promoters include early or late viral promoters, such as, SV40 early or late promoters, cytomegalovirus (CMV) immediate early promoters, Rous Sarcoma Virus (RSV) early promoters; eukaryotic cell promoters, such as, e. g., beta actin promoter, GADPH promoter, metallothionein promoter; and concatenated response element promoters, such as cyclic AMP response element promoters (cre), serum response element promoter (sre), phorbol ester promoter (TPA) and response element promoters (tre) near a minimal TATA box. It is also possible to use human growth hormone promoter sequences (e.g., the human growth hormone minimal promoter described at Genbank, accession no. X05244, nucleotide 283-341) or a mouse mammary tumor promoter (available from the ATCC, Cat. No. ATCC 45007). In certain embodiments, the promoter is CMV IE, dectin-1, dectin-2, human CD11c, F4/80, SM22, RSV, SV40, Ad MLP, beta-actin, MHC class I or MHC class II promoter, however any other promoter that is useful to drive expression of the therapeutic gene is applicable to the practice of the present disclosure.

In certain aspects, methods of the disclosure also concern enhancer sequences, i.e., nucleic acid sequences that increase a promoter's activity and that have the potential to act in cis, and regardless of their orientation, even over relatively long distances (up to several kilobases away from the target promoter). However, enhancer function is not necessarily restricted to such long distances as they may also function in close proximity to a given promoter.

(ii) Initiation Signals and Linked Expression

A specific initiation signal also may be used in the expression constructs provided in the present disclosure for efficient translation of coding sequences. These signals include the ATG initiation codon or adjacent sequences. Exogenous translational control signals, including the ATG initiation codon, may need to be provided. One of ordinary skill in the art would readily be capable of determining this and providing the necessary signals. It is well known that the initiation codon must be "in-frame" with the reading frame of the desired coding sequence to ensure translation of the entire insert. The exogenous translational control signals and initiation codons can be either natural or synthetic. The efficiency of expression may be enhanced by the inclusion of appropriate transcription enhancer elements.

In certain embodiments, the use of internal ribosome entry sites (IRES) elements are used to create multigene, or polycistronic, messages. IRES elements are able to bypass the ribosome scanning model of 5' methylated Cap dependent translation and begin translation at internal sites. IRES elements from two members of the picornavirus family (polio and encephalomyocarditis) have been described, as well an IRES from a mammalian message. IRES elements can be linked to heterologous open reading frames. Multiple open reading frames can be transcribed together, each separated by an IRES, creating polycistronic messages. By virtue of the IRES element, each open reading frame is accessible to ribosomes for efficient translation. Multiple genes can be efficiently expressed using a single promoter/enhancer to transcribe a single message.

Additionally, certain 2A sequence elements could be used to create linked- or co-expression of genes in the constructs provided in the present disclosure. For example, cleavage sequences could be used to co-express genes by linking open reading frames to form a single cistron. An exemplary cleavage sequence is the F2A (Foot-and-mouth disease virus 2A) or a "2A-like" sequence (e.g., *Thosea asigna* virus 2A; T2A).

(iii) Origins of Replication

In order to propagate a vector in a host cell, it may contain one or more origins of replication sites (often termed "ori"), for example, a nucleic acid sequence corresponding to oriP of EBV as described above or a genetically engineered oriP with a similar or elevated function in programming, which is a specific nucleic acid sequence at which replication is initiated. Alternatively a replication origin of other extrachromosomally replicating virus as described above or an autonomously replicating sequence (ARS) can be employed.

c. Selection and Screenable Markers

In some embodiments, cells containing a construct of the present disclosure may be identified in vitro or in vivo by including a marker in the expression vector. Such markers would confer an identifiable change to the cell permitting easy identification of cells containing the expression vector. Generally, a selection marker is one that confers a property that allows for selection. A positive selection marker is one in which the presence of the marker allows for its selection, while a negative selection marker is one in which its presence prevents its selection. An example of a positive selection marker is a drug resistance marker.

Usually the inclusion of a drug selection marker aids in the cloning and identification of transformants, for example, genes that confer resistance to neomycin, puromycin, hygromycin, DHFR, GPT, zeocin and histidinol are useful selection markers. In addition to markers conferring a phenotype that allows for the discrimination of transformants based on the implementation of conditions, other types of markers including screenable markers such as GFP, whose basis is colorimetric analysis, are also contemplated. Alternatively, screenable enzymes as negative selection markers such as herpes simplex virus thymidine kinase (tk) or chloramphenicol acetyltransferase (CAT) may be utilized. One of skill in the art would also know how to employ immunologic markers, possibly in conjunction with FACS analysis. The marker used is not believed to be important, so long as it is capable of being expressed simultaneously with the nucleic acid encoding a gene product. Further examples of selection and screenable markers are well known to one of skill in the art.

d. Other Methods of Nucleic Acid Delivery

In addition to viral delivery of the nucleic acids encoding the antigen receptor, the following are additional methods of recombinant gene delivery to a given host cell and are thus considered in the present disclosure.

Introduction of a nucleic acid, such as DNA or RNA, into the immune cells of the current disclosure may use any suitable methods for nucleic acid delivery for transformation of a cell, as described herein or as would be known to one of ordinary skill in the art. Such methods include, but are not limited to, direct delivery of DNA such as by ex vivo transfection, by injection, including microinjection); by electroporation; by calcium phosphate precipitation; by using DEAE-dextran followed by polyethylene glycol; by direct sonic loading; by liposome mediated transfection and receptor-mediated transfection; by microprojectile bombardment; by agitation with silicon carbide fibers; by *Agrobacterium*-mediated transformation; by desiccation/inhibition-mediated DNA uptake, and any combination of such methods. Through the application of techniques such as these, organelle(s), cell(s), tissue(s) or organism(s) may be stably or transiently transformed.

IV. METHODS OF TREATMENT

Certain aspects of the present embodiments can be used to prevent or treat a disease or disorder associated with CD79b signaling. Signaling of CD79b may be reduced by any suitable drugs to prevent cancer cell proliferation. Preferably, such substances would be an anti-CD79b antibody or anti-CD79b CAR T cells.

In some embodiments, the present disclosure provides methods for immunotherapy comprising administering an effective amount of the CAR T cells of the present disclosure. In one embodiments, a medical disease or disorder is treated by transfer of a CAR T cell population that elicits an immune response. In certain embodiments of the present disclosure, cancer is treated by transfer of a CAR T cell population that elicits an immune response. Provided herein are methods for treating or delaying progression of cancer in an individual comprising administering to the individual an effective amount an antigen-specific cell therapy. The present methods may be applied for the treatment of immune disorders, solid cancers, and hematologic cancers. Specifically, the cancer may be a B cell malignancy, such as B cell acute lymphoblastic leukemia (ALL), diffuse, large B cell lymphoma, follicular lymphoma, marginal zone lymphoma, lymphoplasmacytic lymphoma, Burkitt lymphoma, and chronic lymphocytic leukemia.

Tumors for which the present treatment methods are useful include any malignant cell type, such as those found in a solid tumor or a hematological tumor. Exemplary solid tumors can include, but are not limited to, a tumor of an organ selected from the group consisting of pancreas, colon, cecum, stomach, brain, head, neck, ovary, kidney, larynx, sarcoma, lung, bladder, melanoma, prostate, and breast. Exemplary hematological tumors include tumors of the bone marrow, T or B cell malignancies, leukemias, lymphomas, blastomas, myelomas, and the like. Further examples of cancers that may be treated using the methods provided herein include, but are not limited to, lung cancer (including small-cell lung cancer, non-small cell lung cancer, adenocarcinoma of the lung, and squamous carcinoma of the lung), cancer of the peritoneum, gastric or stomach cancer (including gastrointestinal cancer and gastrointestinal stromal cancer), pancreatic cancer, cervical cancer, ovarian cancer, liver cancer, bladder cancer, breast cancer, colon cancer, colorectal cancer, endometrial or uterine carcinoma, salivary gland carcinoma, kidney or renal cancer, prostate cancer, vulval cancer, thyroid cancer, various types of head and neck cancer, and melanoma.

The cancer may specifically be of the following histological type, though it is not limited to these: neoplasm, malignant; carcinoma; carcinoma, undifferentiated; giant and spindle cell carcinoma; small cell carcinoma; papillary carcinoma; squamous cell carcinoma; lymphoepithelial carcinoma; basal cell carcinoma; pilomatrix carcinoma; transitional cell carcinoma; papillary transitional cell carcinoma; adenocarcinoma; gastrinoma, malignant; cholangiocarcinoma; hepatocellular carcinoma; combined hepatocellular carcinoma and cholangiocarcinoma; trabecular adenocarcinoma; adenoid cystic carcinoma; adenocarcinoma in adenomatous polyp; adenocarcinoma, familial polyposis coli; solid carcinoma; carcinoid tumor, malignant; branchioloalveolar adenocarcinoma; papillary adenocarcinoma; chromophobe carcinoma; acidophil carcinoma; oxyphilic adenocarcinoma; basophil carcinoma; clear cell adenocarcinoma; granular cell carcinoma; follicular adenocarcinoma; papillary and follicular adenocarcinoma; nonencapsulating sclerosing carcinoma; adrenal cortical carcinoma; endometroid carcinoma; skin appendage carcinoma; apocrine adenocarcinoma; sebaceous adenocarcinoma; ceruminous adenocarcinoma; mucoepidermoid carcinoma; cystadenocarcinoma; papillary cystadenocarcinoma; papillary serous cystadenocarcinoma; mucinous cystadenocarcinoma; mucinous adenocarcinoma; signet ring cell carcinoma; infiltrating duct carcinoma; medullary carcinoma; lobular carcinoma; inflammatory carcinoma; paget's disease, mammary; acinar cell carcinoma; adenosquamous carcinoma; adenocarcinoma w/squamous metaplasia; thymoma, malignant; ovarian stromal tumor, malignant; thecoma, malignant; granulosa cell tumor, malignant; androblastoma, malignant; sertoli cell carcinoma; leydig cell tumor, malignant; lipid cell tumor, malignant; paraganglioma, malignant; extra-mammary paraganglioma, malignant; pheochromocytoma; glomangiosarcoma; malignant melanoma; amelanotic melanoma; superficial spreading melanoma; lentigo malignant melanoma; acral lentiginous melanomas; nodular melanomas; malignant melanoma in giant pigmented nevus; epithelioid cell melanoma; blue nevus, malignant; sarcoma; fibrosarcoma; fibrous histiocytoma, malignant; myxosarcoma; liposarcoma; leiomyosarcoma; rhabdomyosarcoma; embryonal rhabdomyosarcoma; alveolar rhabdomyosarcoma; stromal sarcoma; mixed tumor, malignant; mullerian mixed tumor; nephroblastoma; hepatoblastoma; carcinosarcoma; mesenchymoma, malignant; brenner tumor, malignant; phyllodes tumor, malignant; synovial sarcoma; mesothelioma, malignant; dysgerminoma; embryonal carcinoma; teratoma, malignant; struma ovarii, malignant; choriocarcinoma; mesonephroma, malignant; hemangiosarcoma; hemangioendothelioma, malignant; kaposi's sarcoma; hemangiopericytoma, malignant; lymphangiosarcoma; osteosarcoma; juxtacortical osteosarcoma; chondrosarcoma; chondroblastoma, malignant; mesenchymal chondrosarcoma; giant cell tumor of bone; ewing's sarcoma; odontogenic tumor, malignant; ameloblastic odontosarcoma; ameloblastoma, malignant; ameloblastic fibrosarcoma; pinealoma, malignant; chordoma; glioma, malignant; ependymoma; astrocytoma; protoplasmic astrocytoma; fibrillary astrocytoma; astroblastoma; glioblastoma; oligodendroglioma; oligodendroblastoma; primitive neuroectodermal; cerebellar sarcoma; ganglioneuroblastoma; neuroblastoma; retinoblastoma; olfactory neurogenic tumor; meningioma, malignant; neurofibrosarcoma; neurilemmoma, malignant; granular cell tumor, malignant; malignant lymphoma; hodgkin's disease; hodgkin's; paragranuloma; malignant lymphoma, small lymphocytic; malignant lymphoma, large cell, diffuse; malignant lymphoma, follicular; mycosis fungoides; other specified non-hodgkin's lymphomas; B cell lymphoma; low grade/follicular non-Hodgkin's lymphoma (NHL); small lymphocytic (SL) NHL; intermediate grade/follicular NHL; intermediate grade diffuse NHL; high grade immunoblastic NHL; high grade lymphoblastic NHL; high grade small non-cleaved cell NHL; bulky disease NHL; mantle cell lymphoma; AIDS-related lymphoma; Waldenstrom's macroglobulinemia; malignant histiocytosis; multiple myeloma; mast cell sarcoma; immunoproliferative small intestinal disease; leukemia; lymphoid leukemia; plasma cell leukemia; erythroleukemia; lymphosarcoma cell leukemia; myeloid leukemia; basophilic leukemia; eosinophilic leukemia; monocytic leukemia; mast cell leukemia; megakaryoblastic leukemia; myeloid sarcoma; hairy cell leukemia; chronic lymphocytic leukemia (CLL); acute lymphoblastic leukemia (ALL); acute myeloid leukemia (AML); and chronic myeloblastic leukemia.

Particular embodiments concern methods of treatment of leukemia. Leukemia is a cancer of the blood or bone marrow and is characterized by an abnormal proliferation (production by multiplication) of blood cells, usually white blood cells (leukocytes). It is part of the broad group of diseases called hematological neoplasms. Leukemia is a broad term covering a spectrum of diseases. Leukemia is clinically and pathologically split into its acute and chronic forms.

In some embodiments of the methods of the present disclosure, activated CD4 and/or CD8 T cells in the individual are characterized by γ-IFN producing CD4 and/or CD8 T cells and/or enhanced cytolytic activity relative to prior to the administration of the combination. γ-IFN may be measured by any means known in the art, including, e.g., intracellular cytokine staining (ICS) involving cell fixation, permeabilization, and staining with an antibody against γ-IFN. Cytolytic activity may be measured by any means known in the art, e.g., using a cell killing assay with mixed effector and target cells.

In some embodiments, the subject can be administered nonmyeloablative lymphodepleting chemotherapy prior to the T cell therapy. The nonmyeloablative lymphodepleting chemotherapy can be any suitable such therapy, which can be administered by any suitable route. The nonmyeloablative lymphodepleting chemotherapy can comprise, for example, the administration of cyclophosphamide and fludarabine, particularly if the cancer is melanoma, which can be metastatic. An exemplary route of administering cyclophosphamide and fludarabine is intravenously. Likewise, any suitable dose of cyclophosphamide and fludarabine can be administered. In particular aspects, around 60 mg/kg of cyclophosphamide is administered for two days after which around 25 mg/m$^2$ fludarabine is administered for five days.

In certain embodiments, a T cell growth factor that promotes the growth and activation of the autologous T cells is administered to the subject either concomitantly with the autologous T cells or subsequently to the autologous T cells. The T cell growth factor can be any suitable growth factor that promotes the growth and activation of the autologous T cells. Examples of suitable T-cell growth factors include interleukin (IL)-2, IL-7, IL-15, and IL-12, which can be used alone or in various combinations, such as IL-2 and IL-7, IL-2 and IL-15, IL-7 and IL-15, IL-2, IL-7 and IL-15, IL-12 and IL-7, IL-12 and IL-15, or IL-12 and IL2. IL-12 is a preferred T-cell growth factor.

Therapeutically effective amounts of immune cells can be administered by a number of routes, including parenteral administration, for example, intravenous, intraperitoneal, intramuscular, intrasternal, or intraarticular injection, or infusion.

Intratumoral injection, or injection into the tumor vasculature is specifically contemplated for discrete, solid, accessible tumors. Local, regional or systemic administration also may be appropriate. For tumors of >4 cm, the volume to be administered will be about 4-10 ml (in particular 10 ml), while for tumors of <4 cm, a volume of about 1-3 ml will be used (in particular 3 ml). Multiple injections delivered as single dose comprise about 0.1 to about 0.5 ml volumes.

The T cell population can be administered in treatment regimens consistent with the disease, for example a single or a few doses over one to several days to ameliorate a disease state or periodic doses over an extended time to inhibit disease progression and prevent disease recurrence. The precise dose to be employed in the formulation will also depend on the route of administration, and the seriousness of the disease or disorder, and should be decided according to the judgment of the practitioner and each patient's circumstances. The therapeutically effective amount of T cells will be dependent on the subject being treated, the severity and type of the affliction, and the manner of administration. In some embodiments, doses that could be used in the treatment of human subjects range from at least $3.8 \times 10^4$, at least $3.8 \times 10^5$, at least $3.8 \times 10^6$, at least $3.8 \times 10^7$, at least $3.8 \times 10^8$, at least $3.8 \times 10^9$, or at least $3.8 \times 10^{10}$ T cells/m$^2$. In a certain embodiment, the dose used in the treatment of human subjects ranges from about $3.8 \times 10^9$ to about $3.8 \times 10^{10}$ T cells/m$^2$. In additional embodiments, a therapeutically effective amount of T cells can vary from about $5 \times 10^6$ cells per kg body weight to about $7.5 \times 10^8$ cells per kg body weight, such as about $2 \times 10^7$ cells to about $5 \times 10^8$ cells per kg body weight, or about $5 \times 10^7$ cells to about $2 \times 10^8$ cells per kg body weight. The exact amount of T cells is readily determined by one of skill in the art based on the age, weight, sex, and physiological condition of the subject. Effective doses can be extrapolated from dose-response curves derived from in vitro or animal model test systems.

A. Pharmaceutical Compositions

Also provided herein are pharmaceutical compositions and formulations comprising CAR T cells and a pharmaceutically acceptable carrier.

Pharmaceutical compositions and formulations as described herein can be prepared by mixing the active ingredients (such as an antibody or a polypeptide) having the desired degree of purity with one or more optional pharmaceutically acceptable carriers (Remington's Pharmaceutical Sciences 22$^{nd}$ edition, 2012), in the form of lyophilized formulations or aqueous solutions. Pharmaceutically acceptable carriers are generally nontoxic to recipients at the dosages and concentrations employed, and include, but are not limited to: buffers such as phosphate, citrate, and other organic acids; antioxidants including ascorbic acid and methionine; preservatives (such as octadecyldimethylbenzyl ammonium chloride; hexamethonium chloride; benzalkonium chloride; benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g. Zn-protein complexes); and/or non-ionic surfactants such as polyethylene glycol (PEG). Exemplary pharmaceutically acceptable carriers herein further include insterstitial drug dispersion agents such as soluble neutral-active hyaluronidase glycoproteins (sHASEGP), for example, human soluble PH-20 hyaluronidase glycoproteins, such as rHuPH20 (HYLENEX®, Baxter International, Inc.). In one aspect, a sHASEGP is combined with one or more additional glycosaminoglycanases such as chondroitinases.

B. Combination Therapies

In certain embodiments, the compositions and methods of the present embodiments involve a T cell population in combination with at least one additional therapy. The additional therapy may be radiation therapy, surgery (e.g., lumpectomy and a mastectomy), chemotherapy, gene therapy, DNA therapy, viral therapy, RNA therapy, immunotherapy, bone marrow transplantation, nanotherapy, monoclonal antibody therapy, or a combination of the foregoing. The additional therapy may be in the form of adjuvant or neoadjuvant therapy.

In some embodiments, the additional therapy is the administration of small molecule enzymatic inhibitor or anti-metastatic agent. In some embodiments, the additional therapy is the administration of side-effect limiting agents (e.g., agents intended to lessen the occurrence and/or severity of side effects of treatment, such as anti-nausea agents, etc.). In some embodiments, the additional therapy is radiation therapy. In some embodiments, the additional therapy is surgery. In some embodiments, the additional therapy is a combination of radiation therapy and surgery. In some embodiments, the additional therapy is gamma irradiation. In some embodiments, the additional therapy is therapy targeting PBK/AKT/mTOR pathway, HSP90 inhibitor, tubulin inhibitor, apoptosis inhibitor, and/or chemopreventative agent. The additional therapy may be one or more of the chemotherapeutic agents known in the art.

An immune cell therapy may be administered before, during, after, or in various combinations relative to an additional cancer therapy, such as immune checkpoint therapy. The administrations may be in intervals ranging from concurrently to minutes to days to weeks. In embodiments where the immune cell therapy is provided to a patient separately from an additional therapeutic agent, one would generally ensure that a significant period of time did not expire between the time of each delivery, such that the two compounds would still be able to exert an advantageously combined effect on the patient. In such instances, it is contemplated that one may provide a patient with the antibody therapy and the anti-cancer therapy within about 12 to 24 or 72 h of each other and, more particularly, within about 6-12 h of each other. In some situations it may be desirable to extend the time period for treatment significantly where several days (2, 3, 4, 5, 6, or 7) to several weeks (1, 2, 3, 4, 5, 6, 7, or 8) lapse between respective administrations.

Various combinations may be employed. For the example below an immune cell therapy is "A" and an anti-cancer therapy is "B":

| | | | | | | |
|---|---|---|---|---|---|---|
| A/B/A | B/A/B | B/B/A | A/A/B | A/B/B | B/A/A | A/B/B/B | B/A/B/B |
| B/B/B/A | B/B/A/B | A/A/B/B | A/B/A/B | A/B/B/A | B/B/A/A | | |
| B/A/B/A | B/A/A/B | A/A/A/B | B/A/A/A | A/B/A/A | A/A/B/A | | |

Administration of any compound or therapy of the present embodiments to a patient will follow general protocols for the administration of such compounds, taking into account the toxicity, if any, of the agents. Therefore, in some embodiments there is a step of monitoring toxicity that is attributable to combination therapy.

1. Chemotherapy

A wide variety of chemotherapeutic agents may be used in accordance with the present embodiments. Examples of chemotherapeutic agents include alkylating agents, such as thiotepa and cyclosphosphamide; alkyl sulfonates, such as busulfan, improsulfan, and piposulfan; aziridines, such as benzodopa, carboquone, meturedopa, and uredopa; ethylenimines and methylamelamines, including altretamine, triethylenemelamine, trietylenephosphoramide, triethiylenethiophosphoramide, and trimethylolomelamine; acetogenins (especially bullatacin and bullatacinone); a camptothecin (including the synthetic analogue topotecan); bryostatin; callystatin; CC-1065 (including its adozelesin, carzelesin and bizelesin synthetic analogues); cryptophycins (particularly cryptophycin 1 and cryptophycin 8); dolastatin; duocarmycin (including the synthetic analogues, KW-2189 and CB1-TM1); eleutherobin; pancratistatin; a sarcodictyin; spongistatin; nitrogen mustards, such as chlorambucil, chlornaphazine, cholophosphamide, estramustine, ifosfamide, mechlorethamine, mechlorethamine oxide hydrochloride, melphalan, novembichin, phenesterine, prednimustine, trofosfamide, and uracil mustard; nitrosureas, such as carmustine, chlorozotocin, fotemustine, lomustine, nimustine, and ranimnustine; antibiotics, such as the enediyne antibiotics (e.g., calicheamicin, especially calicheamicin gammaI1 and calicheamicin omegaI1); dynemicin, including dynemicin A; bisphosphonates, such as clodronate; an esperamicin; as well as neocarzinostatin chromophore and related chromoprotein enediyne antiobiotic chromophores, aclacinomysins, actinomycin, authrarnycin, azaserine, bleomycins, cactinomycin, carabicin, carminomycin, carzinophilin, chromomycinis, dactinomycin, daunorubicin, detorubicin, 6-diazo-5-oxo-L-norleucine, doxorubicin (including morpholino-doxorubicin, cyanomorpholino-doxorubicin, 2-pyrrolino-doxorubicin and deoxydoxorubicin), epirubicin, esorubicin, idarubicin, marcellomycin, mitomycins, such as mitomycin C, mycophenolic acid, nogalarnycin, olivomycins, peplomycin, potfiromycin, puromycin, quelamycin, rodorubicin, streptonigrin, streptozocin, tubercidin, ubenimex, zinostatin, and zorubicin; anti-metabolites, such as methotrexate and 5-fluorouracil (5-FU); folic acid analogues, such as denopterin, pteropterin, and trimetrexate; purine analogs, such as fludarabine, 6-mercaptopurine, thiamiprine, and thioguanine; pyrimidine analogs, such as ancitabine, azacitidine, 6-azauridine, carmofur, cytarabine, dideoxyuridine, doxifluridine, enocitabine, and floxuridine; androgens, such as calusterone, dromostanolone propionate, epitiostanol, mepitiostane, and testolactone; anti-adrenals, such as mitotane and trilostane; folic acid replenisher, such as frolinic acid; aceglatone; aldophosphamide glycoside; aminolevulinic acid; eniluracil; amsacrine; bestrabucil; bisantrene; edatraxate; defofamine; demecolcine; diaziquone; elformithine; elliptinium acetate; an epothilone; etoglucid; gallium nitrate; hydroxyurea; lentinan; lonidainine; maytansinoids, such as maytansine and ansamitocins; mitoguazone; mitoxantrone; mopidanmol; nitraerine; pentostatin; phenamet; pirarubicin; losoxantrone; podophyllinic acid; 2-ethylhydrazide; procarbazine; PSKpolysaccharide complex; razoxane; rhizoxin; sizofiran; spirogermanium; tenuazonic acid; triaziquone; 2,2',2"-trichlorotriethylamine; trichothecenes (especially T-2 toxin, verracurin A, roridin A and anguidine); urethan; Vindesine; dacarbazine; mannomustine; mitobronitol; mitolactol; pipobroman; gacytosine; arabinoside ("Ara-C"); cyclophosphamide; taxoids, e.g., paclitaxel and docetaxel gemcitabine; 6-thioguanine; mercaptopurine; platinum coordination complexes, such as cisplatin, oxaliplatin, and carboplatin; vinblastine; platinum; etoposide (VP-16); ifosfamide; mitoxantrone; vincristine; vinorelbine; novantrone; teniposide; edatrexate; daunomycin; aminopterin; xeloda; ibandronate; irinotecan (e.g., CPT-11); topoisomerase inhibitor RFS 2000; difluorometlhylornithine (DMFO); retinoids, such as retinoic acid; capecitabine; carboplatin, procarbazine, plicomycin, gemcitabien, navelbine, farnesyl-protein tansferase inhibitors, transplatinum, and pharmaceutically acceptable salts, acids, or derivatives of any of the above.

2. Radiotherapy

Other factors that cause DNA damage and have been used extensively include what are commonly known as γ-rays, X-rays, and/or the directed delivery of radioisotopes to tumor cells. Other forms of DNA damaging factors are also contemplated, such as microwaves, proton beam irradiation, and UV-irradiation. It is most likely that all of these factors affect a broad range of damage on DNA, on the precursors of DNA, on the replication and repair of DNA, and on the assembly and maintenance of chromosomes. Dosage ranges for X-rays range from daily doses of 50 to 200 roentgens for prolonged periods of time (3 to 4 wk), to single doses of 2000 to 6000 roentgens. Dosage ranges for radioisotopes vary widely, and depend on the half-life of the isotope, the strength and type of radiation emitted, and the uptake by the neoplastic cells.

3. Immunotherapy

The skilled artisan will understand that immunotherapies may be used in combination or in conjunction with methods of the embodiments. In the context of cancer treatment, immunotherapeutics, generally, rely on the use of immune effector cells and molecules to target and destroy cancer cells. Rituximab (RITUXAN) is such an example. The immune effector may be, for example, an antibody specific for some marker on the surface of a tumor cell. The antibody alone may serve as an effector of therapy or it may recruit other cells to actually affect cell killing. The antibody also may be conjugated to a drug or toxin (chemotherapeutic, radionuclide, ricin A chain, cholera toxin, pertussis toxin, etc.) and serve as a targeting agent. Alternatively, the effector may be a lymphocyte carrying a surface molecule that interacts, either directly or indirectly, with a tumor cell target. Various effector cells include cytotoxic T cells and NK cells Antibody-drug conjugates (ADCs) comprise monoclonal antibodies (MAbs) that are covalently linked to cell-killing drugs and may be used in combination therapies. This approach combines the high specificity of MAbs against their antigen targets with highly potent cytotoxic drugs, resulting in "armed" MAbs that deliver the payload (drug) to tumor cells with enriched levels of the antigen. Targeted delivery of the drug also minimizes its exposure in normal tissues, resulting in decreased toxicity and improved therapeutic index. Exemplary ADC drugs include ADCETRIS® (brentuximab vedotin) and KADCYLA® (trastuzumab emtansine or T-DM1).

In one aspect of immunotherapy, the tumor cell must bear some marker that is amenable to targeting, i.e., is not present on the majority of other cells. Many tumor markers exist and any of these may be suitable for targeting in the context of the present embodiments. Common tumor markers include CD20, carcinoembryonic antigen, tyrosinase (p97), gp68, TAG-72, HMFG, Sialyl Lewis Antigen, MucA, MucB, PLAP, laminin receptor, erb B, erb b2 and p155. An alternative aspect of immunotherapy is to combine anticancer effects with immune stimulatory effects. Immune stimulating molecules also exist including: cytokines, such as IL-2, IL-4, IL-12, GM-CSF, gamma-IFN, chemokines, such as MIP-1, MCP-1, IL-8, and growth factors, such as FLT3 ligand.

Examples of immunotherapies include immune adjuvants, e.g., *Mycobacterium bovis*, *Plasmodium falciparum*, dinitrochlorobenzene, and aromatic compounds); cytokine therapy, e.g., interferons α, β, and γ, IL-1, GM-CSF, and TNF; gene therapy, e.g., TNF, IL-1, IL-2, and p53; and monoclonal antibodies, e.g., anti-CD20, anti-ganglioside GM2, and anti-p185. It is contemplated that one or more anti-cancer therapies may be employed with the antibody therapies described herein.

In some embodiments, the immunotherapy may be an immune checkpoint inhibitor. Immune checkpoints either turn up a signal (e.g., co-stimulatory molecules) or turn down a signal. Inhibitory immune checkpoints that may be targeted by immune checkpoint blockade include adenosine A2A receptor (A2AR), B7-H3 (also known as CD276), B and T lymphocyte attenuator (BTLA), cytotoxic T-lymphocyte-associated protein 4 (CTLA-4, also known as CD152), indoleamine 2,3-dioxygenase (IDO), killer-cell immunoglobulin (KIR), lymphocyte activation gene-3 (LAGS), programmed death 1 (PD-1), T-cell immunoglobulin domain and mucin domain 3 (TIM-3) and V-domain Ig suppressor of T cell activation (VISTA). In particular, the immune checkpoint inhibitors target the PD-1 axis and/or CTLA-4.

The immune checkpoint inhibitors may be drugs such as small molecules, recombinant forms of ligand or receptors, or, in particular, are antibodies, such as human antibodies. Known inhibitors of the immune checkpoint proteins or analogs thereof may be used, in particular chimerized, humanized or human forms of antibodies may be used. As the skilled person will know, alternative and/or equivalent names may be in use for certain antibodies mentioned in the present disclosure. Such alternative and/or equivalent names are interchangeable in the context of the present disclosure. For example, it is known that lambrolizumab is also known under the alternative and equivalent names MK-3475 and pembrolizumab.

In some embodiments, the PD-1 binding antagonist is a molecule that inhibits the binding of PD-1 to its ligand binding partners. In a specific aspect, the PD-1 ligand binding partners are PDL1 and/or PDL2. In another embodiment, a PDL1 binding antagonist is a molecule that inhibits the binding of PDL1 to its binding partners. In a specific aspect, PDL1 binding partners are PD-1 and/or B7-1. In another embodiment, the PDL2 binding antagonist is a molecule that inhibits the binding of PDL2 to its binding partners. In a specific aspect, a PDL2 binding partner is PD-1. The antagonist may be an antibody, an antigen binding fragment thereof, an immunoadhesin, a fusion protein, or oligopeptide.

In some embodiments, the PD-1 binding antagonist is an anti-PD-1 antibody (e.g., a human antibody, a humanized antibody, or a chimeric antibody). In some embodiments, the anti-PD-1 antibody is selected from the group consisting of nivolumab, pembrolizumab, and CT-011. In some embodiments, the PD-1 binding antagonist is an immunoadhesin (e.g., an immunoadhesin comprising an extracellular or PD-1 binding portion of PDL1 or PDL2 fused to a constant region (e.g., an Fc region of an immunoglobulin sequence). In some embodiments, the PD-1 binding antagonist is AMP-224. Nivolumab, also known as MDX-1106-04, MDX-1106, ONO-4538, BMS-936558, and OPDIVO, is an anti-PD-1 antibody that may be used. Pembrolizumab, also known as MK-3475, Merck 3475, lambrolizumab, KEYTRUDA®, and SCH-900475, is an exemplary anti-PD-1 antibody. CT-011, also known as hBAT or hBAT-1, is also an anti-PD-1 antibody. AMP-224, also known as B7-DCIg, is a PDL2-Fc fusion soluble receptor.

Another immune checkpoint that can be targeted in the methods provided herein is the cytotoxic T-lymphocyte-associated protein 4 (CTLA-4), also known as CD152. The complete cDNA sequence of human CTLA-4 has the Genbank accession number L15006. CTLA-4 is found on the surface of T cells and acts as an "off" switch when bound to CD80 or CD86 on the surface of antigen-presenting cells. CTLA4 is a member of the immunoglobulin superfamily that is expressed on the surface of Helper T cells and transmits an inhibitory signal to T cells. CTLA4 is similar to the T-cell co-stimulatory protein, CD28, and both molecules bind to CD80 and CD86, also called B7-1 and B7-2 respectively, on antigen-presenting cells. CTLA4 transmits an inhibitory signal to T cells, whereas CD28 transmits a stimulatory signal. Intracellular CTLA4 is also found in regulatory T cells and may be important to their function. T cell activation through the T cell receptor and CD28 leads to increased expression of CTLA-4, an inhibitory receptor for B7 molecules.

In some embodiments, the immune checkpoint inhibitor is an anti-CTLA-4 antibody (e.g., a human antibody, a humanized antibody, or a chimeric antibody), an antigen binding fragment thereof, an immunoadhesin, a fusion protein, or oligopeptide.

Anti-human-CTLA-4 antibodies (or $V_H$ and/or $V_L$ domains derived therefrom) suitable for use in the present methods can be generated using methods well known in the art. Alternatively, art recognized anti-CTLA-4 antibodies can be used. An exemplary anti-CTLA-4 antibody is ipilimumab (also known as 10D1, MDX-010, MDX-101, and Yervoy®) or antigen binding fragments and variants thereof. In other embodiments, the antibody comprises the heavy and light chain CDRs or VRs of ipilimumab. Accordingly, in one embodiment, the antibody comprises the CDR1, CDR2, and CDR3 domains of the $V_H$ region of ipilimumab, and the CDR1, CDR2 and CDR3 domains of the $V_L$ region of ipilimumab. In another embodiment, the antibody competes for binding with and/or binds to the same epitope on CTLA-4 as the above-mentioned antibodies. In another embodiment, the antibody has at least about 90% variable region amino acid sequence identity with the above-mentioned antibodies (e.g., at least about 90%, 95%, or 99% variable region identity with ipilimumab).

4. Surgery

Approximately 60% of persons with cancer will undergo surgery of some type, which includes preventative, diagnostic or staging, curative, and palliative surgery. Curative surgery includes resection in which all or part of cancerous tissue is physically removed, excised, and/or destroyed and may be used in conjunction with other therapies, such as the treatment of the present embodiments, chemotherapy, radiotherapy, hormonal therapy, gene therapy, immunotherapy, and/or alternative therapies. Tumor resection refers to physical removal of at least part of a tumor. In addition to tumor resection, treatment by surgery includes laser surgery, cryosurgery, electrosurgery, and microscopically-controlled surgery (Mohs' surgery).

Upon excision of part or all of cancerous cells, tissue, or tumor, a cavity may be formed in the body. Treatment may be accomplished by perfusion, direct injection, or local application of the area with an additional anti-cancer therapy. Such treatment may be repeated, for example, every 1, 2, 3, 4, 5, 6, or 7 days, or every 1, 2, 3, 4, and 5 weeks or every 1, 2, 3, 4, 5, 6, 7, 8, 9, 10, 11, or 12 months. These treatments may be of varying dosages as well.

5. Other Agents

It is contemplated that other agents may be used in combination with certain aspects of the present embodiments to improve the therapeutic efficacy of treatment. These additional agents include agents that affect the upregulation of cell surface receptors and GAP junctions, cytostatic and differentiation agents, inhibitors of cell adhesion, agents that increase the sensitivity of the hyperproliferative cells to apoptotic inducers, or other biological agents. Increases in intercellular signaling by elevating the number of GAP junctions would increase the anti-hyperproliferative effects on the neighboring hyperproliferative cell population. In other embodiments, cytostatic or differentiation agents can be used in combination with certain aspects of the present embodiments to improve the anti-hyperproliferative efficacy of the treatments. Inhibitors of cell adhesion are contemplated to improve the efficacy of the present embodiments. Examples of cell adhesion inhibitors are focal adhesion kinase (FAKs) inhibitors and Lovastatin.

V. Articles of Manufacture or Kits

An article of manufacture or a kit is provided comprising immune cells is also provided herein. The article of manufacture or kit can further comprise a package insert comprising instructions for using the immune cells to treat or delay progression of cancer in an individual or to enhance immune function of an individual having cancer. Any of the antigen-specific immune cells described herein may be included in the article of manufacture or kits. Suitable containers include, for example, bottles, vials, bags and syringes. The container may be formed from a variety of materials such as glass, plastic (such as polyvinyl chloride or polyolefin), or metal alloy (such as stainless steel or hastelloy). In some embodiments, the container holds the formulation and the label on, or associated with, the container may indicate directions for use. The article of manufacture or kit may further include other materials desirable from a commercial and user standpoint, including other buffers, diluents, filters, needles, syringes, and package inserts with instructions for use. In some embodiments, the article of manufacture further includes one or more of another agent (e.g., a chemotherapeutic agent, and anti-neoplastic agent). Suitable containers for the one or more agent include, for example, bottles, vials, bags and syringes.

VI. EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1—Development of CD79b Antibodies and CARs

Figure 1B:
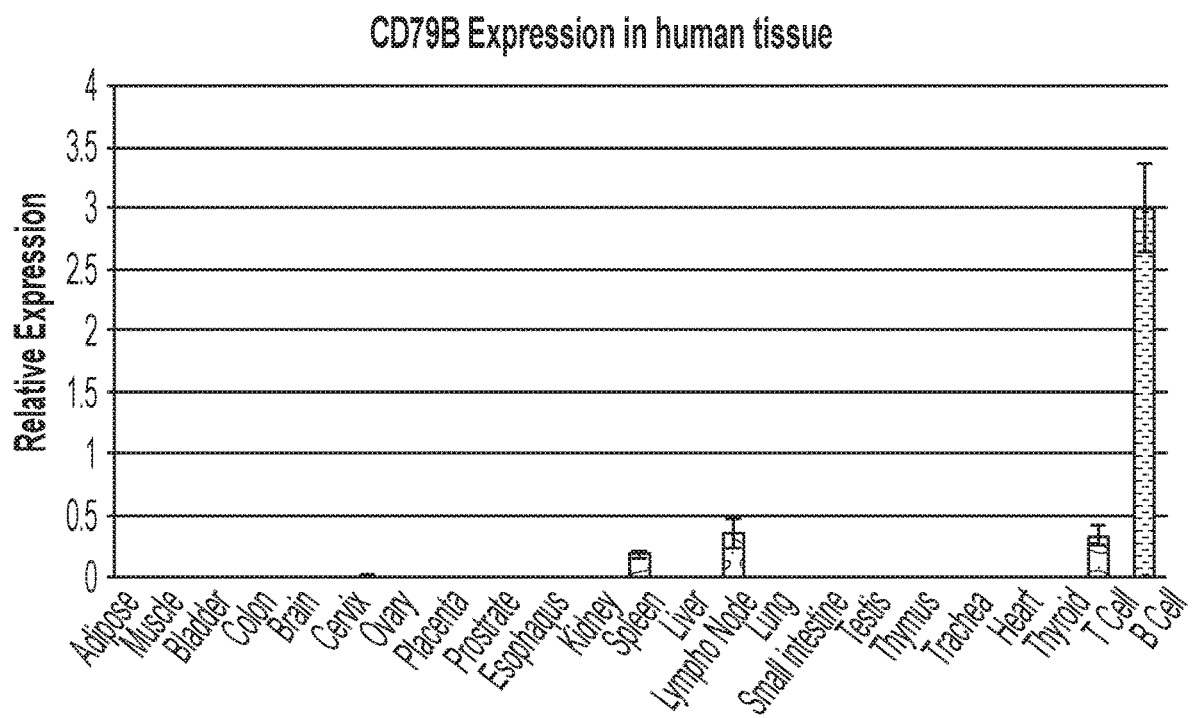

CD79b expression is restricted to B cell linage: Using real-time PCR, it was found that CD79b is expressed in a broad range of B cell lymphoma cell lines including Mino, Daudi, HBC-1, Jeko, SUDHL6, SUDHL4, and U2932 but has no expression in Jurkat and J76 T-cell lymphoma/leukemia cell lines (FIG. 1A). To determine whether CD79b was expressed on normal tissues, the FirstChoice Human Total RNA Survey Panel containing 20 normal human tissue total RNA was obtained from Applied Biosystems. Total RNA was extracted from purified B and T cells from human tonsil samples and used as positive and negative controls, respectively. It was found that CD79b transcripts are only present in lymphoid tissues such as spleen and lymph node but are absent in all nonlymphoid normal tissues (FIG. 1B).

Figure 1C:
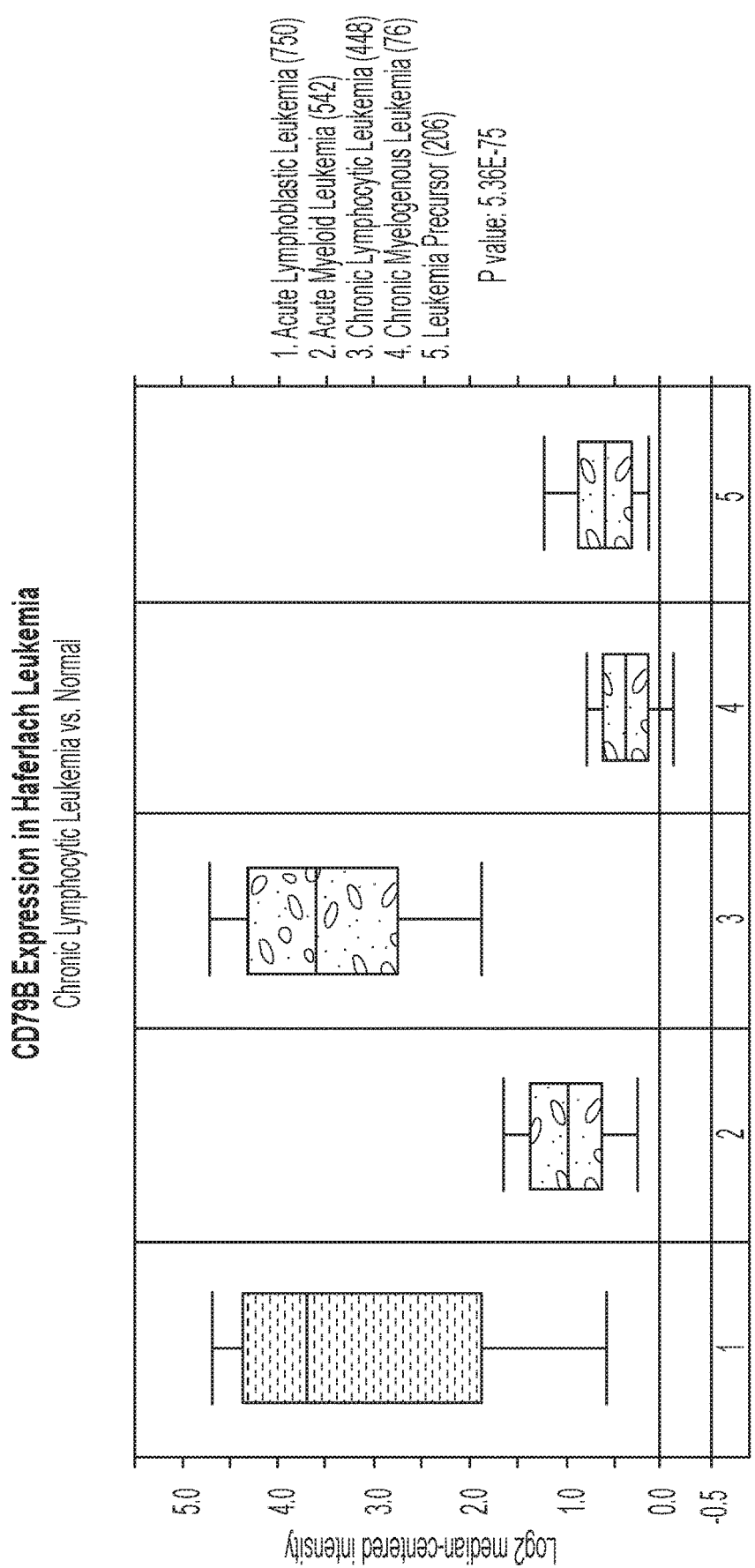
Figure 1D:
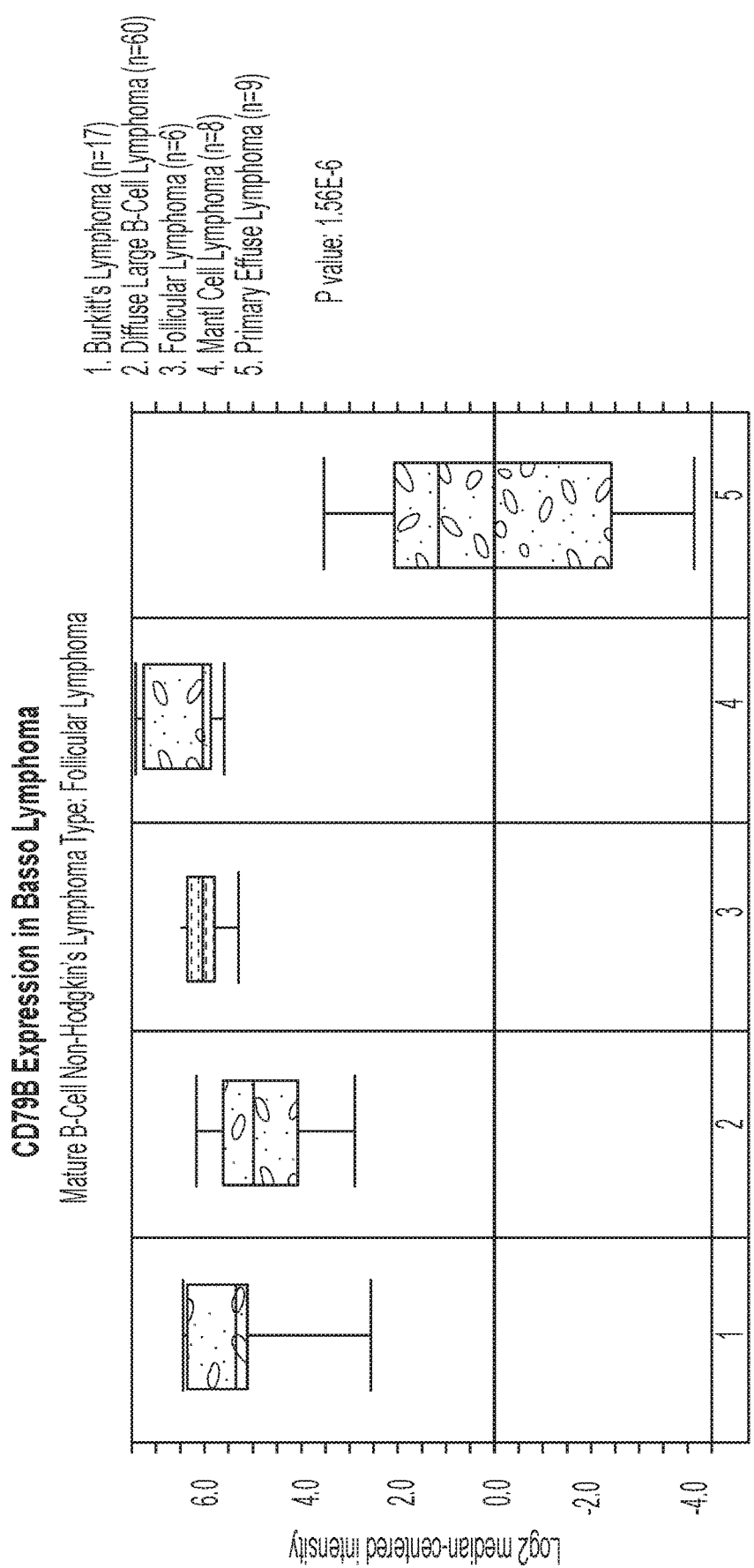

Using publicly available gene expression datasets (Oncomine), it was found that CD79b is highly expressed in ALL and chronic lymphocytic leukemia (FIG. 1C) and multiple B cell lymphoma subtypes such as Burkitt's lymphoma, diffuse large B cell lymphoma, follicular lymphoma, and mantle cell lymphoma (FIG. 1D). The number of samples for each tumor type is shown in brackets.

Figure 2A:
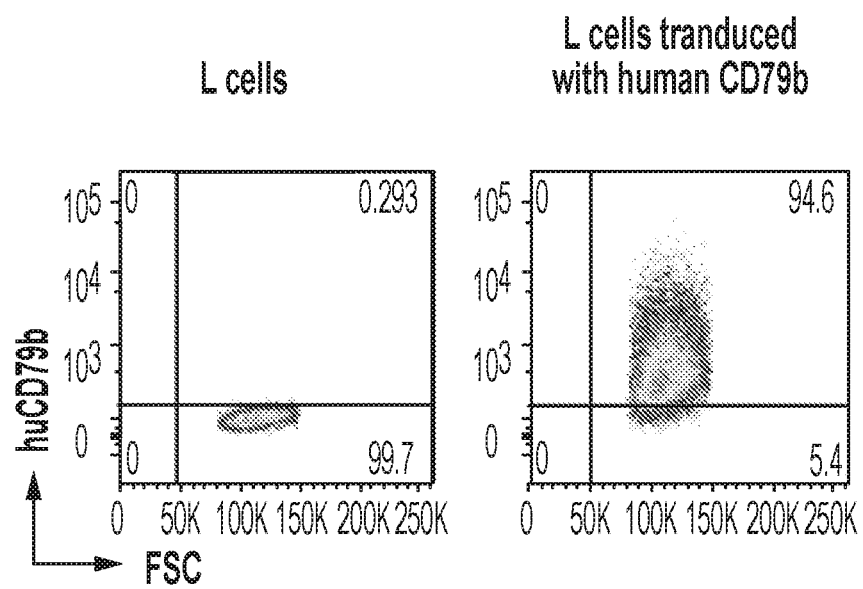
FIGS. 2A-2D: (A) Flow cytometry analysis of cells transduced with CD79b. (B) Binding affinity of CD79b monoclonal antibodies. (C) Characterization of CD79b monoclonal antibodies. (D) Clone 14 staining of lymphoma cell lines.
Figure 2B:
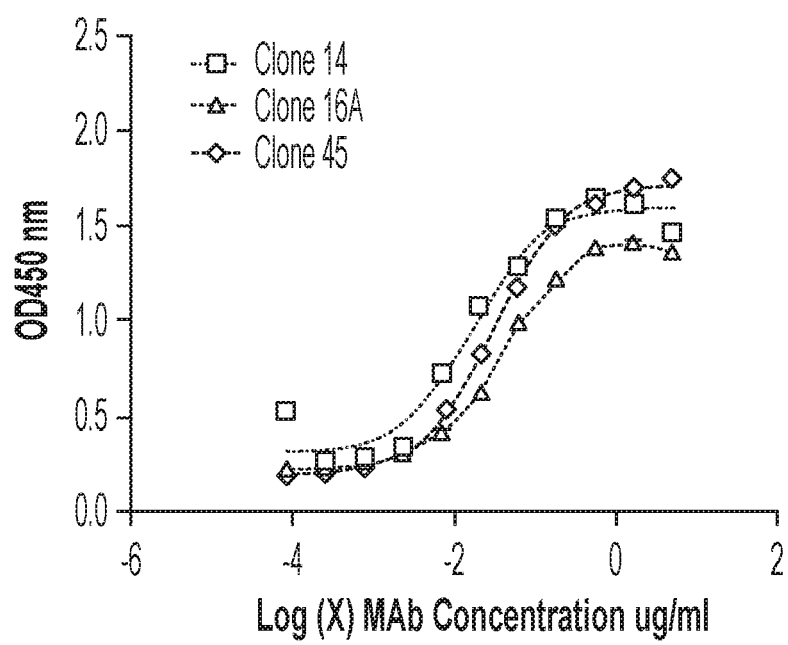
Figure 2C:
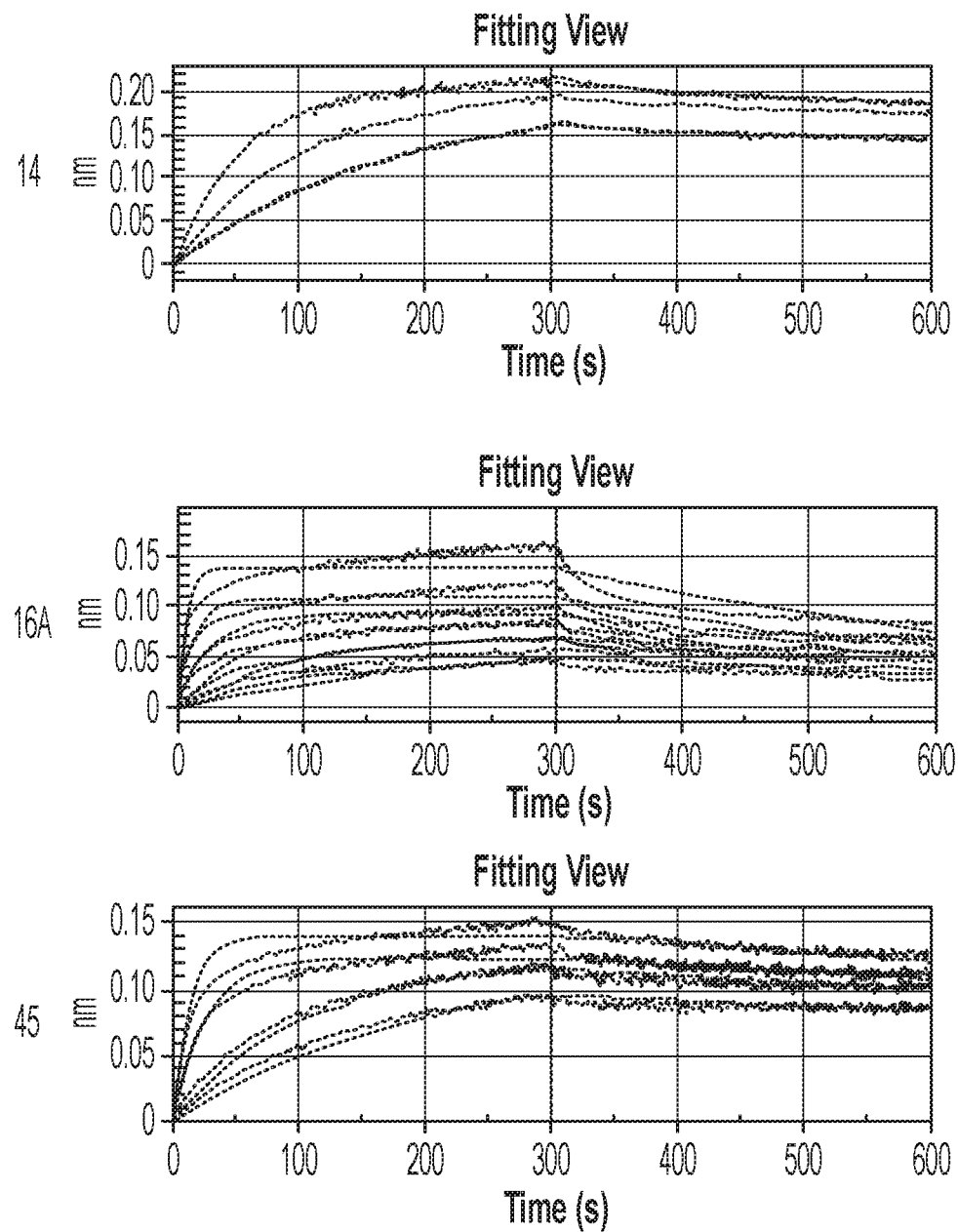
Figure 2D:
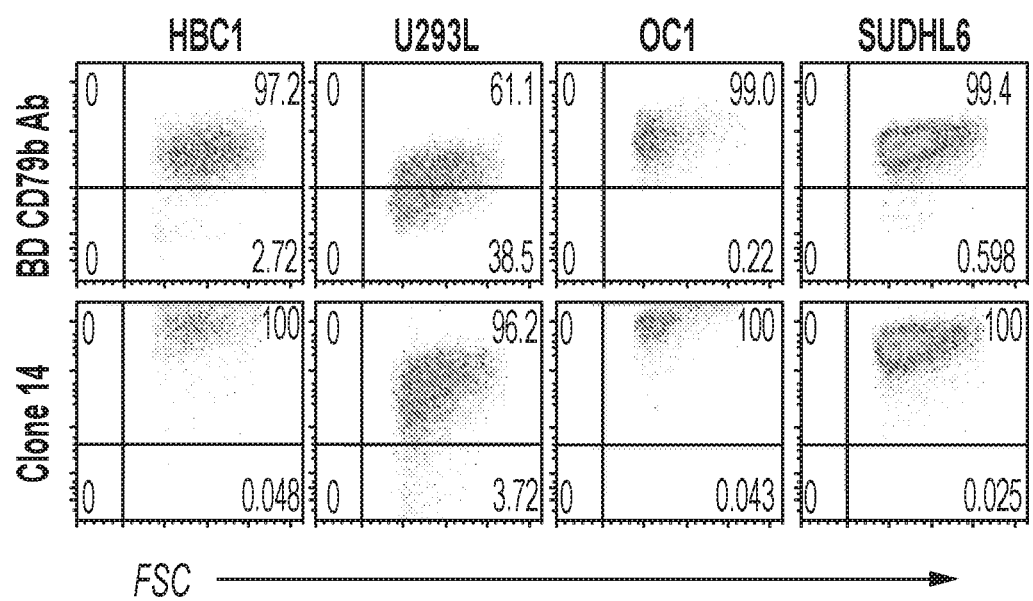

Generation of multiple monoclonal antibodies against human CD79b and identification of heavy and light chain sequences of antibodies: Anti-human CD79b monoclonal antibodies were generated by hybridoma technology by immunizing mice with human CD79b-expressing mouse fibroblast L cells (FIG. 2A). By ELISA, three clones were identified with high binding capacity to recombinant human CD79b protein (FIG. 2B). The affinity of these three monoclonal antibodies were further determined by Octet Assay and three clones, 14 (IgG1), 16A (IgG2) and 45 (IgG2) with Kd value at 1.44, 17.8 and 2.0 nM, respectively were selected for further development (FIG. 2C). The monoclonal antibody clone #14 was conjugated with a fluorochrome and shown to stain B cell lymphoma cell lines comparable to the commercial anti-CD79b antibody from BD Biosciences (FIG. 2D). Total RNA of the hybridomas of the monoclonal antibodies was extracted, cDNA was synthesized. 5'-RACE PCR (rapid amplification of cDNA ends) was used to clone V-genes for heavy and light chains. Protein sequences were predicted by DNA sequences. Hybridoma culture supernatants were purified and heavy chain and light chain protein sequences were confirmed by mass spectrometry from MD Anderson Proteomics Core Facility.

Figure 3A:
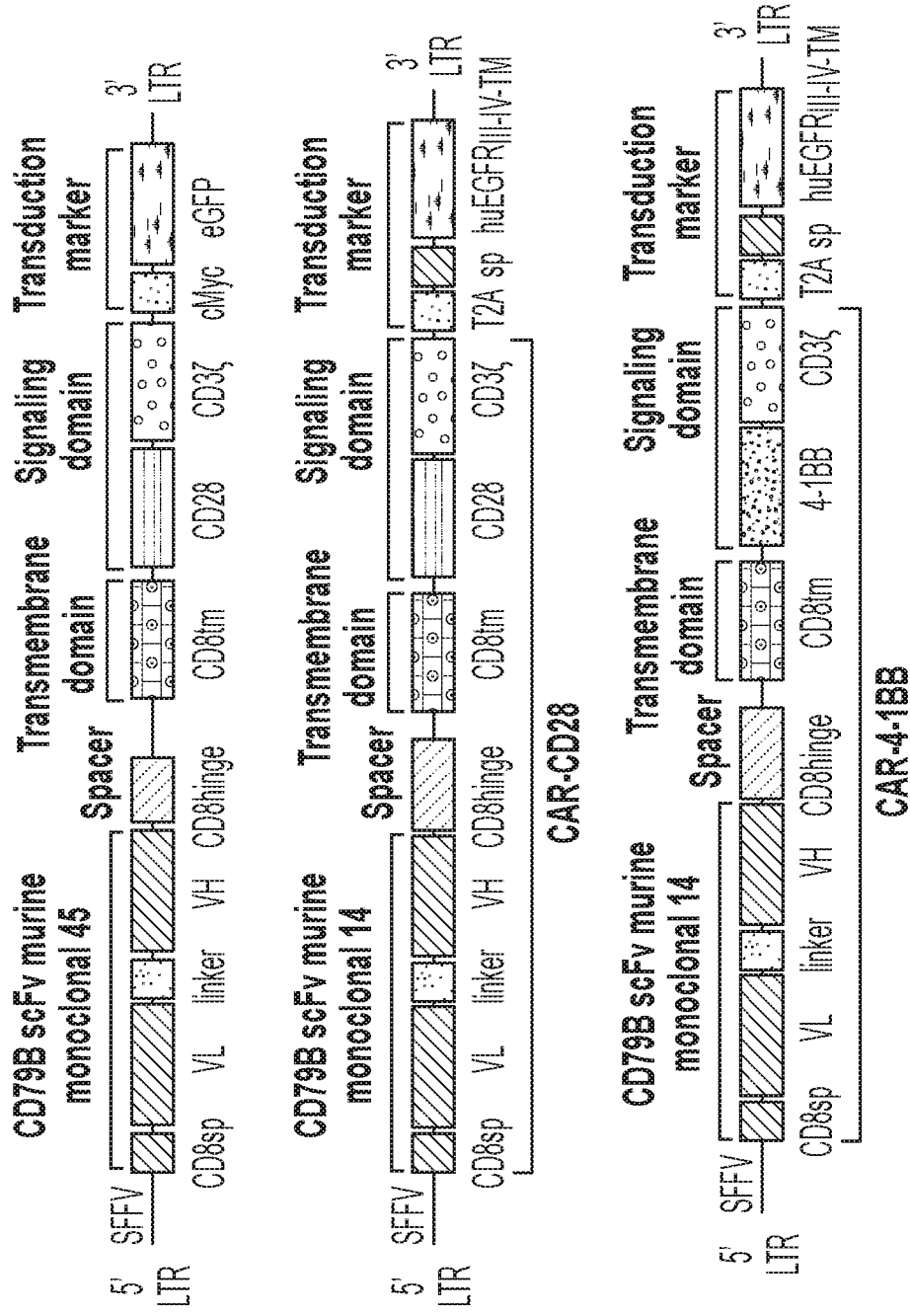
FIGS. 3A-3D: (A) Schematic depicting constructs for CD79b CARs. (B) Flow cytometry analysis of CD79b CAR and CD19 CAR. (C) Percent cytotoxicity of CD79b CAR and CD19 CAR with untransduced T cells as control. (D) Flow cytometry of CD79b CAR and CD19 CAR with untransduced T cells as control.

Generation of anti-CD79b CAR T cells: Using the specific sequences of single chain fragments of variable region (scFv), several constructs of anti-CD79b CAR were generated. In order to detect CAR expression in transduced T cells, CAR-enhanced green fluorescent protein (eGFP) fusion construct or the truncated human epidermal growth factor receptor (huEGFRt) were used (FIG. 3A). The latter can also serve as a safety switch to eliminate CAR T cells in case of severe toxicity. CD3-zeta (CD3z) chain was incorporated to provide signal 1 for activation of T cells and the costimulatory domains CD28 or 4-1BB were incorporated to provide signal 2 (FIG. 3A).

These constructs were cloned into lentivirus vector pHR_SFFV, which was then used to transduce primary healthy donor T cells. Representative transduction efficiency (>70%) as determined by eGFP expression in $CD4^+$ and $CD8^+$ T cells using Clone 45-CD79b-CD28-CAR is shown in FIG. 3B. Anti-CD19-CAR T cells were used as control.

Figure 3C:
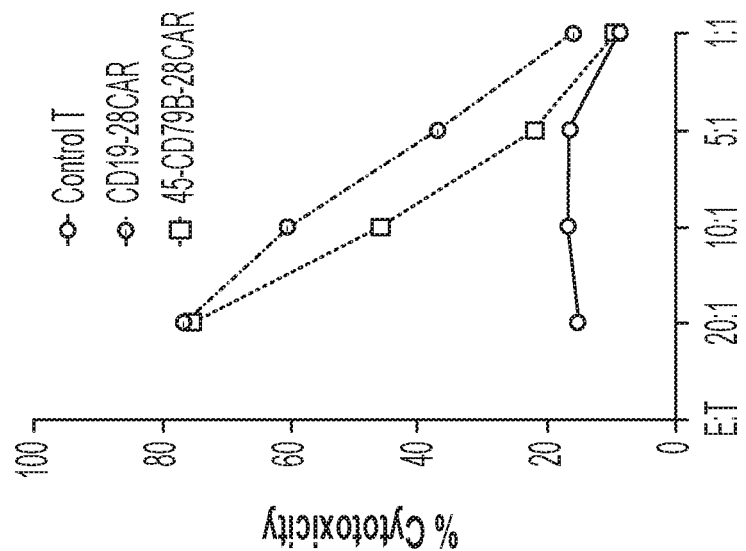
Figure 3B:
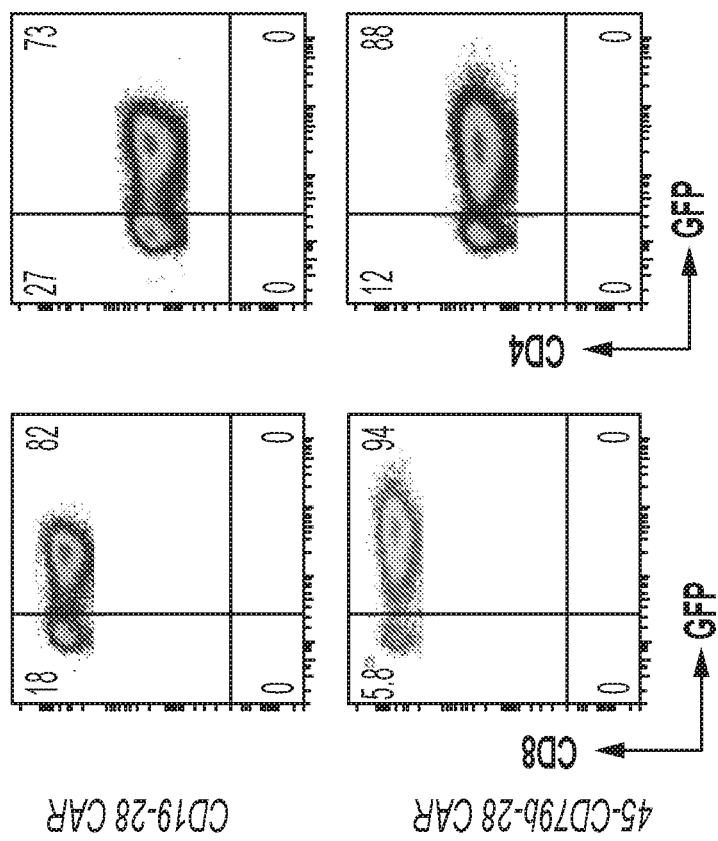
Figure 3D:
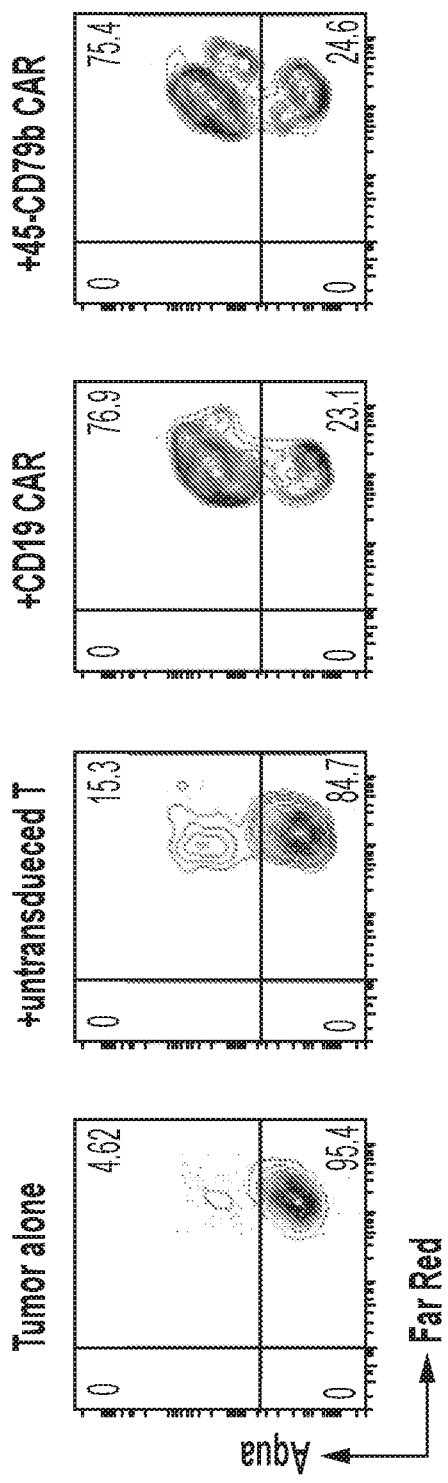

Cytotoxic activity of CAR T cells against Daudi cells labeled with CellTrace Far Red was determined by Aqua staining in a 16-hour flow cytometry assay at the indicated Effector:Target (E:T) ratios (FIG. 3C). Representative dot plots with percent dead cells (upper right quadrant) for the various culture conditions at an E:T ratio of 20:1 is shown in FIG. 3D. The data show that both anti-CD19-CAR T cells and anti-CD79b-CAR T cells were highly cytotoxic to Daudi Burkitt lymphoma cells compared with untransduced control T cells.

Anti-CD79b CAR T cells are cytotoxic to both $CD19^+$ and $CD19^-$ lymphoma cells: To determine the efficacy of anti-CD79b CAR T cells against CD19 negative ($CD19^-$) lymphoma cells, degranulation and cytotoxicity assays were performed with a diffuse large B cell lymphoma cell line, SUDHL6, lacking CD19. First, CD19 was knocked out by CRISPR-Cas9 (CD19KOSUDHL6) and then these lymphoma cells were transduced with CD19 splice variant lacking exon 2 (CD19Dex2) which is the binding site for anti-CD19 antibody clone, FMC63, used in anti CD19 CAR constructs.

Figure 4A:
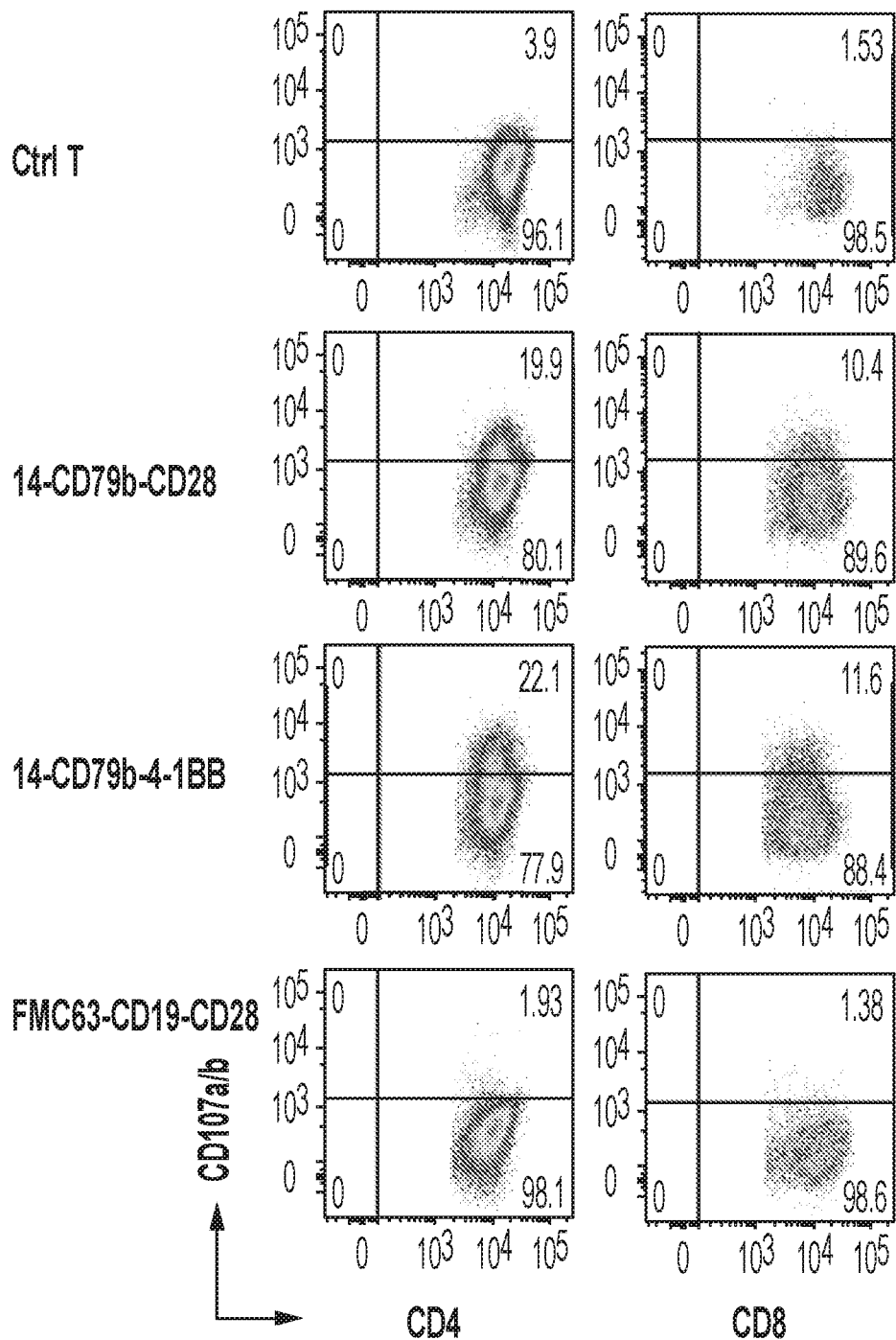
FIGS. 4A-4D: (A) T cells co-cultured with CD79b CAR and CD19 Exon 24 splice variant. (B) Flow cytometry analysis of efficacy of CAR at Effector:Target ratio of 5:1 incubated for 4 days. (C) Absolute cell count of Daudi cells with CD79b CAR. (D) Absolute cell count of CD19 knockdown cells with CD79b CAR.

Untransduced primary T cells (Ctrl T), clone-14-CD79b-CD28 CAR, 14-CD79b-4-1BB CAR, and FMC63-CD19-CD28 CAR were co-cultured with Daudi or the above SUDHL6 cells (CD19KOSUDHL6-CD19Dex2) at an E:T ratio of 5:1. T cells were labeled with CellTrace Far Red and target cells were labeled with CellTrace Violet. After 2 hours, Golgi inhibitor and degranulation marker (CD107a/b) were added to the cultures to determine degranulation of T cells. Cytotoxic activity against tumor cells was determined after 4 days of coculture. The 14-CD79b-CD28 and 14-CD79b-4-1BB CAR T cells but not control T cells showed markedly increased degranulation and cytotoxic activity against both cell lines (FIGS. 4A and B). In contrast, FMC63-CD19-CD28 CAR was cytotoxic to $CD19^+$ Daudi but not CD19KOSUDHL6-CD19Dex2 tumor cells.

Figure 4B:
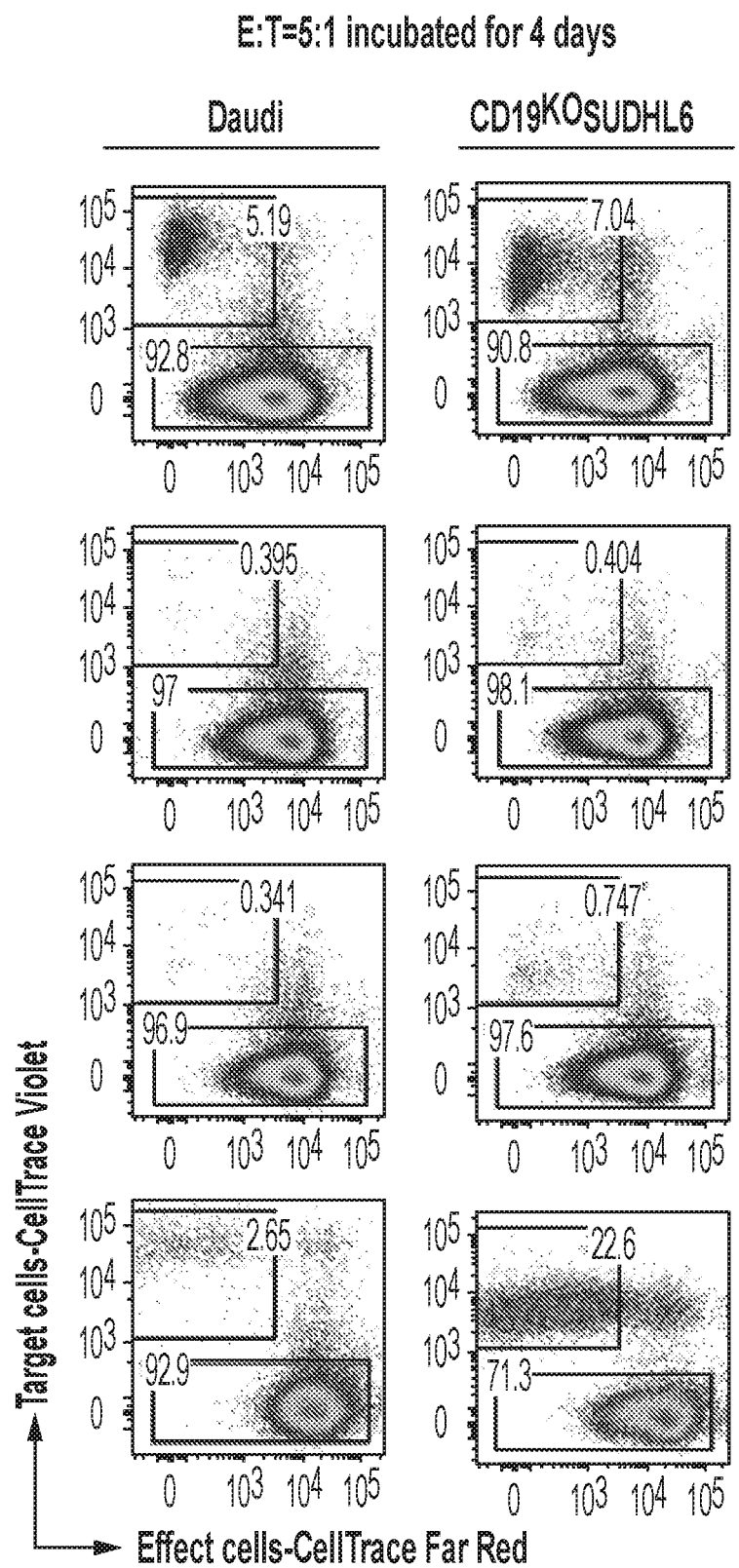
Figure 4D:
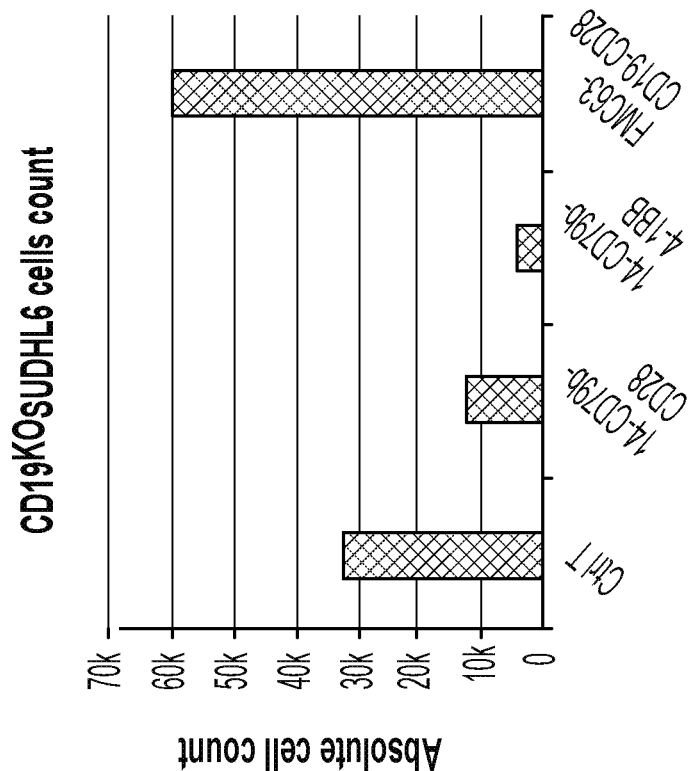
Figure 4C:
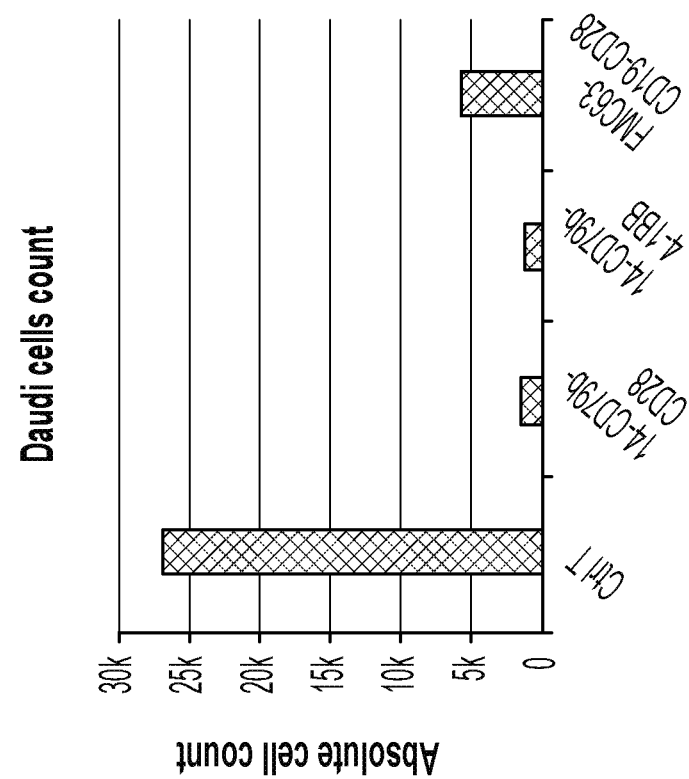

Using CountBright Absolute Counting Beads for flow cytometry the absolute number of live tumor cells was also determined after the 4-day co-culture (FIG. 4C). The results were consistent with the observed percentages of live tumor cells (FIG. 4B). Representative dot plots of target cells and effector T cells are shown (FIGS. 4A and B). The experiments were repeated at least 3 times with similar results.

Figure 5A:
FIGS. 5A-5C: (A) Schematic of pre-clinical study. (B) Bioluminescence images of mice during study. (C) Percent survival of mice during study.
Figure 5A:
Figure 5B:
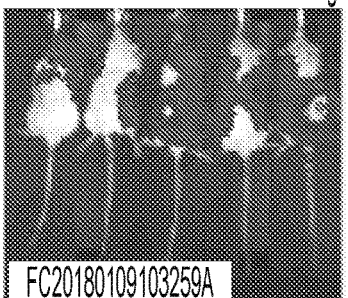
Figure 5B:
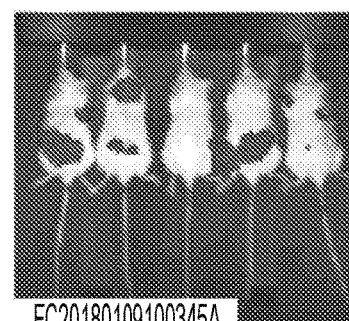
Figure 5B:
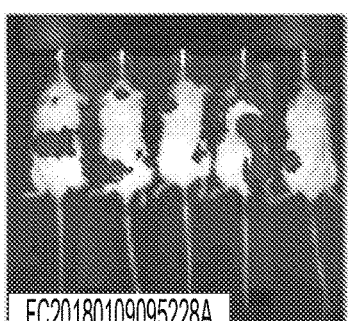
Figure 5B:
Figure 5B:
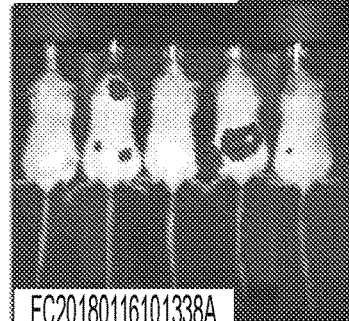
Figure 5B:
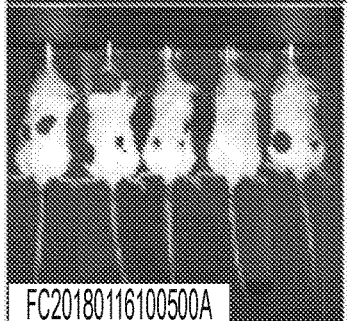
Figure 5B:
Figure 5B:
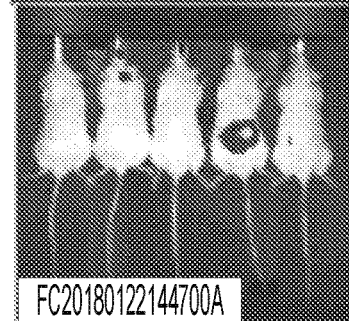
Figure 5B:
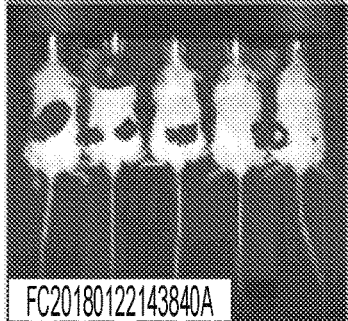
Figure 5B:
Figure 5B:
Figure 5B:
Figure 5C:
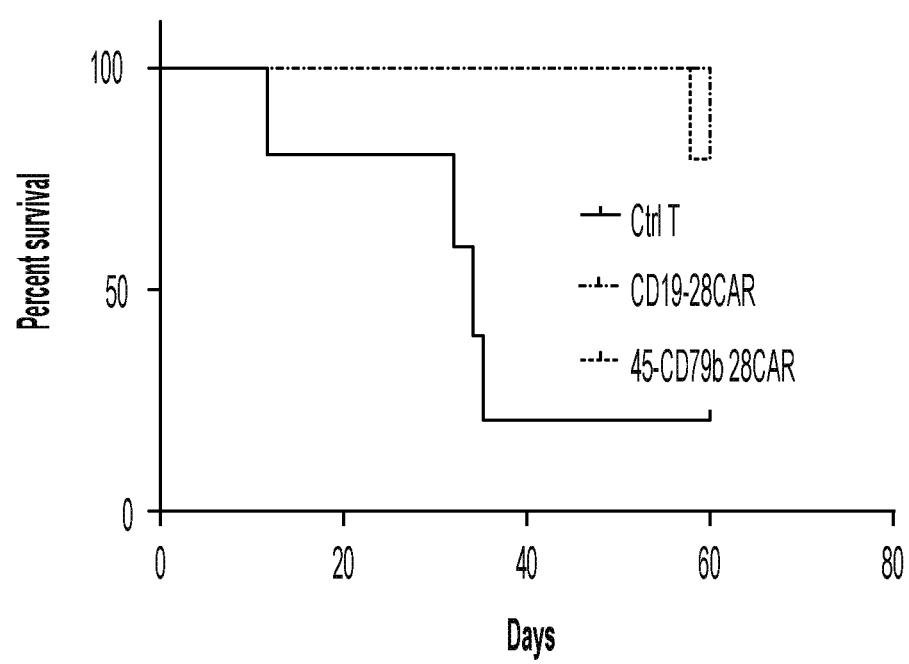

Anti-CD79b CAR T cells exhibit in vivo efficacy against lymphoma xenografts: To test the efficacy of anti-CD79b CART cells in vivo, Mino mantle cell lymphoma cell line expressing firefly luciferase gene was injected IV into NSG mice at $2 \times 10^6$ tumor cells/mouse. After 18 days, mice were treated with untransduced primary T cells, anti-CD19-CD28 CAR T cells, or Clone 45 anti-CD79b-CD28 CAR T cells via tail vein injection at $10 \times 10^6$ CAR' T cells or untransduced T cells/mouse. Bioluminescence imaging was used to assess tumor burden (FIG. 5A). The results showed progressive tumor growth in mice treated with untransduced T cells. In contrast, good tumor control and markedly improved survival ($p<0.05$) was observed in mice treated with both anti-CD19- and anti-CD79b CAR T cells (FIGS. 5B and C). The in vitro results have been verified at least three times for each individual experiment and in vivo results were verified twice. Thus, anti-CD79b CAR therapy can be used for the treatment of B cell malignancy with or without CD19 expression.

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

Ausubel et al., *Current Protocols in Molecular Biology*, Greene Publishing Associates and John Wiley & Sons, N Y, 1994.
Chothia et al., 1988.
Davila et al., 2013.
European patent application number EP2537416
Heemskerk et al. *Hum Gene Ther.* 19:496-510, 2008.
International Patent Publication No. WO/2014055668 A1.
International Patent Publication No. WO200014257
International Patent Publication No. WO2012/129514
International Patent Publication No. WO2013/071154
International Patent Publication No. WO2013/123061
International Patent Publication No. WO2013/166321
International Patent Publication No. WO2013126726
International Patent Publication No. WO2014031687

Johnson et al. *Blood* 114:535-46, 2009.
Jores et al., 1990.
Kabat et al., "Sequences of Proteins of Immunological Interest, US Dept. Health and Human Services, Public Health Service National Institutes of Health, 1991, 5th ed.
Lefranc et al., 2003.
Liu et al., 2003.
Remington's Pharmaceutical Sciences 22nd edition, 2012.
Sadelain et al., 2013.
Sambrook et al., *Molecular Cloning: A Laboratory Manual*, 3rd ed., Cold Spring Harbor Press, Cold Spring Harbor, N.Y. 2001.
Turtle et al., 2012.
U.S. Pat. No. 5,091,513
U.S. Pat. No. 5,091,513
U.S. Pat. No. 5,994,136
U.S. Pat. No. 6,013,516
U.S. Pat. No. 6,410,319
U.S. Pat. No. 6,410,319
U.S. Pat. No. 6,451,995
U.S. Pat. No. 6,881,557
U.S. Pat. No. 6,946,546
U.S. Pat. No. 7,070,995
U.S. Pat. No. 7,265,209
U.S. Pat. No. 7,354,762
U.S. Pat. No. 7,446,179
U.S. Pat. No. 7,446,190
U.S. Pat. No. 7,446,191
U.S. Pat. No. 8,252,592
U.S. Pat. No. 8,324,353
U.S. Pat. No. 8,339,645
U.S. Pat. No. 8,398,282
U.S. Pat. No. 8,479,118
U.S. Pat. No. 7,446,190
U.S. Patent Publication No. US2002131960
U.S. Patent Publication No. US20050214860
U.S. Patent Publication No. US20130149337
U.S. Patent Publication No. US2013287748
Wu et al., 2012

The invention claimed is:

1. An isolated monoclonal antibody, wherein the antibody specifically binds to CD79b and comprises:
(I):
(a) a first VH CDR is identical to SEQ ID NO: 3;
(b) a second VH CDR is identical to SEQ ID NO: 4;
(c) a third VH CDR is identical to SEQ ID NO: 5;
(d) a first VL CDR is identical to SEQ ID NO: 8;
(e) a second VL CDR is identical to SEQ ID NO: 9; and
(f) a third VL CDR is identical to SEQ ID NO: 10;
(II):
(a) a first VH CDR is identical to SEQ ID NO: 13;
(b) a second VH CDR is identical to SEQ ID NO: 14;
(c) a third VH CDR is identical to SEQ ID NO: 15;
(d) a first VL CDR is identical to SEQ ID NO: 18;
(e) a second VL CDR is identical to SEQ ID NO: 19; and
(f) a third VL CDR is identical to SEQ ID NO: 20; or
(III):
(a) a first VH CDR is identical to SEQ ID NO: 23;
(b) a second VH CDR is identical to SEQ ID NO: 24;
(c) a third VH CDR is identical to SEQ ID NO: 25;
(d) a first VL CDR is identical to SEQ ID NO: 28;
(e) a second VL CDR is identical to SEQ ID NO: 29; and
(f) a third VL CDR is identical to SEQ ID NO: 30.

2. The antibody of claim 1, wherein the antibody comprises:
(a) a first $V_H$ CDR is identical to SEQ ID NO: 3;
(b) a second $V_H$ CDR is identical to SEQ ID NO: 4;
(c) a third $V_H$ CDR is identical to SEQ ID NO: 5;
(d) a first $V_L$ CDR is identical to SEQ ID NO: 8;
(e) a second $V_L$ CDR is identical to SEQ ID NO: 9; and
(f) a third $V_L$ CDR is identical to SEQ ID NO: 10.

3. The antibody of claim 2, wherein the antibody comprises a $V_H$ domain at least about 80% identical to the $V_H$ domain of SEQ ID NO: 2 and a $V_L$ domain at least about 80% identical to the $V_L$ domain of SEQ ID NO: 7, or wherein the antibody comprises a $V_H$ domain identical to the $V_H$ domain of SEQ ID NO: 2 and a $V_L$ domain identical to the $V_L$ domain of SEQ ID NO: 7.

4. The antibody of claim 1, wherein the antibody comprises:
(a) a first $V_H$ CDR is identical to SEQ ID NO: 13;
(b) a second VH CDR is identical to SEQ ID NO: 14;
(c) a third VH CDR is identical to SEQ ID NO: 15;
(d) a first VL CDR is identical to SEQ ID NO: 18;
(e) a second VL CDR is identical to SEQ ID NO: 19; and
(f) a third VL CDR is identical to SEQ ID NO: 20.

5. The antibody of claim 4, wherein the antibody comprises a $V_H$ domain at least about 80% identical to the $V_H$ domain of SEQ ID NO: 12 and a $V_L$ domain at least about 80% identical to the $V_L$ domain of SEQ ID NO: 17, or wherein the antibody comprises a $V_H$ domain identical to the $V_H$ domain of SEQ ID NO: 12 and a $V_L$ domain identical to the $V_L$ domain SEQ ID NO: 17.

6. The antibody of claim 1, wherein the antibody comprises:
(a) a first $V_H$ CDR is identical to SEQ ID NO: 23;
(b) a second $V_H$ CDR is identical to SEQ ID NO: 24;
(c) a third $V_H$ CDR is identical to SEQ ID NO: 25;
(d) a first $V_L$ CDR is identical to SEQ ID NO: 28;
(e) a second $V_L$ CDR is identical to SEQ ID NO: 29; and
(f) a third $V_L$ CDR is identical to SEQ ID NO: 30.

7. The antibody of claim 6, wherein the antibody comprises a $V_H$ domain at least about 80% identical to the $V_H$ domain of SEQ ID NO: 22 and a $V_L$ domain at least about 80% identical to the $V_L$ domain of SEQ ID NO: 27, or wherein the antibody comprises a $V_H$ domain identical to the $V_H$ domain of SEQ ID NO: 22 and a $V_L$ domain identical to the $V_L$ domain SEQ ID NO: 27.

8. The antibody of claim 1, wherein
(a) the antibody is recombinant;
(b) the antibody is an IgG, IgM, IgA or an antigen binding fragment thereof;
(c) the antibody is a Fab', a F(ab')2, a F(ab')3, a monovalent scFv, or a bivalent scFv;
(d) the antibody is a humanized antibody or de-immunized antibody; or
(e) the antibody is conjugated to an imaging agent, a chemotherapeutic agent, a toxin or a radionuclide.

9. A composition comprising an antibody of claim 1 in a pharmaceutically acceptable carrier.

10. A recombinant polypeptide comprising:
(a) an antibody $V_H$ domain comprising CDRs 1-3 of the $V_H$ domain of Clone 14 (SEQ ID NOs: 3, 4, and 5) and CDRs 1-3 of the $V_H$ domain of Clone 14 (SEQ ID NOS: 8, 9, and 10);
(b) an antibody $V_H$ domain comprising CDRs 1-3 of the $V_H$ domain of Clone 16a (SEQ ID NOs: 13, 14, and 15) and CDRs 1-3 of the $V_H$ domain of Clone 16a (SEQ ID NOs: 18, 19, and 20); or
(c) an antibody $V_H$ domain comprising CDRs 1-3 of the $V_H$ domain of Clone 45 (SEQ ID NOs: 23, 24, and 25) and CDRs 1-3 of the $V_H$ domain of Clone 45 (SEQ ID NOs: 28, 29, and 30).

11. A host cell comprising one or more polynucleotide molecule(s) encoding an antibody of claim 1 or a recombinant polypeptide of claim 10.

12. A method for treating a subject having a cancer associated with B cells comprising administering an effective amount of an antibody of claim 1 to the subject.

13. The method of claim 12, wherein the cancer is B cell malignancy.

14. An engineered CD79b-targeted chimeric antigen receptor (CAR) comprising CD3ζ, CD28, 4-1BB, and/or OX40 signaling domains, wherein the antigen-binding domain comprises an antibody of claim 1 or a fragment thereof.

15. The CAR of claim 14, wherein the antigen-binding domain comprises:
(I):
(a) a first VH CDR is identical to SEQ ID NO: 3;
(b) a second VH CDR is identical to SEQ ID NO: 4;
(c) a third VH CDR is identical to SEQ ID NO: 5;
(d) a first VL CDR is identical to SEQ ID NO: 8;
(e) a second VL CDR is identical to SEQ ID NO: 9; and
(f) a third VL CDR is identical to SEQ ID NO: 10;
(II):
(a) a first VH CDR is identical to SEQ ID NO: 13;
(b) a second VH CDR is identical to SEQ ID NO: 14;
(c) a third VH CDR is identical to SEQ ID NO: 15;
(d) a first VL CDR is identical to SEQ ID NO: 18;
(e) a second VL CDR is identical to SEQ ID NO: 19; and
(f) a third VL CDR is identical to SEQ ID NO: 20; or
(III):
(a) a first VH CDR is identical to SEQ ID NO: 23;
(b) a second VH CDR is identical to SEQ ID NO: 24;
(c) a third VH CDR is identical to SEQ ID NO: 25;
(d) a first VL CDR is identical to SEQ ID NO: 28;
(e) a second VL CDR is identical to SEQ ID NO: 29; and
(f) a third $V_L$ CDR is identical to SEQ ID NO: 30.

16. The CAR of claim 14, wherein the antigen-binding domain comprises an scFV having at least 90% identity to the amino acid sequence of SEQ ID NOs: 31, 32, or 33 or wherein the antigen-binding domain comprises an scFV having an amino acid sequence of SEQ ID NOs: 31, 32, or 33.

17. The CAR of claim 14, wherein the antigen-binding domain comprises a $V_H$ domain linked to a $V_L$ domain by a linker.

18. The CAR of claim 17, wherein the linker is Linker 1 (SEQ ID NOs: 44 or 45), Linker 2 (SEQ ID NOs: 46 or 47), Linker 3 (SEQ ID NOs: 48 or 49), or Linker 4 (SEQ ID NOs: 50 or 51) or wherein the CAR comprises $V_L$-Linker1-$V_H$, $V_L$-Linker2-$V_H$, $V_L$-Linker3-$V_H$, $V_L$-Linker4-$V_H$, $V_H$-Linker1-$V_L$, $V_H$-Linker2-$V_L$, $V_H$-Linker3-$V_L$, or $V_H$-Linker4-$V_L$.

19. The CAR of claim 14, wherein the CAR comprises a hinge, wherein the hinge is CD8 Hinge 1 (SEQ ID NOs: 52 or 53), CD8 Hinge 2 (SEQ ID NOs: 54 or 55), CD8 Hinge 3 (SEQ ID NOs: 56 or 57), CD28 Hinge (SEQ ID NOs: 58 or 59), IgG4 Hinge (SEQ ID NOs: 60 or 61), IgG4 CH2 (SEQ ID NOs: 62 or 63), IgG4 CH2CH3 (SEQ ID NOs: 64 or 65), or IgG4 CH1CH2CH3 (SEQ ID NOs: 66 or 67).

20. The CAR of claim 14, wherein the CAR comprises a transmembrane domain, wherein the transmembrane domain is CD8 TM1 (SEQ ID NOs: 68 or 69), CD8 TM2 (SEQ ID NOs: 70 or 71), or CD28 TM (SEQ ID NOs: 72 or 73).

21. The CAR of claim 14, wherein the CAR comprises a sequence having at least 90% identity to the amino acid sequence of SEQ ID NOs: 34, 35, 36, 37, 38, 39, 86, 87, or 88 or wherein the CAR comprises a sequence having an amino acid sequence of SEQ ID NOs: 34, 35, 36, 37, 38, 39, 86, 87, or 88.

22. The CAR of claim 14, wherein the CAR further comprises a second antigen binding domain.

23. The CAR of claim 22, wherein the second antigen binding domain is a CD19, CD20, or CD22 antigen binding domain.

24. An engineered CD79b CAR or TCR having an antigen binding domain comprising:
(I):
  (a) a first VH CDR is identical to SEQ ID NO: 3;
  (b) a second VH CDR is identical to SEQ ID NO: 4;
  (c) a third VH CDR is identical to SEQ ID NO: 5;
  (d) a first VL CDR is identical to SEQ ID NO: 8;
  (e) a second VL CDR is identical to SEQ ID NO: 9; and
  (f) a third $V_L$ CDR is identical to SEQ ID NO: 10;
(II):
  (a) a first VH CDR is identical to SEQ ID NO: 13;
  (b) a second VH CDR is identical to SEQ ID NO: 14;
  (c) a third VH CDR is identical to SEQ ID NO: 15;
  (d) a first VL CDR is identical to SEQ ID NO: 18;
  (e) a second VL CDR is identical to SEQ ID NO: 19; and
  (f) a third VL CDR is identical to SEQ ID NO: 20; or
(III):
  (a) a first VH CDR is identical to SEQ ID NO: 23;
  (b) a second VH CDR is identical to SEQ ID NO: 24;
  (c) a third VH CDR is identical to SEQ ID NO: 25;
  (d) a first $V_L$ CDR is identical to SEQ ID NO: 28;
  (e) a second $V_L$ CDR is identical to SEQ ID NO: 29; and
  (f) a third $V_L$ CDR is identical to SEQ ID NO: 30.

25. The CAR of claim 24, wherein the antigen-binding domain comprises:
  (a) a first VH CDR is identical to SEQ ID NO: 3;
  (b) a second VH CDR is identical to SEQ ID NO: 4;
  (c) a third VH CDR is identical to SEQ ID NO: 5;
  (d) a first VL CDR is identical to SEQ ID NO: 8;
  (e) a second $V_L$ CDR is identical to SEQ ID NO: 9; and
  (f) a third $V_L$ CDR is identical to SEQ ID NO: 10.

26. The CAR or TCR of claim 25, wherein the antigen-binding domain comprises a $V_H$ domain at least about 80% identical to the $V_H$ domain of SEQ ID NO: 2 and a $V_L$ domain at least about 80% identical to the $V_L$ domain of SEQ ID NO: 7, or wherein the antigen-binding domain comprises a $V_H$ domain identical to the $V_H$ domain of SEQ ID NO: 2 and a $V_L$ domain identical to the $V_L$ domain of SEQ ID NO: 7.

27. The CAR or TCR of claim 24, wherein the antibody comprises:
  (a) a first VH CDR is identical to SEQ ID NO: 13;
  (b) a second VH CDR is identical to SEQ ID NO: 14;
  (c) a third VH CDR is identical to SEQ ID NO: 15;
  (d) a first VL CDR is identical to SEQ ID NO: 18;
  (e) a second VL CDR is identical to SEQ ID NO: 19; and
  (f) a third VL CDR is identical to SEQ ID NO: 20.

28. The CAR or TCR of claim 27, wherein the antigen-binding domain comprises a $V_H$ domain at least about 80% identical to the $V_H$ domain of SEQ ID NO: 12 and a $V_L$ domain at least about 80% identical to the $V_L$ domain of SEQ ID NO: 17, or wherein the antigen-binding domain comprises a $V_H$ domain identical to the $V_H$ domain of SEQ ID NO: 12 and a $V_L$ domain identical to the $V_L$ domain SEQ ID NO: 17.

29. The CAR or TCR of claim 24, wherein the antigen-binding domain comprises:
  (a) a first $V_H$ CDR is identical to SEQ ID NO: 23;
  (b) a second $V_H$ CDR is identical to SEQ ID NO: 24;
  (c) a third $V_H$ CDR is identical to SEQ ID NO: 25;
  (d) a first $V_L$ CDR is identical to SEQ ID NO: 28;
  (e) a second $V_L$ CDR is identical to SEQ ID NO: 29; and
  (f) a third $V_L$ CDR is identical to SEQ ID NO: 30.

30. The CAR or TCR of claim 29, wherein the antigen-binding domain comprises a $V_H$ domain at least about 80% identical to the $V_H$ domain of SEQ ID NO: 22 and a $V_L$ domain at least about 80% identical to the $V_L$ domain of SEQ ID NO: 27, or wherein the antigen-binding domain comprises a $V_H$ domain identical to the $V_H$ domain of SEQ ID NO: 22 and a $V_L$ domain identical to the $V_L$ domain SEQ ID NO: 27.

31. The CAR or TCR of claim 24, wherein the antigen-binding domain comprises an scFV having at least 90% identity to the amino acid sequence of SEQ ID NOs: 31, 32, or 33, or wherein the antigen-binding domain comprises an scFV having an amino acid sequence of SEQ ID NOs: 31, 32, or 33.

32. The CAR or TCR of claim 24, wherein the antigen-binding domain comprises a $V_H$ domain linked to a $V_L$ domain by a linker.

33. The CAR or TCR of claim 32, wherein the linker is Linker 1 (SEQ ID NOs: 44 or 45), Linker 2 (SEQ ID NOs: 46 or 47), Linker 3 (SEQ ID NOs: 48 or 49), or Linker 4 (SEQ ID NOs: 50 or 51), or wherein the CAR comprises $V_L$-Linker1-$V_H$, $V_L$-Linker2-$V_H$, $V_L$-Linker3-$V_H$, $V_L$-Linker4-$V_H$, $V_H$-Linker1-$V_L$, $V_H$-Linker2-$V_L$, $V_H$-Linker3-$V_L$, or $V_H$-Linker4-$V_L$.

34. The CAR or TCR of claim 24, wherein the CAR or TCR comprises a hinge, wherein the hinge is CD8 Hinge 1 (SEQ ID NOs: 52 or 53), CD8 Hinge 2 (SEQ ID NOs: 54 or 55), CD8 Hinge 3 (SEQ ID NOs: 56 or 57), CD28 Hinge (SEQ ID NOs: 58 or 59), IgG4 Hinge (SEQ ID NOs: 60 or 61), IgG4 CH2 (SEQ ID NOs: 62 or 63), IgG4 CH2CH3 (SEQ ID NOs: 64 or 65), or IgG4 CH1CH2CH3 (SEQ ID NOs: 66 or 67).

35. The CAR or TCR of claim 24, wherein the CAR comprises a transmembrane domain, wherein the transmembrane domain is CD8 TM1 (SEQ ID NOs: 68 or 69), CD8 TM2 (SEQ ID NOs: 70 or 71), or CD28 TM (SEQ ID NOs: 72 or 73).

36. The CAR or TCR of claim 24, wherein the CAR comprises a sequence having at least 90% identity to the amino acid sequence of SEQ ID NOs: 34, 35, 36, 37, 38, 39, 86, 87, or 88, or wherein the CAR comprises a sequence having an amino acid sequence of SEQ ID NOs: 34, 35, 36, 37, 38, 39, 86, 87, or 88.

37. An expression vector encoding the CAR or TCR of claim 14.

38. A host cell engineered to express a CD79b CAR or a CD79b TCR of claim 24, wherein the host cell is an immune cell.

39. A pharmaceutical composition comprising the host cell of claim 38 and a pharmaceutical carrier.

40. A method for treating cancer associated with B cells in a subject comprising administering an effective amount of the host cell of claim 38 to the subject.

41. The method of claim 40, wherein the cancer is a B cell malignancy.

42. The method of claim 41, wherein the B cell malignancy is B cell acute lymphoblastic leukemia (ALL), diffuse, large B cell lymphoma, follicular lymphoma, marginal zone lymphoma, lymphoplasmacytic lymphoma, Burkitt lymphoma, or chronic lymphocytic leukemia.

43. The method of claim 40, wherein the subject has been previously administered a CD19 CAR therapy.

44. The method of claim 43, wherein the subject is resistant to CD19 CAR therapy.

45. The method of claim 44, wherein the subject has CD19 antigen loss.

46. The method of claim 45, wherein the subject has relapsed with a CD19-negative tumor.

* * * * *